US007935734B2

(12) United States Patent
Tonkovich et al.

(10) Patent No.: US 7,935,734 B2
(45) Date of Patent: May 3, 2011

(54) CATALYTIC REACTION PROCESS USING MICROCHANNEL TECHNOLOGY

(76) Inventors: Anna Lee Tonkovich, Dublin, OH (US); Kai Tod Paul Jarosch, Bexley, OH (US); Timothy J. Sullivan, Dublin, OH (US); Terry Mazanec, Solon, OH (US); Sean Patrick Fitzgerald, Columbus, OH (US); Maddalena Fanelli, Columbus, OH (US)

( * ) Notice: Subject to any disclaimer, the term of this patent is extended or adjusted under 35 U.S.C. 154(b) by 678 days.

(21) Appl. No.: 11/480,348

(22) Filed: Jun. 30, 2006

(65) Prior Publication Data
US 2010/0081726 A1 Apr. 1, 2010

Related U.S. Application Data

(60) Provisional application No. 60/697,774, filed on Jul. 8, 2005, provisional application No. 60/814,469, filed on Jun. 16, 2006.

(51) Int. Cl.
C07C 27/00 (2006.01)
(52) U.S. Cl. .................................. 518/700; 518/712
(58) Field of Classification Search .................. 518/700, 518/712
See application file for complete search history.

(56) References Cited

U.S. PATENT DOCUMENTS

| 3,882,049 A | 5/1975 | Bertolacini et al. |
| 3,972,837 A | 8/1976 | Acres et al. |
| 4,089,810 A | 5/1978 | Diwell et al. |
| 4,096,095 A | 6/1978 | Cairns |
| 4,289,652 A | 9/1981 | Hunter et al. |
| 4,392,362 A | 7/1983 | Little ............................. 62/514 |
| 4,516,632 A | 5/1985 | Swift et al. .................... 165/167 |
| 5,248,251 A | 9/1993 | Dalla Betta et al. |
| 5,309,637 A | 5/1994 | Moriarty .................. 29/890.054 |
| 5,317,805 A | 6/1994 | Hoopman et al. ........ 29/890.03 |
| 5,597,773 A | 1/1997 | Evans et al. ................... 502/348 |
| 5,611,214 A | 3/1997 | Wegeng et al. ................ 62/498 |
| 5,689,966 A | 11/1997 | Zess et al. .................... 62/238.6 |
| 5,727,618 A | 3/1998 | Mundinger et al. ......... 165/80.4 |
| 5,811,062 A | 9/1998 | Wegeng et al. ............... 422/129 |
| 5,858,314 A | 1/1999 | Hsu et al. ..................... 422/211 |
| 5,997,826 A | 12/1999 | Lodeng et al. ............... 422/190 |
| 6,040,266 A | 3/2000 | Fay, III et al. |
| 6,056,932 A | 5/2000 | von Hippel et al. .......... 423/376 |
| 6,126,723 A | 10/2000 | Drost et al. .......................... 96/4 |
| 6,129,973 A | 10/2000 | Martin et al. ................. 428/166 |
| 6,159,358 A | 12/2000 | Mulvaney, III et al. ...... 423/376 |
| 6,192,596 B1 | 2/2001 | Bennett et al. ..................... 34/76 |
| 6,200,536 B1 | 3/2001 | Tonkovich et al. ........... 422/177 |
| 6,216,343 B1 | 4/2001 | Leland et al. ............ 29/890.032 |
| 6,220,497 B1 | 4/2001 | Benz et al. .................... 228/118 |
| 6,230,408 B1 | 5/2001 | Ehrfeld et al. ........... 29/890.039 |
| 6,284,217 B1 | 9/2001 | Wang et al. ................... 423/651 |
| 6,313,393 B1 | 11/2001 | Drost ............................. 136/201 |
| 6,352,577 B1 | 3/2002 | Martin et al. ........................ 96/4 |
| 6,381,846 B2 | 5/2002 | Insley et al. ............. 29/890.039 |
| 6,409,072 B1 | 6/2002 | Breuer et al. ............... 228/111.5 |
| 6,415,860 B1 | 7/2002 | Kelly et al. ................... 165/748 |
| 6,440,895 B1 | 8/2002 | Tonkovich et al. ........... 502/439 |
| 6,451,864 B1* | 9/2002 | Wang et al. ................... 518/715 |
| 6,479,428 B1 | 11/2002 | Tonkovich et al. ........... 502/302 |
| 6,488,838 B1 | 12/2002 | Tonkovich et al. ........... 208/108 |
| 6,490,812 B1 | 12/2002 | Bennett et al. ................... 34/433 |
| 6,491,880 B1 | 12/2002 | Wang et al. ................... 422/211 |
| 6,503,298 B1 | 1/2003 | Monzyk et al. ..................... 95/96 |
| 6,508,862 B1 | 1/2003 | Tonkovich et al. ............. 95/106 |
| 6,533,840 B2 | 3/2003 | Martin et al. ....................... 95/45 |
| 6,540,975 B2 | 4/2003 | Tonkovich et al. ........... 423/659 |
| 6,558,634 B1* | 5/2003 | Wang et al. ................... 422/173 |
| 6,607,678 B2 | 8/2003 | Wang et al. ................... 252/373 |
| 6,616,909 B1 | 9/2003 | Tonkovich et al. ........ 423/648.1 |
| 6,622,519 B1 | 9/2003 | Mathias et al. ................. 62/611 |
| 6,652,627 B1 | 11/2003 | Tonkovich et al. ............. 95/104 |
| 6,660,237 B2 | 12/2003 | Wang et al. ................... 422/222 |
| 6,666,909 B1 | 12/2003 | TeGrotenhuis et al. ......... 95/273 |
| 6,675,875 B1 | 1/2004 | Vafai et al. .................... 165/80.4 |
| 6,680,044 B1* | 1/2004 | Tonkovich et al. ........... 423/652 |
| 6,713,036 B1 | 2/2004 | Vanden Bussche et al. .. 423/584 |
| 6,734,137 B2 | 5/2004 | Wang et al. ................... 502/328 |
| 6,746,651 B1 | 6/2004 | Ponzo et al. .................. 422/220 |
| 6,746,819 B1 | 6/2004 | Schmitz et al. ............. 430/272.1 |
| 6,747,178 B1 | 6/2004 | Harston et al. ................ 570/175 |

(Continued)

FOREIGN PATENT DOCUMENTS

| CA | 2247662 | 3/1999 |
| DE | 246257 | 6/1987 |
| DE | 3926466 | 2/1991 |
| EP | 0 885 086 B1 | 8/2001 |
| EP | 1 311 341 B1 | 8/2001 |
| EP | 0 904 608 B1 | 12/2001 |
| EP | 1 232 790 A1 | 8/2002 |
| EP | 1 362 634 A1 | 11/2003 |
| EP | 1 382 382 A1 | 1/2004 |
| EP | 1 726 577 A1 | 11/2006 |

(Continued)

OTHER PUBLICATIONS

International Search Report and Written Opinion; Application No. PCT/US2006/026228, mailed Feb. 9, 2007.

(Continued)

Primary Examiner — Sikarl Witherspoon
(74) Attorney, Agent, or Firm — Renner, Otto, Boisselle & Sklar, LLP

(57) ABSTRACT

The disclosed technology relates to a process for conducting a chemical reaction between at least one liquid reactant and at least one gaseous reactant in a process microchannel containing at least one catalyst, the catalyst comprising a solid phase catalyst or a homogeneous catalyst immobilized on a solid. In one embodiment, the process microchannel comprises a processing zone containing one or more structures for disrupting fluid flow and a reaction zone containing one or more structures for contacting and/or supporting the catalyst, the one or more structures for contacting and/or supporting the catalyst containing openings to permit the reactants to flow through the one or more structures and contact the catalyst.

145 Claims, 24 Drawing Sheets

U.S. PATENT DOCUMENTS

| | | | |
|---|---|---|---|
| 6,749,814 B1* | 6/2004 | Bergh et al. | 422/130 |
| 6,749,817 B1 | 6/2004 | Mulvaney, III | 422/200 |
| 6,755,211 B1 | 6/2004 | O'Connor et al. | 137/554 |
| 6,762,149 B2 | 7/2004 | Tonkovich et al. | 502/439 |
| 6,769,444 B2 | 8/2004 | Guzman et al. | 137/15.01 |
| 6,773,684 B2 | 8/2004 | Lesieur et al. | 422/198 |
| 6,814,781 B2 | 11/2004 | Tonkovich et al. | 95/90 |
| 6,851,171 B2 | 2/2005 | Schmitt | 29/469 |
| 6,875,247 B2 | 4/2005 | TeGrotenhuis et al. | 55/310 |
| 6,969,505 B2 | 11/2005 | Tonkovich et al. | 423/648.1 |
| 6,969,506 B2 | 11/2005 | Tonkovich et al. | 423/652 |
| 6,982,287 B2* | 1/2006 | Wang et al. | 518/715 |
| 6,984,363 B2 | 1/2006 | Tonkovich et al. | 422/173 |
| 6,989,134 B2* | 1/2006 | Tonkovich et al. | 422/189 |
| 7,000,427 B2 | 2/2006 | Mathias et al. | 62/612 |
| 7,008,969 B2 | 3/2006 | Wang et al. | 518/715 |
| 7,014,835 B2 | 3/2006 | Mathias et al. | 423/652 |
| 7,029,647 B2 | 4/2006 | Tonkovich et al. | 423/584 |
| 7,045,114 B2 | 5/2006 | Tonkovich et al. | 423/659 |
| 7,045,486 B2* | 5/2006 | Wang et al. | 502/439 |
| 7,077,643 B2 | 7/2006 | Holladay et al. | 431/215 |
| 7,084,180 B2 | 8/2006 | Wang et al. | 518/712 |
| 2001/0018140 A1 | 8/2001 | Hermann et al. | 429/20 |
| 2002/0028164 A1 | 3/2002 | Schutte et al. | 422/198 |
| 2002/0182735 A1* | 12/2002 | Kibby et al. | 436/37 |
| 2002/0192118 A1 | 12/2002 | Zech et al. | 422/99 |
| 2003/0007904 A1 | 1/2003 | Tonkovich et al. | 422/180 |
| 2003/0045747 A1 | 3/2003 | Wurziger et al. | 562/418 |
| 2003/0072699 A1* | 4/2003 | Tonkovich et al. | 422/190 |
| 2003/0116503 A1 | 6/2003 | Wang et al. | 210/660 |
| 2003/0219903 A1 | 11/2003 | Wang et al. | 436/37 |
| 2004/0034111 A1 | 2/2004 | Tonkovich et al. | 518/726 |
| 2004/0055329 A1 | 3/2004 | Mathias et al. | 62/611 |
| 2004/0063799 A1* | 4/2004 | Wang et al. | 518/721 |
| 2004/0104010 A1 | 6/2004 | Kenny et al. | 165/80.4 |
| 2004/0105812 A1* | 6/2004 | Tonkovich et al. | 423/650 |
| 2004/0123626 A1 | 7/2004 | Caze et al. | 65/17.2 |
| 2004/0125689 A1 | 7/2004 | Ehrfeld et al. | 366/165.1 |
| 2004/0130057 A1 | 7/2004 | Mehrabi et al. | 264/171.13 |
| 2004/0131345 A1 | 7/2004 | Kylberg et al. | 392/465 |
| 2004/0131829 A1 | 7/2004 | Joseph et al. | 428/166 |
| 2004/0136902 A1 | 7/2004 | Plath et al. | 423/651 |
| 2004/0141893 A1 | 7/2004 | Martin | 422/198 |
| 2004/0143059 A1 | 7/2004 | Cabrera | 524/800 |
| 2004/0144421 A1 | 7/2004 | Parce et al. | 137/14 |
| 2004/0156762 A1 | 8/2004 | Schuppich et al. | 422/191 |
| 2004/0188326 A1 | 9/2004 | Tonkovich et al. | 208/139 |
| 2004/0220434 A1* | 11/2004 | Brophy et al. | 568/959 |
| 2004/0228781 A1 | 11/2004 | Tonkovich et al. | 422/222 |
| 2004/0228882 A1 | 11/2004 | Qiu et al. | 424/400 |
| 2004/0229752 A1 | 11/2004 | Long et al. | 502/203 |
| 2004/0234566 A1 | 11/2004 | Qiu et al. | 424/401 |
| 2005/0045030 A1 | 3/2005 | Tonkovich et al. | 95/90 |
| 2005/0087767 A1* | 4/2005 | Fitzgerald et al. | 257/200 |
| 2005/0163701 A1 | 7/2005 | Tonkovich et al. | 423/584 |
| 2005/0165121 A1 | 7/2005 | Wang et al. | 518/726 |
| 2005/0176832 A1 | 8/2005 | Tonkovich et al. | 518/726 |
| 2006/0073080 A1 | 4/2006 | Tonkovich et al. | 422/100 |
| 2006/0102519 A1 | 5/2006 | Tonkovich et al. | 208/107 |
| 2006/0120213 A1 | 6/2006 | Tonkovich et al. | 366/144 |
| 2006/0148910 A1* | 7/2006 | Wang et al. | 518/718 |

FOREIGN PATENT DOCUMENTS

| | | |
|---|---|---|
| EP | 1102628 | 11/2006 |
| GB | 1531134 | 11/1978 |
| GB | 2077136 | 12/1981 |
| WO | 9421372 | 9/1994 |
| WO | 9700442 | 1/1997 |
| WO | 97/32687 | 9/1997 |
| WO | 9828073 | 7/1998 |
| WO | 9838147 | 9/1998 |
| WO | 98/55812 | 12/1998 |
| WO | 9916542 | 4/1999 |
| WO | 99/48805 | 9/1999 |
| WO | 0006301 | 2/2000 |
| WO | 00/06295 | 10/2000 |
| WO | 01/10773 A1 | 2/2001 |
| WO | 01/12312 A2 | 2/2001 |
| WO | 01/54807 A1 | 8/2001 |
| WO | 01/95237 A2 | 12/2001 |
| WO | 02/14854 A1 | 2/2002 |
| WO | 02/064248 A2 | 8/2002 |
| WO | 03006149 | 1/2003 |
| WO | 03/078052 A1 | 9/2003 |
| WO | 03/106386 A2 | 12/2003 |
| WO | 2004/016347 A2 | 2/2004 |
| WO | 2004/101138 A1 | 5/2004 |
| WO | 2004/037418 A1 | 6/2004 |
| WO | 2004/045760 | 6/2004 |
| WO | 2004/050799 | 6/2004 |
| WO | 2004/052518 | 6/2004 |
| WO | 2004/052530 | 6/2004 |
| WO | 2004/052941 | 6/2004 |
| WO | 2004/054013 | 6/2004 |
| WO | 2004/054696 | 7/2004 |
| WO | 2004/062790 | 7/2004 |
| WO | 2004/062791 | 7/2004 |
| WO | 2004/062792 | 7/2004 |
| WO | 2004/067160 | 8/2004 |
| WO | 2004/067444 | 8/2004 |
| WO | 2004/067492 | 8/2004 |
| WO | 2004/067708 | 8/2004 |
| WO | 2004/091771 A1 | 10/2004 |
| WO | 2004/099113 A1 | 11/2004 |
| WO | 2004/103549 A2 | 12/2004 |
| WO | 2005/003025 A2 | 1/2005 |
| WO | 2005/075606 A1 | 8/2005 |
| WO | 2006/127889 A2 | 11/2006 |
| ZA | 855317 | 7/1985 |

OTHER PUBLICATIONS

Kestenbaum; "Synthesis of ethylene oxide in a microreaction system"; *Microreaction Technology: Industrial Prospects*; IMRET 3: Proceedings of the Third International Converence on Microreaction Technology.

Besser, Ronald S. "New Directions in Reactor Design Through Miniaturization". Sep. 13, 2002, Tulane Engineering Forum.

Ouyang et al. "Flexible Microreactor System for Chemical Research at Moderate and High Temperatures". Stevens Institute of Technology.

Gohring et al.; "Gas Phase Reactions in Ceramic Microreactors"; IMERT 6, 10-14, Marz 2002, New Orleans, USA, AIChE Conference Proceedings 55-60.

Hsing et al.; "Simulation of Microchannel Chemical Reactors for Heterogeneous Partial Oxidation Reactions"; Chemical Engineering Science 55 (2000) 3-13.

Matlosz et al.; "Microreactors as Tools in Chemical Research"; Microreaction Technology; IMRET 5: Proceedings of the Fifth International Conference on Microreaction Technology. (May 27-30, 2001), 14 pages.

Srinivasn et al.; "Micromachined Reactors for Catalytic Partial Oxidation Reactions"; AIChE Journal; Nov. 1997; vol. 43, No. 11; pp. 3059-3069.

TeGrotenhuis et al.; Optimizing Microchannel Reactors by Trading-Off Equilibrium and Reaction Kinetics through Temperature Management; Prepared for presentation at IMRET 6—6th International Conference on Microreaction Technology; Mar. 10-14, 2002.

Wegeng et al.; "Compact Fuel Processors for Fuel Cell Powered Automobiles Based on Microchannel Technology"; Fuel Cells Bulletin No. 28; pp. 8-13.

Rostami et al.; "Flow and Heat Transfer for Gas Flowing in Microchannels: a Review"; Heat and Mass Transfer 38 (2002) 359-367.

Matlosz et al.; "Selective Oxidation of 1-Butene to Maleic Anhydride—Comparison of the Performance between Microchannel Reactors and a Fixed Bed Reactor"; Microreaction Technology; IMRET 5: Proceedings of the Fifth International. Conference on Microreaction Technology. (2001), 14 pages.

Steinfeldt et al.; "Comparative Studies of the Oxidative Dehydrogenation of Propane in Micro-Channels Reactor Module and Fixed-Bed Reactor"; Studies in Surface Science and Catalysis; 2001 Elsevier Science B.V.; pp. 185-190.

Beretta et al.; "Production of Olefins via Oxidative Dehydrogenation of Light Paraffins at Short Contact Times"; Catalysis Today; 2001 Elsevier Science B.V.; pp. 103-111.

Waku et al.; "Effects of $O_2$ Concentration on the Rate and Selectivity in Oxidative Dehydrogenation of Ethane Catalyzed by Vanadium Oxide: Implications for $O_2$ Staging and Membrane Reactors"; Ind. Eng. Chem. Res. 2003, 41, 5462-5466.

McGovern et al.; "Multiphase flow regimes for hydrogenation in a catalyst-trap microcreator;" Chemical Engineering Journal 135S (2008); pp. S229-S236.

Chen et al.; "Performance analysis of a folding flow micromixer"; Microfluid Nanofluid (2009) 6:763-774.

MacInnes et al.; "Investigation of alternating-flow mixing in microchannels"; Chemical Engineering Science 60; 2005; pp. 3453-3467.

MacInnes et al.; "Numerial characterization of floding flow microchannel mixers"; Chemical Engineering Science 62; 2007; pp. 2718-2727.

MacInnes et al.; "Mixing Strategies for Flow in Microchannel Devices"; Chemical and Process Engineering, University of Sheffield, Nov. 24, 2004.

Cybulski et al.; "Monoliths in Heterogeneous Catalysis"; Catal. Rev.—Sci. Eng., 36(2), 179-270 (1994).

Bennett et al.; "Microchannel cooled heatsinks for high average power laser diode arrays"; SPIE, vol. 1865; 1993; pp. 144-153.

Iglesia; "Design, synthesis, and use of cobalt-based Fischer-Tropsch synthesis catalysts"; Applied Catalysis A: General 161 (1997); pp. 59-78.

* cited by examiner

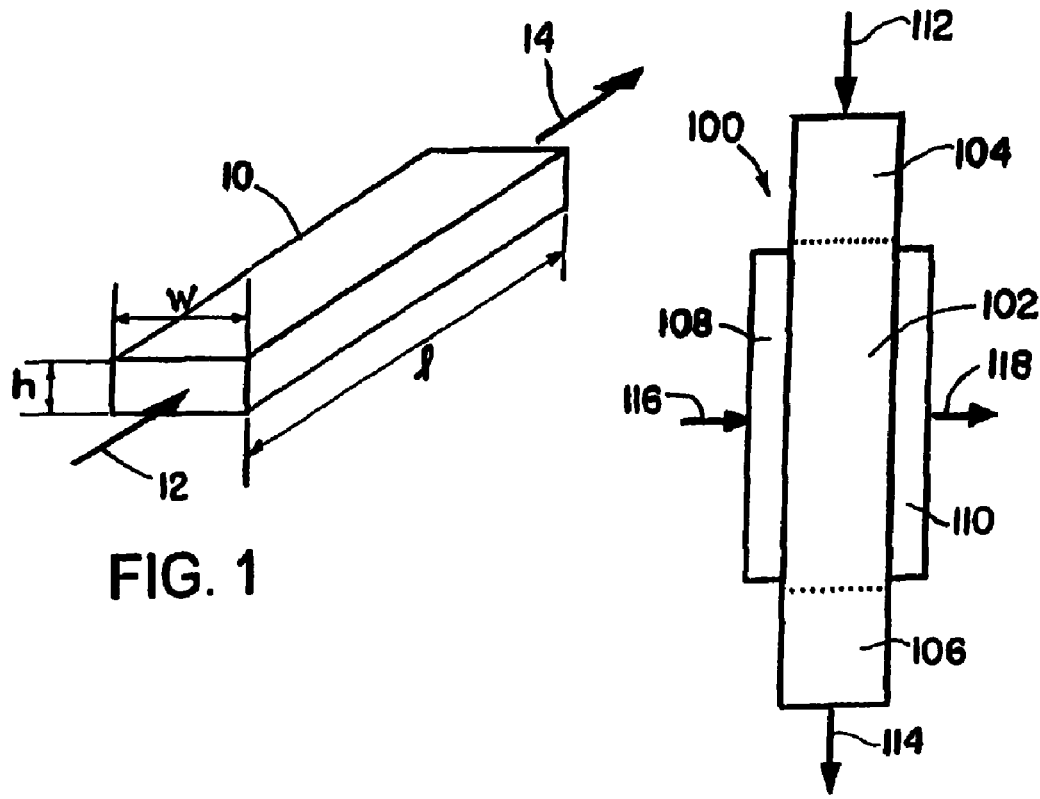
FIG. 1
FIG. 2
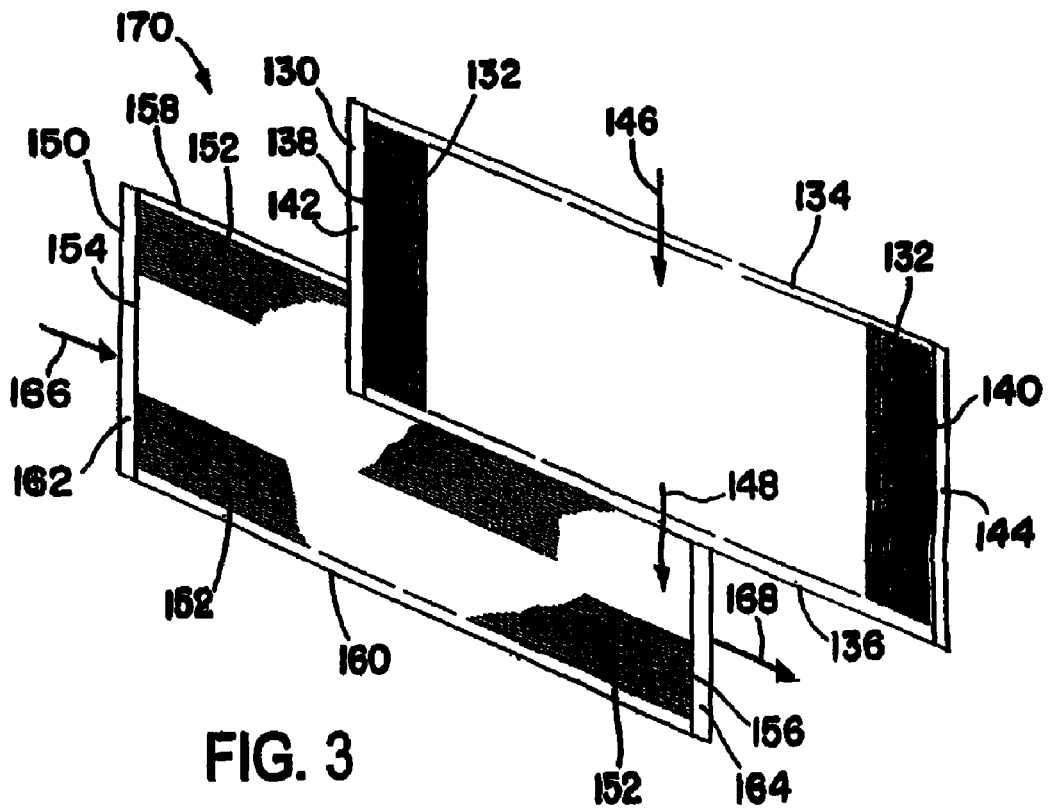
FIG. 3

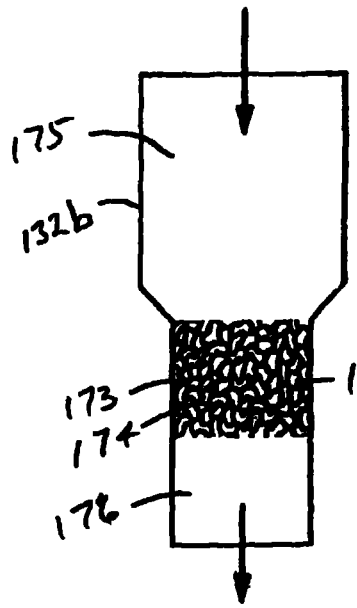 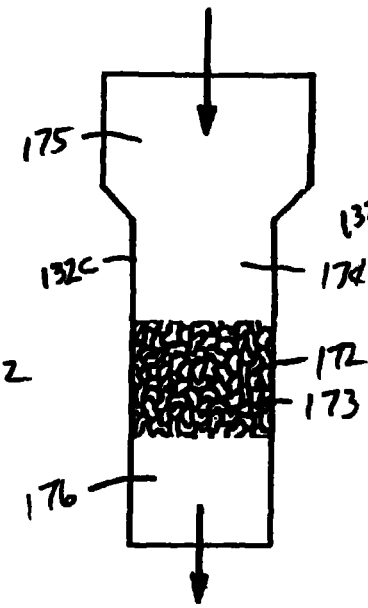 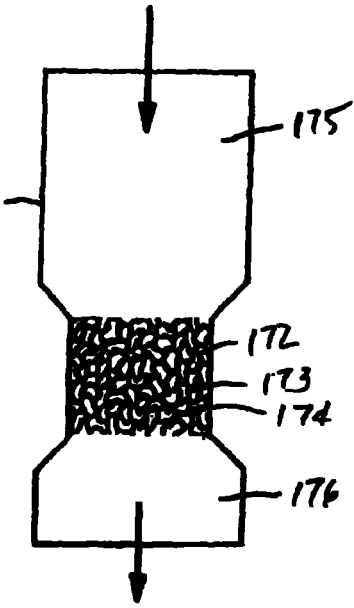
FIG. 9  FIG. 10  FIG. 11
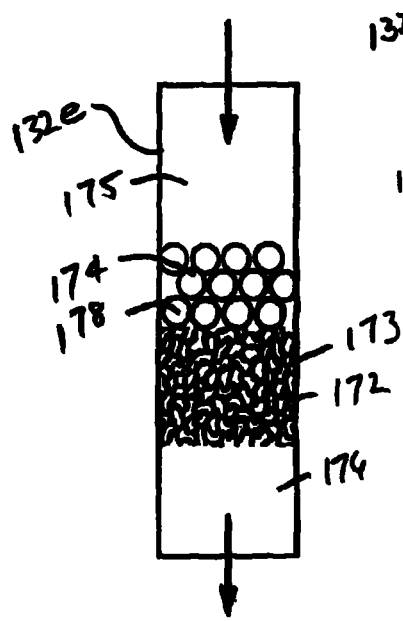 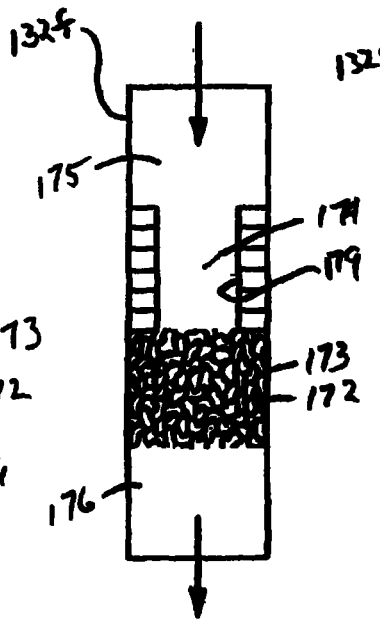 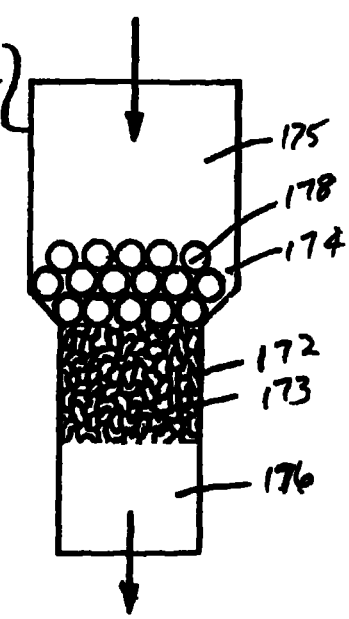
FIG. 12  FIG. 13  FIG. 14

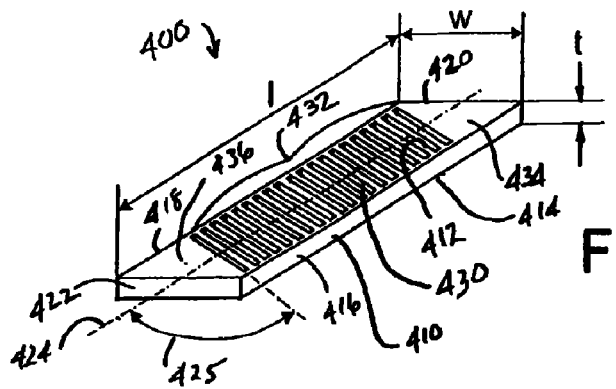
FIG. 23
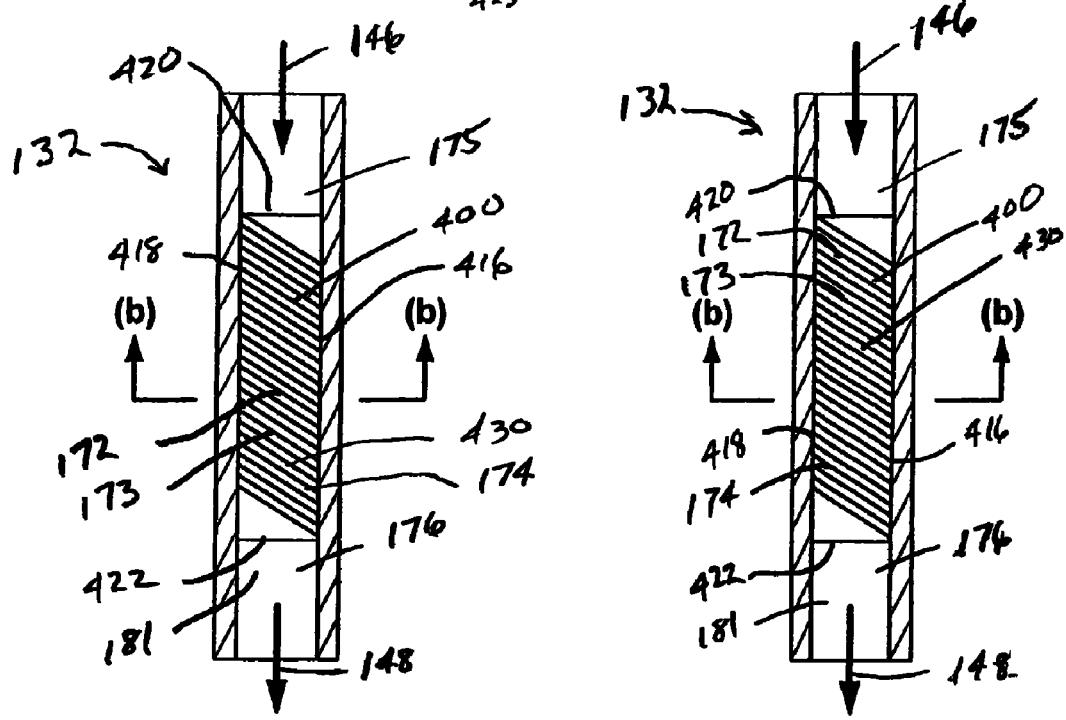
(a) (a)
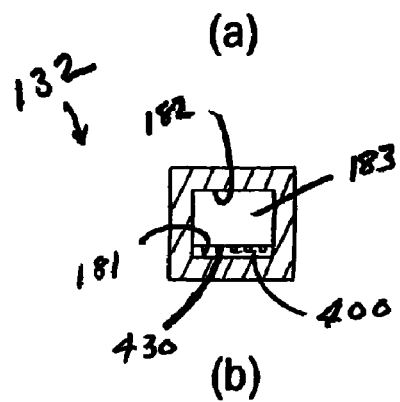
(b)
FIG. 24
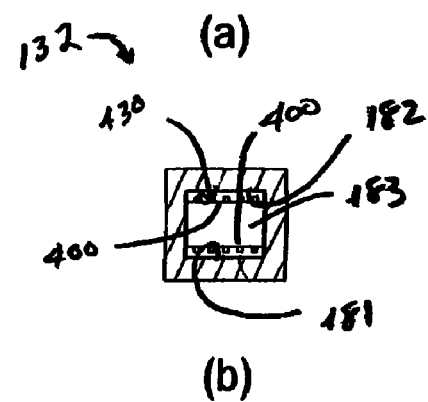
(b)
FIG. 25

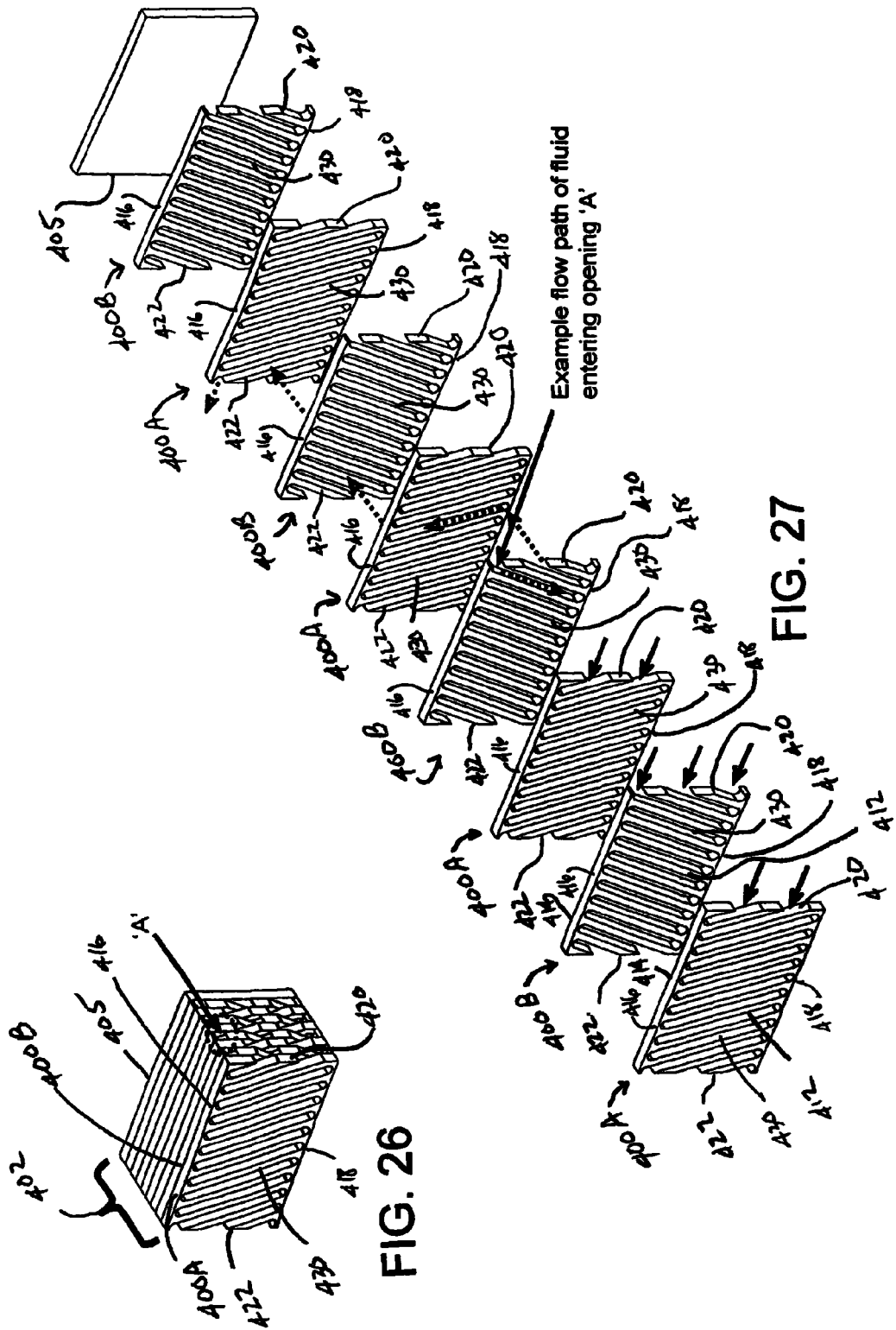

↑ axial flow direction

↗ axial flow direction

CATALYTIC REACTION PROCESS USING MICROCHANNEL TECHNOLOGY

This application claims priority under 35 U.S.C. §119(e) to U.S. Provisional Application Ser. No. 60/697,774, filed Jul. 8, 2005, and U.S. Provisional Application Ser. No. 60/814,469, filed Jun. 16, 2006. These prior applications are incorporated herein by reference.

TECHNICAL FIELD

The disclosed technology relates to a catalytic reaction process using microchannel technology.

BACKGROUND

Conventional tubular fixed bed reactors (TFBR) employed for Fischer-Tropsch (FT) synthesis reactions typically use relatively large catalyst pellets formed as spheres or cylinders with effective diameters of about 2 mm to about 6 mm. With these reactions selectivity to methane tends to increase with increasing diffusion distance into the catalyst. This is believed to be due to the difference in diffusivities between $H_2$ and CO leading to higher $H_2$ to CO ratios near or at the catalytic sites than in the bulk of the reactant fluid. Under Fischer-Tropsch process conditions the pores of the catalyst may be filled with liquid, be this aqueous, organic or a mixture. In addition to this a film of liquid product may cover the surface of the catalyst pellets; this may be product of the reaction or product of the reaction and liquids recycled to the reactor. Liquids fed or formed in the reactor may flow down the length of the reactor under the influence of gravity or the influence of gravity supplemented by the gaseous feed.

Conventionally it is held that the resistance to mass transfer in the pores dominates and this is overcome via either reducing the diffusion length to the catalytic site via reduction in particle diameter or by the use of larger catalyst particles in which the active metals are only deposited in a thin layer of the support close to the particle surface ('rim' or 'eggshell' type catalysts) thereby reducing the diffusion distance.

The influence of the liquid film formed on the surface of the catalyst particles has largely been ignored as in many cases reactors, both large and small scale, have been operated in regimes in which the influence of the reactor hydrodynamics is not apparent.

SUMMARY

The disclosed technology relates to a process using microchannel process technology wherein process conditions, catalyst form and/or reactor design considerations may be combined to provide for enhanced gas-liquid reactions employing a solid catalyst or enhanced gaseous reactions that employ a solid catalyst and yield a liquid product. With these reactions reduced mass transfer may occur as a result of the formation of liquid films on the catalyst, and with the disclosed technology reactor performance may be enhanced as measured by conversion and/or selectivity.

In one embodiment, the disclosed technology relates to a process for conducting a chemical reaction between at least one liquid reactant and at least one gaseous reactant in a process microchannel containing at least one catalyst, the catalyst comprising a solid phase catalyst or a homogeneous catalyst immobilized on a solid, the process microchannel comprising a processing zone containing one or more internal obstructions and a reaction zone containing one or more structures for contacting and/or supporting the catalyst, the one or more structures for contacting and/or supporting the catalyst containing openings to permit the reactants to flow in the one or more structures for contacting and/or supporting the catalyst, the process comprising: forming a reactant mixture comprising the at least one liquid reactant and the at least one gaseous reactant; flowing the reactant mixture in the processing zone in contact with the one or more internal obstructions to enhance mixing of the liquid reactant and the gaseous reactant; flowing the reactant mixture in openings in the one or more structures for contacting and/or supporting the catalyst and contacting the catalyst; and reacting the at least one liquid reactant with the at least one gaseous reactant to form at least one product.

In one embodiment, the disclosed technology relates to a process for conducting a chemical reaction between at least one first reactant and at least one second reactant in a process microchannel containing at least one catalyst, the catalyst comprising a solid phase catalyst or a homogeneous catalyst immobilized on a solid, the catalyst being positioned in a reaction zone in the process microchannel, the process microchannel comprising at least one first processing zone with a first open cross-sectional area upstream of the reaction zone and at least one second processing zone with a second open cross-sectional area in the reaction zone and/or between the reaction zone and the first processing zone, the second open cross-sectional area being smaller than the first open cross-sectional area, the process comprising: flowing at least one of the reactants in the process microchannel through the first processing zone and then through the second processing zone; the reactants comprising at least one liquid and at least one gas, or gases that form at least one liquid product; the local velocity of the at least one reactant increasing as the at least one reactant flows from the first processing zone to and through the second processing zone; contacting the at least one catalyst with the at least one first reactant and at least one second reactant; forming a liquid film layer on the at least one catalyst; and reacting the at least one first reactant with the at least one second reactant to form at least one product.

In one embodiment, the disclosed technology relates to a process for conducting a chemical reaction in a process microchannel containing at least one catalyst, the catalyst comprising a solid phase catalyst or a homogeneous catalyst immobilized on a solid, the catalyst being positioned in a reaction zone in the process microchannel, the process microchannel comprising at least one first processing zone with a first open cross-sectional area upstream of the reaction zone and at least one second processing zone with a second open cross-sectional area in the reaction zone and/or between the reaction zone and the first processing zone, the second open cross-sectional area being smaller than the first open cross-sectional area, the process comprising: flowing at least one reactant composition in the process microchannel through the first processing zone and then through the second processing zone; the at least one reactant composition comprising at least one liquid and at least one gas, or gases that form at least one liquid product; the local velocity of the at least one reactant composition increasing as the at least one reactant composition flows from the first processing zone to and through the second processing zone; contacting the at least one catalyst with the at least one reactant composition; forming a liquid film layer on the at least one catalyst; and reacting the at least one reactant composition to form at least one product.

In one embodiment, the disclosed technology relates to a process for conducting a Fischer-Tropsch synthesis reaction in a process microchannel containing at least one Fischer-Tropsch synthesis catalyst, the catalyst comprising a solid phase catalyst or a homogeneous catalyst immobilized on a solid, the process comprising: flowing reactants comprising $H_2$ and CO in the process microchannel, the inlet superficial velocity of the reactants being at least about 0.1 m/s; contacting the Fischer-Tropsch synthesis catalyst with the reactants; and reacting the reactants in the presence of the catalyst to form at least one product.

In one embodiment, the disclosed technology relates to a process for conducting a Fischer-Tropsch synthesis in a process microchannel containing at least one Fischer-Tropsch synthesis catalyst, the catalyst comprising a solid phase catalyst or a homogeneous catalyst immobilized on a solid, the catalyst being positioned in a reaction zone in the process microchannel, the process microchannel comprising at least one first processing zone with a first open cross-sectional area upstream of the reaction zone and at least one second processing zone with a second open cross-sectional area in the reaction zone and/or between the reaction zone and the first processing zone, the second open cross-sectional area being smaller than the first open cross-sectional area, the process comprising: flowing reactants comprising $H_2$ and CO in the process microchannel through the first processing zone and then through the second processing zone, the local velocity of the reactants increasing as the reactants flow from the first processing zone to and through the second processing zone; contacting the Fischer-Tropsch synthesis catalyst with the reactants; forming a liquid film layer on the catalyst; and reacting the reactants in the presence of the catalyst to form at least one product.

BRIEF DESCRIPTION OF THE DRAWINGS

In the annexed drawings, like parts and features have like designations.

FIG. 1 is a schematic illustration of a microchannel that may be used with the disclosed process.

FIG. 2 is a schematic illustration of a microchannel reactor that may be used with the disclosed process. The microchannel reactor comprises a microchannel reactor core, a feed stream header, a product footer, a heat exchange fluid inlet header, and a heat exchange fluid outlet footer.

FIG. 3 is a schematic illustration of a layer of process microchannels and a layer of heat exchange microchannels that may be used in the microchannel reactor shown in FIG. 2.

FIGS. 9-14 are schematic illustrations of process microchannels that may be used in the microchannel reactor core of the microchannel reactor illustrated in FIG. 2. FIG. 9 illustrates a process microchannel which comprises a reaction zone, a first processing zone and a second processing zone. The reaction zone comprises the second processing zone. The first processing zone is upstream from the reaction zone. The reaction zone has a smaller cross-sectional area than the first processing zone. The process microchannel also has an additional zone downstream of the reaction zone.

FIG. 10 illustrates a process microchannel which comprises a reaction zone, a first processing zone and a second processing zone. The first processing zone is upstream from the reaction zone. The second processing zone is positioned between the first processing zone and the reaction zone. The second processing zone has a smaller cross-sectional area than the first processing zone. The process microchannel also has an additional zone downstream of the reaction zone.

FIG. 11 illustrates a process microchannel which comprises a reaction zone, a first processing zone, a second processing zone, and an additional zone. The reaction zone comprises the second processing zone. The first processing zone is upstream from the reaction zone. The additional zone is downstream from the reaction zone. The reaction zone has a smaller cross-sectional area than the first processing zone and the additional zone.

FIG. 12 illustrates a process microchannel comprising a reaction zone, a first processing zone and a second processing zone. The second processing zone comprises internal obstructions in the form of spherical objects. The second processing zone is positioned between the reaction zone and the first processing zone. As a result of the presence of the internal obstructions in the second processing zone, the second processing zone has a smaller open cross-sectional area than the first processing zone. The process microchannel also has an additional zone downstream of the reaction zone.

FIG. 13 illustrates a process microchannel comprising a reaction zone, a first processing zone upstream from the reaction zone, and a second processing zone positioned between the first processing zone and the reaction zone. The second processing zone comprises surface features on the interior walls of the channel. The surface features provide for reducing the open cross-sectional area of the second processing zone and for modifying the flow of fluid in the second processing zone. The process microchannel also has an additional zone downstream of the reaction zone.

FIG. 14 illustrates a process microchannel comprising a reaction zone, a first processing zone upstream from the reaction zone and a second processing zone positioned between the reaction zone and the first processing zone. The first processing zone and the second processing zone having cross-sectional areas that are wider than the cross-sectional area of the reaction zone. The second processing zone contains internal obstructions in the form of spherical objects. The presence of these internal obstructions has the effect of reducing the open cross-sectional area of the second processing zone. Thus, the second processing zone has a smaller open cross-sectional area than the first processing zone. The process microchannel also has an additional zone downstream of the reaction zone.

FIG. 23 is a schematic illustration of a microgrooved support strip that may be used to support a catalyst. The support strip may be used in the microchannel reactor illustrated in FIG. 2. The support strip comprises a plurality of parallel microgrooves, a top surface, a bottom surface, a front edge, a back edge and side edges. The microgrooves are formed in the top surface. The microgrooves may penetrate part way or all the way through the support strip. Penetration of the microgrooves all the way through the support strip may permit fluid to flow through the microgrooves in the direction from the top surface to the bottom surface, or vice versa.

FIG. 24(a) is a schematic illustration of a process microchannel that may be used in the microchannel reactor illustrated in FIG. 2. The process microchannel contains a microgrooved support strip as illustrated in FIG. 23, the microgrooved support strip supporting a catalyst. FIG. 24(b) is a cross-sectional view of the process microchannel illustrated in FIG. 24(a) taken along line (b)-(b) in FIG. 24(a).

FIG. 25 is a schematic illustration of a process microchannel that may be used in the microchannel reactor illustrated in FIG. 2. The process microchannel is similar to the process microchannel illustrated in FIG. 24(a) with the exception that the process microchannel illustrated in FIG. 25(a) contains opposite interior walls and a catalyst supporting microgrooved support strip positioned on each of the opposite interior walls. FIG. 25(b) is a cross-sectional view of the process microchannel illustrated in FIG. 25(a) taken along line (b)-(b) of FIG. 25(a).

FIG. 26 is a schematic illustration showing a plurality of microgrooved support strips stacked one above another forming a composite support structure, the front and back edges of each of the microgrooved support strips being open sufficiently to permit fluid to flow through such edges. The microgrooves in each of the support strips project through the support strips sufficiently to permit fluid to flow through the support strips from one support strip to another. The composite support structure may be used in the reaction zones of any of the process microchannels described herein.

FIG. 27 is a schematic illustration of an exploded view of the composite support structure illustrated in FIG. 26. The support structure illustrated in FIG. 27 comprises four (4) first microgrooved support strips and four (4) second microgrooved support strips positioned side by side in alternating sequence. The microgrooves in each of the support strips project through the support strips sufficiently to permit fluid to flow through the support strips from one support strip to another. The first microgrooved support strips employ microgrooves that form angles with the center axis of the support strips that are oriented toward the front edges and first side edges of the support strips and are more than about 0° and less than 90°, for example, in the range from about 60° to about 80°. The second microgrooved support strips employ microgrooves that form angles with the center axis of the support strips that are oriented toward the front edges and first side edges of the support strips and are more than 90° and less than about 180°, for example, in the range from about 100° to about 120°.

FIG. 55 is a schematic illustration of a cross-sectional view of a process microchannel containing the internal obstructions and/or structures. FIG. 56 is a top plan view of the process microchannel illustrated in FIG. 55 with the top wall rendered transparent in order to view the underlying inter-connected oblique angles. FIG. 57 is a three-dimensional view of the structure illustrated in FIGS. 55 and 56. The upper wall in FIG. 57 is partially cut away to reveal the underlying inter-connected oblique angles. The oblique angles may be referred to as surface features.

DETAILED DESCRIPTION

Figure 4:
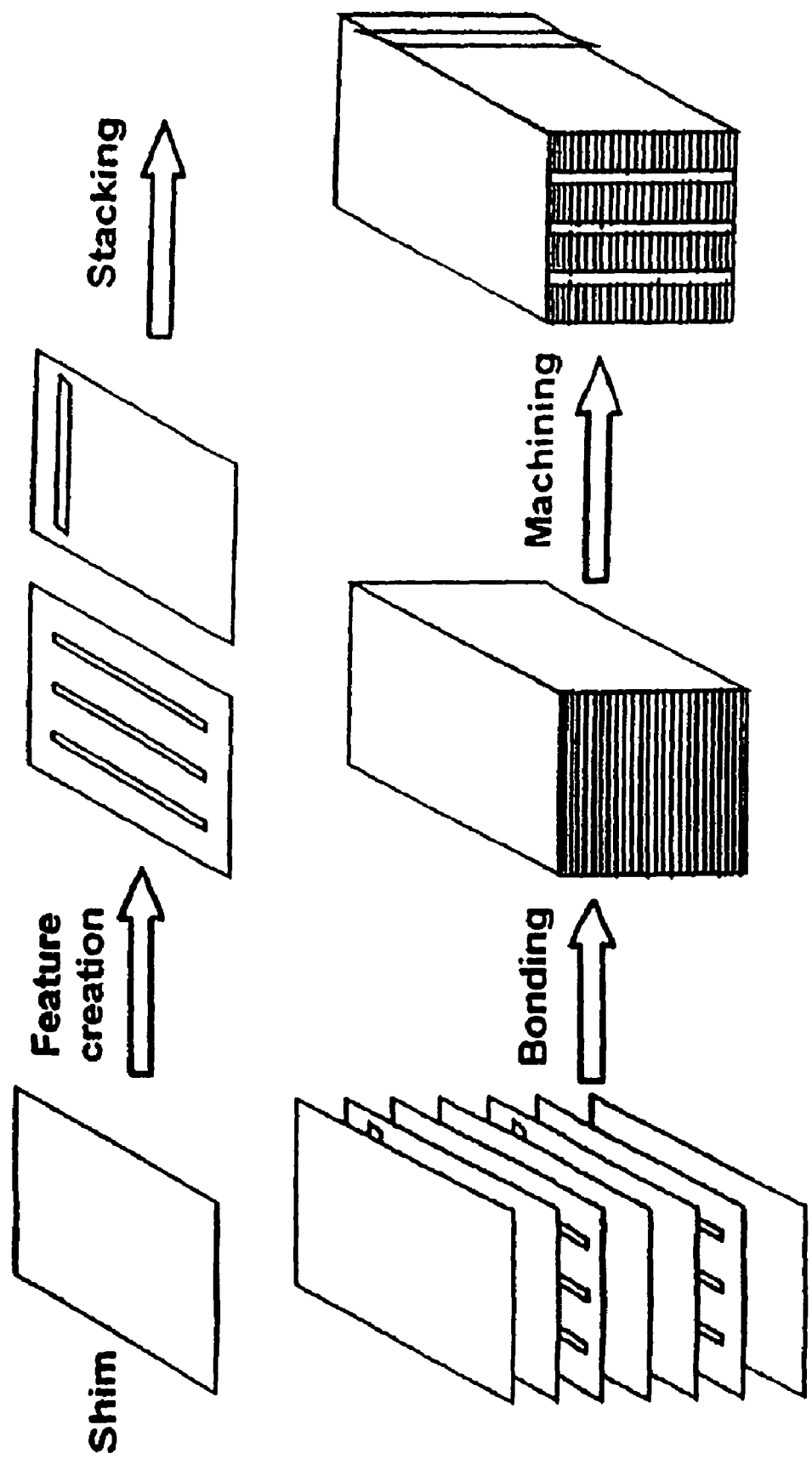
FIG. 4 is a schematic illustration showing a process for assembling a microchannel reactor core that may be used in the microchannel reactor shown in FIG. 2.

The term "microchannel" may refer to a channel having at least one internal dimension of height or width of up to about 10 millimeters (mm), and in one embodiment up to about 5 mm, and in one embodiment up to about 2 mm, and in one embodiment up to about 1 mm. The height or width may be referred to as a gap. The bulk flow of fluid in the microchannel may proceed along the length of the microchannel normal to the height and width of the microchannel. The length of the microchannel may not be the shortest dimension of the microchannel. The microchannel may comprise at least one inlet and at least one outlet wherein the at least one inlet is distinct from the at least one outlet. The microchannel may not be merely a channel through a zeolite or a mesoporous material. The microchannel may not be merely an orifice. An example of a microchannel is illustrated in FIG. 1. The microchannel 10 illustrated in FIG. 1 has a height (h), width (w) and length (l). Fluid may flow in the microchannel 10 along the length of the microchannel in the direction indicated by arrows 12 and 14. The height (h) or width (w) of the microchannel may be in the range of about 0.05 to about 10 mm, and in one embodiment from about 0.05 to about 5 mm, and in one embodiment from about 0.05 to about 2 mm, and in one embodiment from about 0.05 to about 1.5 mm, and in one embodiment from about 0.05 to about 1 mm, and in one embodiment about from 0.05 to about 0.75 mm, and in one embodiment from about 0.05 to about 0.5 mm. The other dimension of height or width may be of any dimension, for example, up to about 3 meters, and in one embodiment from about 0.01 to about 3 meters, and in one embodiment about 0.1 to about 3 meters. The length (l) of the microchannel may be of any dimension, for example, up to about 10 meters, and in one embodiment from about 0.2 to about 10 meters, and in one embodiment from about 0.2 to about 6 meters, and in one embodiment from about 0.2 to about 3 meters. Although the microchannel 10 illustrated in FIG. 1 has a cross section that is rectangular, it is to be understood that the microchannel may have a cross section having any shape, for example, a square, circle, semi-circle, trapezoid, etc. The shape and/or size of the cross section of the microchannel may vary over its length. For example, the height or width may taper from a relatively large dimension to a relatively small dimension, or vice versa, over the length of the microchannel.

The term "process microchannel" may refer to a microchannel wherein a reaction process occurs. The process microchannel may contain at least one catalyst. One or more reactants may flow in the process microchannel and react to form one or more products.

The term "sub-microchannel" may refer to a channel that is positioned within a microchannel and has at least one internal dimension of height or width of up to about 1 mm, and in one embodiment up to about 500 microns, and in one embodiment up to about 200 microns, and in one embodiment up to about 100 microns. The height or width may be referred to as a gap. The bulk flow of fluid in the sub-microchannel may proceed along the length of the microchannel normal to the height and width of the sub-microchannel. The length of the sub-microchannel may not be the shortest dimension of the sub-microchannel. The sub-microchannel may comprise at least one inlet and at least one outlet wherein the at least one inlet is distinct from the at least one outlet. The sub-microchannel may not be merely a channel through a zeolite or a mesoporous material. The sub-microchannel may not be merely an orifice. The height or width of the sub-microchannel may be in the range of about 20 microns to about 1 mm, and in one embodiment from about 50 microns to about 1 mm, and in one embodiment from about 100 microns to about 1 mm, and in one embodiment from about 200 microns to about 1 mm. The other dimension of height or width may be of any dimension, for example, up to about 3 meters, and in one embodiment from about 100 microns to about 3 meters, and in one embodiment about 1 mm to about 3 meters. The length of the sub-microchannel may be of any dimension, for example, up to about 10 meters, and in one embodiment from about 1 cm to about 10 meters, and in one embodiment from about 2 cm to about 6 meters, and in one embodiment from about 5 cm to about 3 meters. The sub-microchannel may have a cross section having any shape, for example, a square, rectangle, circle, semi-circle, trapezoid, etc. The shape and/or size of the cross section of the microchannel may vary over its length.

The term "microchannel reactor" may refer to an apparatus comprising at least one process microchannel. The microchannel reactor may comprise a plurality of the process microchannels which may be operated in parallel, a feed stream header or manifold assembly for providing for the flow of fluid into the process microchannels, and a product footer or manifold assembly providing for the flow of fluid out of the process microchannels. The microchannel reactor may further comprise at least one heat source and/or heat sink. The heat source and/or heat sink may comprise one or more heat exchange channels, for example one or more heat exchange microchannels, adjacent to and/or in thermal contact with the process microchannels for cooling and/or heating the fluids in the process microchannels. The microchannel reactor may be in the form of a staged addition reactor wherein second reactant stream channels may be positioned adjacent to the process microchannels. The mixing of reactants may occur upstream of the microchannel reactor, in the header or manifold assembly and/or in the process microchannels.

The term "adjacent" when referring to the position of one channel relative to the position of another channel may mean directly adjacent such that a wall or walls separate the two channels. In one embodiment, the two channels may have a common wall. The common wall may vary in thickness. However, "adjacent" channels may not be separated by an intervening channel that may interfere with heat transfer between the channels. One channel may be adjacent to another channel over only part of the dimension of the another channel. For example, a process microchannel may be longer than and extend beyond one or more adjacent heat exchange channels.

The term "thermal contact" may refer to two bodies, for example, two channels, that may or may not be in physical contact with each other or adjacent to each other but still exchange heat with each other. One body in thermal contact with another body may heat or cool the other body.

The term "fluid" may refer to a gas, a liquid, a mixture of a gas and a liquid, or a gas or a liquid containing dispersed solids, liquid droplets and/or gaseous bubbles.

The term "process fluid" may be used herein to refer to reactants, product and any diluent or other fluid that may flow in a process microchannel.

The term "immiscible" may refer to one liquid not being soluble in another liquid or only being soluble to the extent of up to about 1 milliliter per liter at 25° C.

The term "contact time" may refer to the volume of a reaction zone within a microchannel divided by the volumetric feed flow rate of the reactants at a temperature of 0° C. and a pressure of one atmosphere.

The term "residence time" or "average residence time" may refer to the internal volume of a space (e.g., the reaction zone within a microchannel reactor) occupied by a fluid flowing in the space divided by the average volumetric flowrate for the fluid flowing in the space at the temperature and pressure being used.

The term "reaction zone" may refer to the space within a microchannel wherein a chemical reaction occurs or wherein a chemical conversion of at least one species occurs. The reaction zone may contain one or more catalysts.

The term "volume" with respect to volume within a microchannel, for example the reaction zone of a microchannel, may include all volume in the microchannel for which a process fluid may flow-through or flow-by. This volume may include the volume within a catalyst support, for example, microgrooves of a microgrooved support or pores in a porous support, that may be positioned in the microchannel and adapted for the flow of fluid in a flow-through manner or in a flow-by manner. This volume may include volume within surface features that may be positioned in the microchannel and adapted for the flow of fluid in a flow-through manner or in a flow-by manner.

The terms "upstream" and "downstream" may refer to positions within a channel (e.g., a process microchannel) that is relative to the direction of flow of a fluid stream in the channel. For example, a position within the channel not yet reached by a portion of a fluid stream flowing toward that position would be downstream of that portion of the fluid stream. A position within the channel already passed by a portion of a fluid stream flowing away from that position would be upstream of that portion of the fluid stream. The terms "upstream" and "downstream" do not necessarily refer to a vertical position since the channel used herein may be oriented horizontally, vertically or at an inclined angle. The term "shim" may refer to a planar or substantially planar sheet or plate.

The thickness of the shim may be the smallest dimension of the shim and may be up to about 2 mm, and in one embodiment in the range from about 0.05 to about 2 mm, and in one embodiment in the range of about 0.05 to about 1 mm, and in one embodiment in the range from about 0.05 to about 0.5 mm. The shim may have any length and width.

The term "surface feature" may refer to a depression in a microchannel wall and/or a projection from a microchannel wall that modifies flow and/or mixing within the microchannel. The surface features may be in the form of circles, spheres, frustums, oblongs, squares, rectangles, angled rectangles, checks, chevrons, vanes, air foils, wavy shapes, and the like. The surface features may contain subfeatures where the major walls of the surface features further contain smaller surface features that may take the form of notches, waves, indents, holes, burrs, checks, scallops, and the like. The surface features may have a depth, a width, and for non-circular surface features a length. Examples include those illustrated in FIGS. 36-37. The surface features may be formed on or in one or more of the interior walls of the process microchannels used in accordance with the invention. The surface features may be formed on or in one or more of the interior walls of the heat exchange channels employed herein. The surface features may be referred to as passive surface features or passive mixing features. The surface features may be used to disrupt laminar flow streamlines and create advective flow at an angle to the bulk flow direction. This may enhance contact between fluid components or between fluid components and catalyst.

The term "microgroove" may refer to a groove in a substrate having a depth of up to about 5000 microns, and in one embodiment in the range from about 0.1 to about 5000 microns, and in one embodiment in the range from about 1 to about 2000 microns, and in one embodiment from about 1 to about 1000 microns. The microgrooves may penetrate all the way through the substrate over part or all of the length of the microgrooves. The microgrooves may penetrate only partially through the substrate. The depth of the microgrooves may be measured at the deepest point of penetration into the substrate. The microgrooves may have a width up to about 1000 microns, and in one embodiment in the range from about 0.1 to about 1000 microns, and in one embodiment in the range from about 1 to about 500 microns. The width may be the width measured at the widest point of the microgroove. The microgroove may have any length, for example, up to about 100 cm, and in one embodiment from about 0.1 to about 100 cm, and in one embodiment from about 0.1 to about 10 cm. The microgroove may have a cross section of any shape. Examples include square, rectangle, vee, semi-circle, dovetail, trapezoid, and the like. The shape and/or size of the cross section of the microgroove may vary over the length of the microgroove.

The term "heat source" may refer to a substance or device that gives off heat and may be used to heat another substance or device. The heat source may be in the form of a heat exchange channel having a heat exchange fluid in it that transfers heat to another substance or device; the another substance or device being, for example, a channel that is adjacent to and/or in thermal contact with the heat exchange channel. The heat exchange fluid may be in the heat exchange channel and/or it may flow through the heat exchange channel. The heat source may be in the form of a non-fluid heating element, for example, an electric heating element or a resistance heater.

The term "heat sink" may refer to a substance or device that absorbs heat and may be used to cool another substance or device. The heat sink may be in the form of a heat exchange channel having a heat exchange fluid in it that receives heat transferred from another substance or device; the another substance or device being, for example, a channel that is adjacent to and/or in thermal contact with the heat exchange channel. The heat exchange fluid may be in the heat exchange channel and/or it may flow through the heat exchange channel. The heat sink may be in the form of a cooling element, for example, a non-fluid cooling element. The heat sink may be in the form of a Peltier electronic element.

The term "heat source and/or heat sink" may refer to a substance or a device that may give off heat and/or absorb heat. The heat source and/or heat sink may be in the form of a heat exchange channel having a heat exchange fluid in it that transfers heat to another substance or device adjacent to and/or in thermal contact with the heat exchange channel when the another substance or device is to be heated, or receives heat transferred from the another substance or device adjacent to or in thermal contact with the heat exchange channel when the another substance or device is to be cooled. The heat exchange channel functioning as a heat source and/or heat sink may function as a heating channel at times and a cooling channel at other times. A part or parts of the heat exchange channel may function as a heating channel while another part or parts of the heat exchange channel may function as a cooling channel.

The term "heat exchange channel" may refer to a channel having a heat exchange fluid in it that may give off heat and/or absorb heat.

The term "heat transfer wall" may refer to a common wall between a process microchannel and an adjacent heat exchange channel where heat transfers from one channel to the other through the common wall. The heat transfer wall may have one or more heat conductive catalyst supports (e.g., one or more microgrooved support strips) in thermal contact with it to enhance heat transfer between a catalyst supported by the support and the heat exchange channel.

The term "heat exchange fluid" may refer to a fluid that may give off heat and/or absorb heat.

The term "liquid film" may refer to a liquid phase on a solid phase. A gas phase may overlie the liquid film. The term "liquid film thickness" may refer to the distance from the solid phase-liquid film interface to the liquid film-gas phase interface.

The term "conversion of reactant" may refer to the reactant mole change between a fluid entering a microchannel reactor and a fluid exiting the microchannel reactor divided by the moles of reactant in the fluid entering the microchannel reactor.

The term "yield" may refer to the number of moles of product exiting a microchannel reactor divided by the number of moles of a reactant entering the microchannel reactor.

The term "cycle" may refer to a single pass of the reactants through a microchannel reactor.

The term "hydrocarbon" may refer to purely hydrocarbon compounds; that is, aliphatic compounds, (e.g., alkane, alkene or alkyne), alicyclic compounds (e.g., cycloalkane, cycloalkylene), aromatic compounds, aliphatic- and alicyclic-substituted aromatic compounds, aromatic-substituted aliphatic compounds, aromatic-substituted alicyclic compounds, and the like. Examples may include methane, ethane, ethylene, propane, propylene, cyclohexane, ethyl cyclohexane, toluene, the xylenes, ethyl benzene, styrene, etc. The term "hydrocarbon" may refer to substituted hydrocarbon compounds; that is, hydrocarbon compounds containing non-hydrocarbon substituents. Examples of the non-hydrocarbon substituents may include hydroxyl, acyl, nitro, etc. The term "hydrocarbon" may refer to hetero substituted hydrocarbon compounds; that is, hydrocarbon compounds which contain atoms other than carbon in a chain or ring otherwise containing carbon atoms. Suitable hetero atoms may include, for example, nitrogen, oxygen and sulfur.

The term "conversion of CO" may refer to the CO mole change between the reactant composition and product divided by the moles of CO in the reactant composition.

The term "selectivity to methane" may refer to the moles of methane in the product divided by the moles of methane plus two times the number of moles of $C_2$ hydrocarbons in the product, plus three times the number of moles of $C_3$ hydrocarbons in the product, plus four times the number of moles of $C_4$ hydrocarbons in the product, etc., until all of the moles of hydrocarbons in the product have been included.

The term "one-pass conversion of CO" may refer to the conversion of CO after one pass through a microchannel reactor. The term "metal dispersion" may refer to the percent of catalytically active metal atoms and promoter atoms on the surface of the catalyst as compared to the total number of metal atoms in the catalyst as measured by hydrogen chemisorption which is described in "Heterogeneous Catalysis in Industrial Practice," $2^{nd}$ ed., Charles N. Satterfield, p. 139, McGraw Hill (1996), which is incorporated herein by reference.

The term "Co loading" refers to the weight of Co in a catalyst divided by the total weight of the catalyst, that is, the total weight of the Co plus any co-catalyst or promoter as well as the support. If the catalyst is supported on an engineered support structure such as a foam, felt, wad, fin or microgrooved support, the weight of the engineered support structure is not to be included in the calculation. Similarly, if the catalyst is adhered to the microchannel walls, the weight of the microchannel walls is not to be included in the calculation.

The term "bulk flow direction" may refer to the vector through which fluid may travel in an open path in a channel.

The term "bulk flow region" may refer to open areas within a microchannel. A contiguous bulk flow region may allow rapid fluid flow through a microchannel without significant pressure drops. In one embodiment there may be laminar flow in the bulk flow region. A bulk flow region may comprise at least about 5% of the internal volume and/or cross-sectional area of a microchannel, and in one embodiment from about 5% to about 100%, and in one embodiment from about 5% to about 99%, and in one embodiment about 5% to about 95%, and in one embodiment from about 5% to about 90%, and in one embodiment from about 30% to about 80% of the internal volume and/or cross-sectional area of the microchannel.

The terms "open channel" or "flow-by channel" or "open path" may refer to a channel (e.g., a microchannel) with a gap of at least about 0.01 mm that extends all the way through the channel such that fluid may flow through the channel without encountering a barrier to flow. The gap may extend up to about 10 mm.

The term "cross-sectional area" of a channel (e.g., process microchannel) may refer to an area measured perpendicular to the direction of the bulk flow of fluid in the channel and may include all areas within the channel including any catalyst that may be present (e.g., catalyst particles, catalyst monolith and/or catalyst wall coating), but does not include the channel walls. For channels that curve along their length, the cross-sectional area may be measured perpendicular to the direction of bulk flow at a selected point along a line that parallels the length and is at the center (by area) of the channel. Dimensions of height and width may be measured from one channel wall to the opposite channel wall. These dimensions may not be changed by application of a coating to the surface of the wall. These dimensions may be average values that account for variations caused by surface roughness, corrugations, and the like.

The term "open cross-sectional area" of a channel (e.g., process microchannel) may refer to an area open for bulk fluid flow in a channel measured perpendicular to the direction of the bulk flow of fluid flow in the channel. The open cross-sectional area may not include catalyst or internal obstructions such as spheres, surface features and the like which may be present.

The term "superficial velocity" for the velocity of a fluid flowing in a channel may refer to the velocity resulting from dividing the volumetric flow rate of the fluid at the inlet temperature and pressure of the channel divided by the cross-sectional area of the channel.

The term "free stream velocity" may refer to the velocity of a stream flowing in a channel at a sufficient distance from the sidewall of the channel such that the velocity is at a maximum value. The velocity of a stream flowing in a channel is zero at the sidewall but increases as the distance from the sidewall increases until a constant value is achieved. This constant value is the "free stream velocity."

The term "local velocity" for the velocity of a fluid flowing in a channel may refer to the volumetric flow rate of the fluid at the inlet temperature and pressure divided by the open cross-sectional area of the channel at a specific location along the length of the channel.

The term "dynamic pressure" may refer to the energy of a fluid flowing in a channel and may be defined as the square of the mass flux rate over the cross-sectional area divided by twice the density of the fluid at the inlet temperature and pressure.

The term "superficial mass flux rate" may refer to the mass flow rate that passes through an open cross-sectional area divided by the cross-sectional area. A more general definition of the "mass flux rate" may be the mass flow rate divided by the cross-sectional area.

The term "alpha number" may refer to a parameter derived from the Anderson-Schultz-Flory distribution and can be determined by analyzing the hydrocarbons produced and determining the weight fraction of each carbon number, then making a plot of the carbon number versus common logarithm (base 10) of each weight fraction divided by its respective carbon number. The slope of such a graph is the carbon number. For example, if a hydrocarbon sample weighing 5 grams contains 1 gram of $C_{13}$ hydrocarbons, the weight fraction for a carbon number of 13 is 0.2.

The term "graded catalyst" may refer to a catalyst with one or more gradients of catalytic activity. The graded catalyst may have a varying concentration or surface area of a catalytically active metal. The graded catalyst may have a varying turnover rate of catalytically active sites. The graded catalyst may have physical properties and/or a form that varies as a function of distance. For example, the graded catalyst may have an active metal concentration that is relatively low at the entrance to a process microchannel and increases to a higher concentration near the exit of the process microchannel; or a lower concentration of catalytically active metal nearer the center (i.e., midpoint) of a process microchannel and a higher concentration nearer a process microchannel wall, etc. The thermal conductivity of a graded catalyst may vary from one location to another within a process microchannel. The surface area of a graded catalyst may be varied by varying size of catalytically active metal sites on a constant surface area support, or by varying the surface area of the support such as by varying support type or particle size. A graded catalyst may have porous support or a microgrooved support where the surface area to volume ratio of the support is higher or lower in different parts of the process microchannel followed by the application of the same catalyst coating everywhere. A combination of two or more of the preceding embodiments may be used. The graded catalyst may have a single catalytic component or multiple catalytic components (for example, a bimetallic or trimetallic catalyst). The graded catalyst may change its properties and/or composition gradually as a function of distance from one location to another within a process microchannel. The graded catalyst may comprise rimmed particles that have "eggshell" distributions of catalytically active metal within each particle. The graded catalyst may be graded in the axial direction along the length of a process microchannel or in the lateral direction. The graded catalyst may have different catalyst compositions, different loadings and/or numbers of active catalytic sites that may vary from one position to another position within a process microchannel. The number of catalytically active sites may be changed by altering the porosity of the catalyst structure. This may be accomplished using a washcoating process that deposits varying amounts of catalytic material. An example may be the use of different porous catalyst thicknesses along the process microchannel length, whereby a thicker porous structure may be left where more activity is required. A change in porosity for a fixed or variable porous catalyst thickness may also be used. A first pore size may be used adjacent to an open area or gap for flow and at least one second pore size may be used adjacent to the process microchannel wall.

The term "chain growth" may refer to the growth in a molecule resulting from a reaction in which the molecule grows with the addition of new molecular structures (e.g., the addition of monomer units to a polymer chain in a polymerization reaction or the addition of methylene groups to a hydrocarbon chain in a Fischer-Tropsch synthesis).

The term "mm" may refer to millimeter. The term "nm" may refer to nanometer. The term "ms" may refer to millisecond. The term "µs" may refer to microsecond. The term "µm" may refer to micron or micrometer. The terms "micron" and "micrometer" have the same meaning and may be used interchangeably.

Unless otherwise indicated, all pressures are expressed in terms of absolute pressure.

The inventive process may be suitable for conducting any chemical reaction wherein the reaction is conducted in the presence of a solid phase catalyst or a homogeneous catalyst that is immobilized on a solid support, and liquid and gaseous phases are used. The reaction may involve the use of one or more reactants. When one reactant is used, either the liquid or gaseous phase may comprise a diluent. One or more gaseous reactants that react to form liquid reaction products may be used. The liquid and gaseous phases may be separate or they may be combined to form a reactant mixture. The reactants may comprise a first reactant and a second reactant. The reactants may comprise at least one liquid reactant and at least one gaseous reactant. The reactions that may be conducted in accordance with the disclosed technology may include Fischer-Tropsch synthesis reactions, oxidation reactions, hydrocracking reactions, hydrogenation reactions including selective hydrogenations, hydration reactions, carbonylation reactions, dimerization reactions, trimerization reactions, oligomerization reactions, polymerization reactions, and the like. The reactions may include de-sulfurization reactions, hydrogen peroxide synthesis via direct reaction of hydrogen with oxygen or via cyclic reduction of anthraquinone or its derevatives, selective oxidations including selective oxidations of alcohols to aldehydes or carbonyls, wet oxidation of pollutants, hydrotreating reactions, hydrocracking reactions, alkylation reactions, acylation reactions, photocatalytic reactions, or a combination of two or more thereof.

The first reactant may comprise one or more fluids, that is a liquid, a gas, or a mixture thereof. When the first reactant comprises more than one liquid, the resulting liquid mixture may be in the form of a solution or a multiphase liquid mixture (for example, an emulsion). The first reactant may further comprise solids dispersed in the one or more liquids.

The second reactant may comprise one or more gases. The second reactant may comprise a gas containing dispersed liquid droplets. The second reactant, when mixed with the first reactant to form a reactant mixture, may form gas bubbles in the first reactant.

In one embodiment, one or more of the reactants may comprise a critical fluid, for example, supercritical $CO_2$.

The purity of the reactants may not be critical, though it is desirable to avoid the presence of compounds which may poison the catalyst. The reactants may comprise impurities that are not reactive with the reactants and/or products.

One or more of the reactants may be combined with one or more diluent materials. Examples of such diluents may include nitrogen, helium, non-reactive hydrocarbon diluents, and the like. The diluent concentration of each of the reactants may be in the range from zero to about 99% by weight, and in one embodiment from zero to about 75% by weight, and in one embodiment from zero to about 50% by weight. Diluents may be combined with one or more of the reactants. Diluents may be used to reduce the viscosity of viscous liquid reactants. An advantage of at least one embodiment of the invention may be that when the use of such diluents is avoided, operation of the inventive process may be more efficient and compact.

In the foregoing reactions, a liquid film layer may form on the catalyst. Liquid film layers of this type tend to impose a relatively high mass transfer resistance to the gaseous reactants. This may be a limiting factor in increasing the overall reaction rate or conversion. The mass transfer rate of a gaseous reactant through a liquid film layer may be proportional to the thickness of the liquid film layer, and thus thinner layers of liquid film on the surface of a catalyst may be desirable.

Many of the reactions described herein may have more than one reactant and as such, the rate of diffusion of all the species to active catalyst sites in the catalyst may be important. For example, the Fischer-Tropsch synthesis reaction uses CO and $H_2$ as reactants. The combination of diffusion and reaction through liquid layers may put the larger and slower CO molecule at a lower concentration in the macro and micropores of the catalyst than the smaller and faster diffusing $H_2$. Locally, this may lead to a higher $H_2$:CO molar ratio as the distance into the catalyst increases. This may lead to an increase in methane production. If the liquid film layer on the catalyst is thinner, more CO may diffuse into the catalyst. This may increase the rate of reaction and lower the $H_2$:CO molar ratio in the catalyst. This may provide a product with a higher alpha number.

The thickness of the liquid film layer may be affected by fluid properties, local hydrodynamic behaviors and overall reactor hydraulic conditions, such as gas and liquid velocity, viscosity, liquid and gas generation rate and their ratio, etc. Higher gaseous phase velocities may lead to thinner liquid films, while higher liquid phase velocities may lead to thicker liquid films. Liquids with lower liquid viscosities may assist in providing for the formation of relatively thin liquid film layers, since these may cause less shear with a microchannel wall and require lower gas velocities to drive the film flow. Gases with higher viscosities may enhance thinning of the liquid film, since these tend to exert higher drag on the gas-liquid interface.

Microchannel reactors may provide advantages in forming thin liquid film layers and in turn increasing mass transfer and reaction rates. Due to the small gap sizes that are typical with microchannel reactors, the attainment of relatively high gas velocity gradients (du/dy) may be possible. As such the drag force acting on the gas-liquid interface to drive the liquid flow may be greater. A relatively high velocity for the flow of the liquid film may reduce the thickness of the film when the flow rate remains constant. However, there is a lower limit of the channel size that may be used to form the thin liquid film layer, i.e. the channel gap size has to be greater than the thicknesses of the liquid film layer.

Methods for determining liquid film thicknesses can be found in various fluid mechanics books or articles, an example being "Convective Boiling and Condensation" by John G. Collier, Oxford University Press, USA; Third Edition (Aug. 1, 1996), which is incorporated herein by reference.

The oxidation reactions may involve the reaction, in the presence of one or more oxidation catalysts, of one or more hydrocarbon compounds that are capable of undergoing an oxidation reaction with oxygen or a source of oxygen. The hydrocarbon compounds, which may be referred to as the first reactant, may be in the form of liquids, or they may be in the form of gases dispersed in one or more liquids. The oxygen or oxygen source, which may be referred to as the second reactant, may be in the form of a gas.

The hydrocarbon compounds that may be used in the oxidation reactions may include saturated aliphatic compounds (e.g., alkanes), unsaturated aliphatic compounds (e.g., alkenes, alkynes), aldehydes, alkyl substituted aromatic compounds, alkylene substituted aromatic compounds, and the like. The saturated aliphatic compounds may include alkanes containing 1 to about 25 carbon atoms per molecule, and in one embodiment 1 to about 20 carbon atoms, and in one embodiment 1 to about 10 carbon atoms. These may include straight chain alkanes, single and multiple branched chain alkanes, and cyclic alkanes including cyclic alkanes having one or more alkyl groups attached to the ring. These may include methane, ethane, propane, isopropane, butane, isobutane, pentane, cyclopentane, hexane, heptane, octane, 2-ethylhexane, nonane, decane, dodecane, and the like.

The unsaturated aliphatic compounds may include alkenes or alkylenes, and alkynes. The unsaturated aliphatic compounds may contain from 2 to about 25 carbon atoms, and in one embodiment from about 2 to about 20 carbon atoms, and in one embodiment from about 2 to about 10 carbon atoms. These may include straight chain alkenes, single and multiple branched chain alkenes, and cyclic alkenes including cyclic alkenes having one or more alkyl and/or alkene groups attached to the ring. These may include ethylene; propylene; 1-butene; 2-butene; isobutylene; 1-pentene; 2-pentene; 3-methyl-1-butene; 2-methyl-2-butene; 1-hexene; 2,3-dimethyl-2-butene; 1-heptene; 1-octene; 1-nonene; 1-decene; 1-dodecene; and the like.

The unsaturated aliphatic compounds may comprise polyenes. These may include dienes, trienes, and the like. These compounds may contain from 3 to about 25 carbon atoms per molecule, and in one embodiment from 3 to about 20 carbon atoms, and in one embodiment from about 3 to about 10 carbon atoms. Examples may include 1,2-propadiene (also known as allene); 1,3-butadiene; 2-methyl-1,3-butadiene (also known as isoprene); 1,3-pentadiene; 1,4-pentadiene; 1,5-hexadiene; 2,4-hexadiene; 2,3-dimethyl-1,3-butadiene; and the like.

The aldehydes may be saturated or unsaturated. They may be aliphatic and/or aromatic. The aldehydes may contain from 2 to about 25 carbon atoms per molecule, and in one embodiment about 2 to about 20 carbon atoms, and in one embodiment about 2 to about 10 carbon atoms. Examples may include formaldehyde; acetaldehyde; propionaldehyde; n-butyraldehyde; n-valeraldehyde; caproaldehyde; acrolein; tran-2-cis-6-nonadienal; n-heptylaldehyde; trans-2-hexenal; hexadeconal; benzaldehyde; phenylacetaldehyde; o-tolualdehyde; m-tolualdehyde; p-tolualdehyde; salicylaldehyde; p-hydroxybenzaldehyde; and the like.

The alkyl or alkylene substituted aromatic compounds may contain one or more alkyl or alkylene substituents. These compounds may be monocyclic (e.g., phenyl) or a polycyclic (e.g., naphthyl). These compounds may include alkyl substituted aromatic compounds containing one or more alkyl groups containing 1 to about 25 carbon atoms, and in one embodiment 1 to about 20 carbon atoms, and in one embodiment 1 to about 10 carbon atoms. These may also include the akylene substituted aromatic compounds containing one or more alkylene groups containing 2 to about 25 carbon atoms, and in one embodiment 2 to about 20 carbon atoms, and in one embodiment 2 to about 10 carbon atoms. Examples may include toluene, o-xylene, m-xylene, p-xylene, hemimellitene, pseudocumene, mesitylene, prehnitene, isodurene, durene, pentamethylbenzene, hexamethylbenzene, ethylbenzene, n-propylbenzene, cumene, n-butylbenzene, isobutylbenzene, sec-butylbenzene, tert-butylbenzene, p-cymene, styrene, and the like.

The oxygen or oxygen source used in the oxidation reactions may comprise molecular oxygen, air or other oxidants, such as nitrogen oxides, which may function as a source of oxygen. The oxygen source may be carbon dioxide, carbon monoxide or a peroxide (e.g., hydrogen peroxide). Gaseous mixtures containing oxygen, such as mixtures of oxygen and air, or mixtures of oxygen and an inert gas (e.g., helium, argon, etc.) or a diluent gas (e.g., carbon dioxide, water vapor, etc.) may be used.

The mole ratio of the hydrocarbon reactant to oxygen may range from about 0.2:1 to about 8:1, and in one embodiment from about 0.5:1 to about 4:1, and in one embodiment from about 1:1 to about 3:1. The mole ratio may be about 2:1 or higher, and in one embodiment about 2.5:1 or higher. The mole ratio may be about 1.8 or less.

The oxidation catalyst may comprise any catalyst that is useful as an oxidation catalyst. The catalyst may comprise any metal, metal oxide or mixed metal oxide of one or more of Mo, W, V, Nb, Sb, Sn, Pt, Pd, Cs, Zr, Cr, Mg, Mn, Ni, Co, Rh, Zn, Ir, Re, Ru and Ce. These catalysts may also comprise one or more alkali metals or alkaline earth metals or other transition metals, rare earth metals, or lanthanides.

Additionally elements such as P and Bi may be present. The catalyst may be supported, and if so, useful support materials include metal oxides (e.g., alumina, titania, zirconia), silica, mesoporous materials, zeolites, refractory materials, or combinations of two or more thereof.

The product formed by the oxidation reaction may comprise one or more oxygenates. The term "oxygenate" may be used to refer to a hydrocarbon compound that contains at least one oxygen. The oxygenates may include alcohols, epoxides, aldehydes, ketones, carboxylic acids, carboxylic acid anhydrides, esters, and the like. The oxygenates may include, with the exception of the epoxides and esters, one or more of the above-indicated oxygenates containing from 1 to about 25 carbon atoms per molecule, and in one embodiment from 1 to about 20 carbon atoms, and in one embodiment from 1 to about 10 carbon atoms. The epoxides and esters contain at least 2 carbon atoms, but in all other respects may include compounds within the above-indicated ranges, for example, from 2 to about 25 carbon atoms, etc. The alcohols may include monools and polyols. Examples may include methanol, ethyl alcohol, propyl alcohol, butyl alcohol, isobutyl alcohol, pentyl alcohol, cyclopentyl alcohol, crotyl alcohol, hexyl alcohol, cyclohexyl alcohol, allyl alcohol, benzyl alcohol, glycerol, and the like. The epoxides may include ethylene oxide, propylene oxide, butylene oxide, isobutylene oxide, cyclopentene oxide, cyclohexene oxide, styrene oxide, and the like. The aldehydes may include formaldehyde; acetaldehyde; propionaldehyde; n-butyraldehyde; n-valeraldehyde; caproaldehyde; acrolein; tran-2-cis-6-nonadienal; n-heptylaldehyde; trans-2-hexenal; hexadeconal; benzaldehyde; phenylacetaldehyde; o-tolualdehyde; m-tolualdehyde; p-tolualdehyde; salicylaldehyde; p-hydroxybenzaldehyde; and the like. The ketones may include acetone, methyl ethyl ketone, 2-pentanone, 3-pentanone, 2-hexanone, 3-hexanone, cyclohexanone, methyl isobutyl ketone, acetophenone, propiophenone, n-butyrophenone, benzophenone, and the like. The carboxylic acids may include formic acid, acetic acid, propionic acid, butyric acid, isobutyric acid, valeric acid, caproic acid, caprylic acid, capric acid, acrylic acid, methacrylic acid, benzoic acid, toluic acid, phthalic acid, salicylic acid, and the like. The carboxylic acid anhydrides may include acetic anhydride, maleic anhydride, phthalic anhydride, benzoic anhydride, and the like. The carboxylic acids and anhydrides may include hydrocarbon substituted carboxylic acids and anhydrides (e.g., hydrocarbon substituted succinic acids and anhydrides) wherein the hydrocarbon substituent contains from 1 to about 500 carbon atoms, and in one embodiment from about 20 to about 500 carbon atoms. The esters may include methyl acetate, vinyl acetate, ethyl acetate, n-propyl acetate, n-butyl acetate, n-pentyl acetate, isopentyl acetate, benzyl acetate, phenyl acetate, and the like.

The hydrocracking reactions may involve destructive hydrogenation (also known as hydrogenolysis) of large hydrocarbon molecules wherein the large or heavy hydrocarbon molecules are broken down to smaller or lighter ones and reacted with hydrogen. The hydrocarbon reactant may be referred to as the first reactant and the hydrogen may be referred to as the second reactant. The terms "light" and "heavy" are used herein in their normal sense within the refining industry to refer respectively to relatively low and high boiling point ranges. The hydrocarbon reactant may comprise any hydrocarbon requiring hydrocracking. The hydrocarbon reactant may vary from naptha to heavy crude oil residual fractions. The hydrocarbon reactant may have a 5% by volume boiling point above about 350° F. (177° C.), and in one embodiment above about 400° F. (204° C.). In one embodiment, at least about 90% by volume of the hydrocarbon reactant may fall within the boiling point range of about 300° F. (149° C.) to about 1050° F. (566° C.), and in one embodiment between about 600° F. (316° C.) to about 1000° F. (538° C.). The hydrocarbon reactant may comprise one or more petroleum fractions such as atmospheric and vacuum gas oils (AGO and VGO). The hydrocarbon reactant may comprise heavy hydrocarbonaceous mineral or synthetic oils or a mixture of one or more fractions thereof. The hydrocarbon reactant may comprise straight run gas oils, vacuum gas oils, demetallized oils, deasphalted vacuum residues, coker distillates, cat cracker distillates, shale oil, tar sand oil, coal liquids, and the like.

The hydrogen used in the hydrocracking reactions may be in the form of hydrogen gas or it may be in a hydrogen feed stream that further comprises water, methane, carbon dioxide, carbon monoxide and/or nitrogen. The hydrogen may be derived from another process such as a steam reforming process (product stream with $H_2$/CO mole ratio of about 3), a partial oxidation process (product stream with $H_2$/CO mole ratio of about 2), an autothermal reforming process (product stream with $H_2$/CO mole ratio of about 2.5), a $CO_2$ reforming process (product stream with $H_2$/CO mole ratio of about 1), a coal gassification process (product stream with $H_2$/CO mole ratio of about 1), and combinations thereof. With each of these hydrogen sources, the hydrogen may be separated from the remaining ingredients using conventional techniques such as membranes or adsorption.

The mole ratio of hydrocarbon reactant to hydrogen in these hydrocracking reactions may range from about 0.1:1 to about 10:1, and in one embodiment about 0.5:1 to about 5:1.

The hydrocracking catalyst may comprise any hydrocracking catalyst. These may include zeolite catalysts including beta zeolite, omega zeolite, L-zeolite, ZSM-5 zeolites and Y-type zeolites. The catalyst may include a refractory inorganic oxide such as alumina, magnesia, silica, tilania, zirconia and silica-alumina. The catalyst may comprise a hydrogenation component. Examples of suitable hydrogenation components may include metals of Group IVB and Group VIII of the Periodic Table and compounds of such metals. Molybdenum, tungsten, chromium, iron, cobalt, nickel, platinum, palladium, iridium, osmium, rhoduim and ruthenium may be used as the hydrogenation component. These catalysts are described in U.S. Pat. No. 6,312,586 B1, which is incorporated herein by reference.

The product made by the hydrocracking reaction may comprise a mixture of hydrocarbons wherein from about 1 to about 98% by weight of the mixture boils at a temperature below about 350° C. at atmospheric pressure; from about 10 to about 90% by weight boils at a temperature in the range from about 150 to about 300° C.; from about 20 to about 80% by weight boils at a temperature in the range from about 200 to about 250° C.; and from about 2 to about 100% by weight of the mixture boils at a temperature above about 150° C.

The product made by the hydrocracking process may comprise a middle distillate fraction boiling in the range from about 260 to about 700° F. (127-371° C.). The term "middle distillate" is intended to include the diesel, jet fuel and kerosene boiling range fractions. The terms "kerosene" and "jet fuel" boiling range are intended to refer to a temperature range of 260-550° F. (127-288° C.) and "diesel" boiling range is intended to refer to hydrocarbon boiling points from about 260 to about 700° F. (127-371° C.). The distillate product may be a gasoline or naphtha fraction. These may be considered to be the $C_5$ to 400° F. (204° C.) endpoint fractions.

The hydrogenation reactions may involve the reaction, in the presence of one or more hydrogenation catalysts, of one or more hydrocarbon compounds that are capable of undergoing a hydrogenation reaction with hydrogen. The hydrocarbon compounds may be referred to as the first reactant. These hydrocarbon compounds may be in the form of liquids, or they may be in the form of gases dispersed in liquids. The hydrogen may be referred to as the second reactant, and may be in the form of a gas. The hydrogen may be derived from any of the above mentioned sources.

The hydrocarbon compounds that may undergo a hydrogenation reaction may include the unsaturated hydrocarbon compounds discussed above. The hydrocarbon compounds may include unsaturated fats and oils. The fats and oils may be derived from animal or vegetable sources. The fats and oils may include triglycerides, that is, esters of glycerol and fatty acids. The fatty acids may be monounsaturated or polyunsaturated. Examples of the fatty acids may include oleic acid, linoleic acid, linolenic acid, and the like.

The mole ratio of unsaturated hydrocarbon reactant to hydrogen in these hydrogenation reactions may be in the range from about 0.1:1 to about 10:1, and in one embodiment from about 0.5:1 to about 5:1.

The hydrogenation catalyst may be any hydrogenation catalyst. These may include metals of Group IVB and Group VIII of the Periodic Table and compounds of such metals. Molybdenum, tungsten, chromium, iron, cobalt, nickel, platinum, palladium, iridium, osmium, rhoduim and ruthenium may be used. In one embodiment, the catalyst may comprise palladium coated on the walls of the process microchannel or adhered to a fixed support within the process microchannel. The walls and/or fixed support may have a first portion with a thickness greater than about 0.05 mm and porosity less than about 0.9. The walls or fixed support may have a second thickness of greater than about 0.01 mm and a porosity of zero. The catalyst may be affixed to the first portion.

The product made by the hydrogenation process may be a saturated or partially saturated hydrocarbon corresponding to the unsaturated hydrocarbon compounds used as the first reactant.

The hydration reactions may involve the reaction, in the presence of a hydration catalyst, of an unsaturated hydrocarbon compound with water to form an alcohol or an ether. The unsaturated hydrocarbon compound, which may be referred to as the first reactant, may be any of the unsaturated hydrocarbon compounds discussed above. The water, which may be referred to as the second reactant, may be taken from any convenient source. The water may be deionized or purified using osmosis or distillation. The mole ratio of unsaturated hydrocarbon to water may be in the range from about 0.1 to about 10, and in one embodiment from about 0.5 to about 5.

The hydration catalyst may comprise a solid acid catalyst such as zeolite; an acidic ion exchange resin containing sulfonate groups or the like; an inorganic oxide such as hydrated niobium oxide, hydrated tantalum oxide, zirconium dioxide, titanium dioxide, aluminum oxide, silicon dioxide, or a mixed oxide thereof; or an ion exchange type layered compound obtained by treating a layered compound such as smectite, kaolinite or vermiculite with at least one metal oxide selected from oxides of aluminum, silicon, titanium and zirconium. The catalyst may comprise aluminosilicates such as mordenite, faujasite, clinoptilite, L type zeolite, chabazite, erionite and ferrierite, as well as zeolite products ZSM-5, ZSM-4, ZSM-8, ZSM-11, ZSM-12, ZSM-20, ZSM-40, ZSM-35 and ZSM-48. The catalyst may comprise an element-containing zeolite such as borosilicate, gallosilicate and ferroaluminosilicate. These zeolites may contain thorium, copper, silver, chromium, molybdenum, tungsten, titanium, zirconium, hafnium and like metals. A proton exchange type (H type) zeolite may be used, and a portion thereof may be exchanged with a cationic species selected from alkali elements such as Na, K and Li, alkaline earth elements such as Mg, Ca and Sr and Group VIII elements such as Fe, Co, Ni, Ru or Pd.

The carbonylation reactions may involve the reaction of a saturated or unsaturated hydrocarbon with carbon monoxide in the presence of a carbonylation catalyst. The saturated or unsaturated hydrocarbon reactant, which may be referred to as the first reactant, may be any of the saturated or unsaturated hydrocarbons discussed above. The carbon monoxide, which may be referred to as the second reactant, may be taken from any source. The carbon monoxide may be taken from a process stream such as a steam reforming process (product stream with $H_2$/CO mole ratio of about 3), a partial oxidation process (product stream with $H_2$/CO mole ratio of about 2), an autothermal reforming process (product stream with $H_2$/CO mole ratio of about 2.5), a $CO_2$ reforming process (product stream with $H_2$/CO mole ratio of about 1), a coal gassification process (product stream with $H_2$/CO mole ratio of about 1), and combinations thereof. With each of these carbon monoxide sources, the carbon monoxide may be separated from the remaining ingredients using conventional techniques such as membranes or adsorption.

The mole ratio of hydrocarbon reactant to carbon monoxide in these carbonylation reactions may range from about 0.5:1 to about 20:1, and in one embodiment about 2:1 to about 10:1.

The carbonylation catalyst may be any carbonylation catalyst. These may include solid acid catalysts. The catalyst may be a solid comprising interacting protic and Lewis acid sites. The catalyst may comprise a combination of a Bronsted (protonic) acid and a Lewis acid. Examples include sulfated metal oxides (e.g., sulfated zirconia), fluorocarbon sulfonates $(B(CF_2)_nBSO_3H)$ in combination with supports (e.g., metal oxides and carbon), heteropolyacids, halides of Ta, Sb, Ga and B, halogenated metal oxides, sulfated zeolites, halides of Ta, Sb, Ga and B in combination with fluorosulfonic acid resins. The metal oxides may include both single component oxides and multi-component oxides, i.e., mixed metal oxides. Single component metal oxides may include aluminas, silicas, zirconia, titania and mixtures thereof. The mixed metal oxides may be either physical mixtures or structurally connected. Example of mixed metal oxides may include ZrCTi, WCZr, TiCCu, TiCZn, TiCSi, AlCZr, FeCZr and TiCMn oxides. Examples may include sulfated zirconia, sulfated titania, sulfated tungsten oxide, $BF_3$ on fluorinated alumina, aluminum chloride on chlorinated alumina, $H_3PW_{10}O_{40}$, $Cs_{2.5}H_{0.5}PW_{12}O_{40}$, $H_4SiW_{12}O_{40}$, and the like.

The Fischer-Tropsch (FT) reactions may involve converting $H_2$ and CO to alphatic hydrocarbons, for example, alphatic hydrocarbons of about 5 or more carbon atoms. The reactant composition may comprise a mixture containing $H_2$ and CO. This mixture may be referred to as synthesis gas or syngas. The molar ratio of $H_2$ to CO may be in the range from about 0.8 to about 10, and in one embodiment from about 0.8 to about 5, and in one embodiment from about 1 to about 3, and in one embodiment from about 1.5 to about 3, and in one from embodiment from about 1.8 to about 2.5, and in one embodiment from about 1.9 to about 2.2, and in one embodiment from about from 2.05 to about 2.10. The $H_2$ to CO molar ratio may be up to about 2.7, and in one embodiment up to about 2.5, and in one embodiment up to about 2.3, and in one embodiment in the range from about 0.8 to about 2.7, and in one embodiment in the range from about 0.8 to about 2.5, and in one embodiment in the range from about 0.8 to about 2.3. The reactant composition may also contain $CO_2$ and/or $H_2O$, as well as light hydrocarbons of 1 to about 5 carbon atoms, and in one embodiment 1 to about 2 carbon atoms. The reactant composition may contain from about 5 to about 45% by volume CO, and in one embodiment from about 5 to about 20% by volume CO; and from about 55 to about 95% by volume $H_2$, and in one embodiment from about 80 to about 95% by volume $H_2$. The concentration of $CO_2$ in the reactant composition may be up to about 60% by volume, and in one embodiment from about 5 to about 60% by volume, and in one embodiment from about 5 to about 40% by volume. The concentration of $H_2O$ in the reactant composition may be up to about 80% by volume, and in one embodiment from about 5 to about 80% by volume, and in one embodiment from about 5 to about 50% by volume. The concentration of light hydrocarbons in the reactant composition may be up to about 80% by volume, and in one embodiment from about 1 to about 80% by volume, and in one embodiment from about 1 to about 50% by volume. The reactant composition may comprise recycled gaseous products formed during the inventive process. The reactant composition may comprise a stream (e.g., a gaseous stream) from another process such as a steam reforming process (product stream with $H_2$/CO mole ratio of about 3), a partial oxidation process (product stream with $H_2$/CO mole ratio of about 2), an autothermal reforming process (product stream with $H_2$/CO mole ratio of about 2.5), a $CO_2$ reforming process (product stream with $H_2$/CO mole ratio of about 1), a coal gassification process (product stream with $H_2$/CO mole ratio of about 1), and combinations thereof. In one embodiment, a microchannel separation process, such as a thermal swing adsorption (TSA) process, may be used to tailor the $H_2$ to CO ratio.

The presence of contaminants such as sulfur, nitrogen, halogen, selenium, phosphorus, arsenic, and the like, in the FT reactant composition may be undesirable. Thus, in one embodiment of the invention, the foregoing contaminants may be removed from the reactant composition or have their concentrations reduced prior to conducting the inventive process. Techniques for removing these contaminants are well known to those of skill in the art. For example, ZnO guard-beds may be used for removing sulfur impurities. In one embodiment, the contaminant level in the reactant composition may be at a level of up to about 5% by volume, and in one embodiment up to about 1% by volume, and in one embodiment up to about 0.1% by volume, and in one embodiment up to about 0.05% by volume. In one embodiment, a microchannel separation process, such as a thermal swing adsorption process, may be used to separate out the impurities.

The FT catalyst may comprise a supported catalyst, the active portion of the catalyst comprising at least one composition represented by the formula

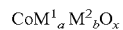

$$CoM^1_a M^2_b O_x$$

wherein: $M^1$ may be Fe, Ni, Ru, Re, Os or a mixture thereof, and in one embodiment $M^1$ may be Ru or Re or a mixture thereof; $M^2$ may be Li, B, Na, K, Rb, Cs, Mg, Ca, Sr, Ba, Sc, Y, La, Ac, Zr, La, Ac, Ce, Th, or a mixture of two or more thereof, and, in one embodiment $M^2$ may be Na, K, or a mixture thereof; a may be a number in the range from zero to about 0.5, and in one embodiment from zero to about 0.2; b may be a number in the range from zero to about 0.5, and in one embodiment from zero to about 0.1; and x is the number of oxygens needed to fulfill the valency requirements of the elements present. $M^1$ may be referred to as a co-catalyst. $M^2$ may be referred to as a promoter.

In one embodiment, the FT catalyst may comprise an Fe-based catalyst.

The support material for the FT catalyst may comprise alumina, zirconia, silica, aluminum fluoride, fluorided alumina, bentonite, ceria, zinc oxide, silica-alumina, silicon carbide, or a combination of two or more thereof. The support material may comprise a refractory oxide or a molecular sieve. In one embodiment, the support material may be other than titania.

In one embodiment, the FT catalyst may comprise cobalt supported on alumina. In one embodiment, the FT catalyst may comprise cobalt and rhenium supported on alumina. In one embodiment, the FT catalyst may be other than a catalyst comprising cobalt and ruthenium supported on titania.

The FT catalyst may be made using a process comprising multiple contacting steps with calcination steps conducted between each contacting step, followed by one or more oxidation and reduction steps. The contacting steps may be referred to as impregnating steps. The reduction and oxidation steps may be referred to as redox steps or cycles. The use of this process, at least in one embodiment, may allow for the formation of catalysts with levels of loading of cobalt and, optionally, one or more co-catalysts and/or promoters that are higher as compared to processes wherein these procedures are not employed. The use of this process, at least in one embodiment, may provide for a catalyst that is more active as compared to catalysts made by processes wherein these procedures are not used. In one embodiment, Co and optionally a co-catalyst (e.g., Re or Ru) and/or promoter (e.g., Na or K) may be loaded on a support (e.g., $Al_2O_3$) using the following steps: (A-1) contacting the support with a composition comprising cobalt and optionally a co-catalyst and/or promoter to provide a supported catalyst; (A-2) calcining the supported catalyst formed in step (A-1) to form a calcined catalyst; (A-3) contacting the calcined catalyst formed in (A-2) with another composition comprising cobalt and optionally a co-catalyst and/or promoter to form an enhanced catalyst product; and (A-4) calcining the enhanced catalyst product formed in step (A-3) to provide an intermediate supported catalyst.

For the FT catalyst, cobalt and an optional co-catalyst and/or promoter may be impregnated on the support using an incipient wetness impregnation process. A solution of cobalt nitrate may be used to impregnate the support with cobalt. Steps (A-3) and (A-4) may be repeated one or more additional times until the desired loading of cobalt, and optional co-catalyst and/or promoter, is achieved. The process may be continued until the cobalt achieves a loading level of about 20% by weight or more, and in one embodiment about 25% by weight or more, and in one embodiment about 28% by weight or more, and in one embodiment about 30% by weight or more, and in one embodiment about 32% by weight or more, and in one embodiment about 35% by weight or more, and in one embodiment about 37% by weight or more, and in one embodiment about 40% by weight or more. The Co dispersion may be at least about 3%, and in one embodiment at least about 5%, and in one embodiment at least about 7%. The loading of co-catalyst (e.g., Re or Ru) may be in the range up to about 40% by weight, and in one embodiment up to about 20% by weight, and in one embodiment up to about 10% by weight, and in one embodiment from about 0.1 to about 10% by weight, and in one embodiment from about 1 to about 6% by weight. The loading of promoter (e.g., Na or K) may be up to about 20% by weight, and in one embodiment up to about 5% by weight. Each of the calcination steps may comprise heating the catalyst at a temperature in the range from about 100° C. to about 500° C., and in one embodiment about 100° C. to about 400° C., and in one embodiment from about 250 to about 350° C., for about 0.5 to about 100 hours, and in one embodiment about 0.5 to about 24 hours, and in one embodiment about 2 to about 3 hours. The temperature may be ramped to the calcination temperature at a rate of about 1-20° C./min. The calcination steps may be preceded by drying steps wherein the catalyst is dried at a temperature in the range from about 75° C. to about 200° C., and in one embodiment from about 75° C. to about 150° C., for about 0.5 to about 100 hours, and in one embodiment about 0.5 to about 24 hours. In one embodiment, the catalyst may be dried for about 12 hours at about 90° C. and then at about 110-120° C. for about 1-1.5 hours, the temperature being ramped from 90° C. to 110-120° C. at a rate of about 0.5-1° C./min.

The intermediate supported catalyst from (A) may be oxidized and reduced. The sequence may involve (B) reduction, (C) oxidation, (D) reduction, (E) oxidation, and (F) reduction. The supported catalyst may be oxidized using oxidation step (C) and, optionally, oxidation step (E). The supported catalyst may be reduced using reduction step (D) and, optionally, reduction steps (B) and/or (F). In one embodiment, step (A) may be conducted prior to positioning the catalyst in the process microchannels, and steps (C) and (D) may be conducted after the catalyst is positioned in the process microchannels. In one embodiment, step (A) may be conducted prior to positioning the catalyst in the process microchannels, and steps (B), (C) and (D) may be conducted after the catalyst is positioned in the process microchannels. In one embodiment, step (A) may be conducted prior to positioning the catalyst in the process microchannels, and steps (C), (D), (E) and (F) may be conducted after the catalyst is positioned in the process microchannels. In one embodiment, steps (B) through (F) may be conducted with the catalyst positioned in the process microchannels of the microchannel reactor. In one embodiment, steps (A) through (E) may be conducted prior to positioning the catalyst in the process microchannels, and step (F) may be conducted after the catalyst is positioned in the process microchannels.

Reduction step (B) for the process for making the FT catalyst may involve process steps (B-1) to (B-5). Steps (B-1) to (B-4) may involve contacting the supported catalyst with a reducing fluid. The reduction step (B) may comprise: (B-1) heating the supported catalyst from ambient temperature to a first temperature in the range from about 100° C. to about 500° C., and in one embodiment from about 100° C. to about 400° C., and in one embodiment from about 200° C. to about 300° C., and in one embodiment about 250° C., over a period of time in the range from about 0.5 to about 12 hours, and in one embodiment in the range from about 0.5 to about 10 hours, and in one embodiment in the range from about 1 to about 5 hours, and in one embodiment about 3.8 hours; (B-2) maintaining the supported catalyst at the first temperature for a period of time in the range from about 2 to about 25 hours, and in one embodiment for a period of time in the range from about 2 to about 20 hours, and in one embodiment about 8 hours; (B-3) heating the supported catalyst from (B-2) to a second temperature in the range from about 300° C. to about 600° C., and in one embodiment in the range from about 400° C., over a period of time in the range from about 0.5 to about 12 hours, and in one embodiment in the range from about 0.5 to about 10 hours, and in one embodiment in the range from about 1 to about 3 hours, and in one embodiment about 2.5 hours; (B-4) maintaining the supported catalyst at the second temperature for a period of time in the range from about 0.5 to about 24 hours, and in one embodiment from about 2 to about 24 hours, and in one embodiment for a period of time in the range from about 5 to about 20 hours, and in one embodiment about 12 hours; and (B-5) contacting the supported catalyst from (B-4) with an inert fluid and cooling the supported catalyst to ambient temperature over a period of time in the range from about 1 to about 48 hours, and in one embodiment in the range from about 5 to about 48 hours, and in one embodiment about 13.2 hours. Steps (B-1) to (B-4) may be conducted at a pressure in the range from about 0.7 to about 20 atm, and in one embodiment from about 1.25 to about 5 atm.

The oxidation step (C) for the process for making the FT catalyst may involve process steps (C-1) to (C-3). Steps (C-1) and (C-2) may involve contacting the supported catalyst with an oxidizing fluid. The oxidation step (C) may comprise: (C-1) heating the supported catalyst from ambient temperature to a first temperature in the range from about 150° C. to about 650° C., and in one embodiment from about 200° C. to about 500° C., and in one embodiment about 350° C., over a period of time in the range from about 0.5 to about 12 hours, and in one embodiment in the range from about 1 to about 6 hours, and in one embodiment about 3.6 hours; (C-2) maintaining the supported catalyst at the first temperature for a period of time in the range from about 0.5 to about 10 hours, and in one embodiment for a period of time in the range from about 1 to about 3 hours, and in one embodiment about 2 hours; and (C-3) contacting the supported catalyst with an inert fluid and cooling the supported catalyst to ambient temperature over a period of time in the range from about 1 to about 48 hours, and in one embodiment in the range from about 2 to about 48 hours, and in one embodiment in the range from about 10 to about 30 hours, and in one embodiment about 18.1 hours. Steps (C-1) to (C-3) may be conducted at a pressure in the range from about 0.7 to about 20 atm, and in one embodiment from about 1.25 to about 5 atm.

The reduction step (D) for the FT catalyst may involve process steps (D-1) to (D-5). Steps (D-1) to (D-4) may involve contacting the supported catalyst with a reducing fluid. The reduction step (D) may comprise: (D-1) heating the supported catalyst to a first temperature in the range from about 100° C. to about 500° C., and in one embodiment from about 200° C. to about 300° C., and in one embodiment about 250° C., over a period of time in the range from about 0.5 to about 12 hours, and in one embodiment in the range from about 0.5 to about 10 hours, and in one embodiment in the range from about 1 to about 8 hours, and in one embodiment about 3.8 hours; (D-2) maintaining the supported catalyst at the first temperature for a period of time in the range from about 2 to about 25 hours, and in one embodiment in the range from about 5 to about 25 hours, and in one embodiment in the range from about 5 to about 20 hours, and in one embodiment about 8 hours; (D-3) heating the supported catalyst from (D-2) to a second temperature in the range from about 300° C. to about 600° C., and in one embodiment from about 350° C. to about 500° C., and in one embodiment about 400° C., over a period of time in the range from about 0.5 to about 12 hours, and in one embodiment in the range from about 0.5 to about 10 hours, and in one embodiment from about 1 to about 3 hours, and in one embodiment about 2.5 hours; (D-4) maintaining the supported catalyst at the second temperature for a period of time in the range from about 0.5 to about 24 hours, and in one embodiment in the range from about 5 to about 20 hours, and in one embodiment about 12 hours; and (D-5) contacting the supported catalyst with an inert fluid and cooling the supported catalyst to ambient temperature over a period of time in the range from about 1 to about 48 hours, and in one embodiment in the range from about 5 to about 48 hours, and in one embodiment in the range from about 5 to about 20 hours, and in one embodiment about 24 hours. Steps (D-1) to (D-5) may be conducted at a pressure in the range from about 0.7 to about 20 atm, and in one embodiment from about 1.25 to about 5 atm.

The oxidation step (E) for the FT catalyst may involve process steps (E-1) to (E-3). Steps (E-1) and (E-2) may involve contacting the supported catalyst with an oxidizing fluid. The oxidation step (E) may comprise: (E-1) heating the supported catalyst to a first temperature in the range from about 150° C. to about 650° C., and in one embodiment from about 250° C. to about 450° C., and in one embodiment about 350° C., over a period of time in the range from about 0.5 to about 12 hours, and in one embodiment in the range from about 1 to about 6 hours, and in one embodiment about 3.6 hours; (E-2) maintaining the supported catalyst at the first temperature for a period of time in the range from about 0.5 to about 7 hours, and in one embodiment in the range from about 1 to about 3 hours, and in one embodiment about 2 hours; and (E-3) contacting the supported catalyst with an inert fluid and cooling the supported catalyst to ambient temperature over a period of time in the range from about 1 to about 48 hours, and in one embodiment in the range from about 2 to about 48 hours, and in one embodiment in the range from about 5 to about 30 hours, and in one embodiment about 22 hours. Steps (E-1) to (E-3) may be conducted at a pressure in the range from about 0.7 to about 20 atm, and in one embodiment from about 1.25 to about 5 atm.

The reduction step (F) for the FT catalyst may involve process steps (F-1) to (F-5). These steps may involve contacting the supported catalyst with a reducing fluid. The reduction step (F) may comprise: (F-1) heating the supported catalyst to a first temperature in the range from about 100° C. to about 500° C., and in one embodiment from about 100° C. to about 400° C., and in one embodiment about 250° C., over a period of time in the range from about 0.5 to about 20 hours, and in on embodiment in the range from about 0.5 to about 12 hours, and in one embodiment about 3.8 hours; (F-2) maintaining the supported catalyst at the first temperature for a period of time in the range from about 0.5 to about 48 hours, and in one embodiment in the range from about 2 to about 20 hours, and in one embodiment about 12 hours, and in one embodiment about 1 hour; (F-3) heating the supported catalyst from (F-2) to a second temperature in the range from about 100° C. to about 600° C., and in one embodiment from about 300° C. to about 600° C., and in one embodiment about 375° C., over a period time in the range from about 0.5 to about 12 hours, and in one embodiment in the range from about 1 to about 5 hours; and in one embodiment about 2.1 hours; (F-4) maintaining the supported catalyst at the second temperature for a period of time in the range from about 0.5 to about 48 hours, and in one embodiment in the range from about 2 to about 24 hours, and in one embodiment about 12 hours; and (F-5) contacting the supported catalyst with a reducing fluid at a pressure in the range from about 0.7 to about 75 atm, and in one embodiment in the range from about 10 to about 50 atm, and in one embodiment about 28.2 atm, and cooling the supported catalyst to a temperature in the range from about 60° C. to about 250° C., and in one embodiment from about 100° C. to about 230° C., and in one embodiment about 160° C., over a period of time in the range from about 0.5 to about 40 hours, and in one embodiment in the range from about 1 to about 20 hours. Steps (F-1) to (F-4) may be conducted at a pressure in the range from about 0.7 to about 20 atm, and in one embodiment from about 1.25 to about 5 atm.

The process steps used in reduction steps (B), (D) and (F) for the FT catalyst, which involve contacting the supported catalyst with a reducing fluid, may involve using hydrogen, hydrazine, or a mixture thereof as the reducing medium. A gaseous mixture comprising hydrogen and at least one inert gas may be used. The inert gas may be nitrogen, helium or argon. The concentration of hydrogen in the gaseous mixture may be in the range from about 0.25 to about 99.75% by volume, and in one embodiment in the range from about 0.25 to about 50%, and in one embodiment in the range from about 0.25 to about 20%, and in one embodiment in the range from about 1 to about 10% by volume, and in one embodiment about 5% by volume.

The process steps used in oxidation steps (C) and (E) for making the FT catalyst, which involve contacting the supported catalyst with an oxidizing fluid, may involve using oxygen, a peroxide (e.g., hydrogen peroxide) or a mixture thereof. A gaseous mixture comprising oxygen and at least one inert gas may be used. The inert gas may be nitrogen, helium or argon. The concentration of oxygen in the gaseous mixture may be in the range from about 0.25 to about 100% by volume, and in one embodiment in the range from about 0.25 to about 50%, and in one embodiment in the range from about 0.25 to about 20%, and in one embodiment in the range from about 0.5 to about 10% by volume, and in one embodiment about 2% by volume.

The inert fluid used in steps (B-5), (C-3), (D-5) and (E-3) for making the FT catalyst may be an inert gas. The inert gas may comprise nitrogen, helium, argon, or a mixture of two or more thereof.

The conversion of CO in the FT process on a molar basis may be about 40% or higher per cycle, and in one embodiment about 50% or higher, and in one embodiment about 55% or higher, and in one embodiment about 60% or higher, and in one embodiment about 65% or higher, and in one embodiment about 70% or higher. The term "cycle" is used herein to refer to a single pass of the reactants through the process microchannels. The feed during a cycle may comprise constituents from a previous cycle.

The FT reaction product may comprise a mixture of hydrocarbons wherein from about 1 to about 98% by weight of the mixture boils at a temperature below about 400° C. at atmospheric pressure; from about 10 to about 100% by weight boils at a temperature in the range from about 150 to about 350° C.; from about 1 to about 100% by weight boils at a temperature in the range from about 200 to about 300° C.; and from about 1 to about 100% by weight boils at a temperature above about 150° C.

The product may comprise a hydrocarbon mixture wherein at least about 10% by weight, and in one embodiment from about 20% to about 50% by weight, boils at a temperature in the range from about 25° C. to about 350° C. at atmospheric pressure; and/or at least about 5% by weight, and in one embodiment at least about 10% by weight, and in one embodiment at least about 25% by weight, boils at a temperature above about 350° C. at atmospheric pressure.

The product may comprise a hydrocarbon mixture wherein at least about 5% by weight of the mixture comprises hydrocarbons with a number average molecular weight of at least about 500, and in one embodiment at least about 1000, and in one embodiment at least about 5000.

The selectivity to methane in the product made by the FT process on a molar basis may be about 25% or less, and in one embodiment about 20% or less, and in one embodiment about 15% or less, and in one embodiment about 12% or less, and in one embodiment about 10% or less. The yield of product for the FT process on a molar basis may be about 25% or higher per cycle, and in one embodiment about 30% or higher, and in one embodiment about 40% or higher per cycle. The yield may be based on all carbon-containing products with at least 5 carbon atoms. In one embodiment, the conversion of CO for the FT process may be at least about 50%, the selectivity to methane may be about 15% or less, and the yield of product may be at least about 35% per cycle.

The volumetric consumption weight of CO may be at least about 10 g-mols/kg-cat/hr active catalyst, and in one embodiment from about 40 to about 70 g-mols/kg-cat/hr. The selectivity to methane on a molar basis may be less than about 15% per cycle, and in one embodiment less than about 12% per cycle, and in one embodiment less than about 10% per cycle.

The FT reaction product formed by the FT process may comprise a gaseous product fraction and a liquid product fraction. The gaseous product fraction may include hydrocarbons boiling below about 350° C. at atmospheric pressure (e.g., tail gases through middle distillates). The liquid product fraction (the condensate fraction) may include hydrocarbons boiling above about 350° C. (e.g., vacuum gas oil through heavy paraffins). The separator used to separate these fractions may be conventional in design or it may be a microchannel separator. The microchannel separator may comprise a plurality of process microchannels, for example, about 10 or more parallel process microchannels.

The FT product fraction boiling below about 350° C. may be separated into a tail gas fraction and a condensate fraction, e.g., normal paraffins of about 5 to about 20 carbon atoms and higher boiling hydrocarbons, using, for example, a high pressure and/or lower temperature vapor-liquid separator, or low pressure separators or a combination of separators. The fraction boiling above about 350° C. (the condensate fraction) may be separated into a wax fraction boiling in the range of about 350° C. to about 650° C. after removing one or more fractions boiling above about 650° C. The wax fraction may contain linear paraffins of about 20 to about 50 carbon atoms with relatively small amounts of higher boiling branched paraffins. The separation may be effected using fractional distillation.

The FT product may include methane, wax and other heavy high molecular weight products. The product may include olefins such as ethylene, normal and iso-paraffins, and combinations thereof. These may include hydrocarbons in the distillate fuel ranges, including the jet or diesel fuel ranges.

Branching for the FT product may be advantageous in a number of end-uses, particularly when increased octane values and/or decreased pour points are desired. The degree of isomerization may be greater than about 1 mole of isoparaffin per mole of n-paraffin, and in one embodiment about 3 moles of isoparaffin per mole of n-paraffin. When used in a diesel fuel composition, the product may comprise a hydrocarbon mixture having a cetane number of at least about 60.

Higher molecular weights for the FT products, for example waxes, may either be isolated and used directly, or reacted to form lower molecular weight products. For example, high molecular weight products may be hydrocracked to provide lower molecular weight products, increasing the yield of liquid combustible fuels. Hydrocracking may refer to a catalytic process, usually carried out in the presence of free hydrogen, in which the cracking of the larger hydrocarbon molecules is a primary purpose of the operation. Catalysts used in carrying out hydrocracking operations are well known in the art; see, for example, U.S. Pat. Nos. 4,347,121 and 4,810,357, which are incorporated herein by reference, for their descriptions of hydrotreating, hydrocracking, and catalysts used in each process. The product formed by the FT process may be further processed to form a lubricating base oil or diesel fuel. For example, the product made by the FT process may be hydrocracked and then subjected to distillation and/or catalytic isomerization to provide a lubricating base oil, diesel fuel, and the like.

The hydrocarbon products made by the FT process may be hydroisomerized using the process disclosed in U.S. Pat. Nos. 6,103,099 or 6,180,575; hydrocracked and hydroisomerized using the process disclosed in U.S. Pat. Nos. 4,943,672 or 6,096,940; dewaxed using the process disclosed in U.S. Pat. No. 5,882,505; or hydroisomerized and dewaxed using the process disclosed in U.S. Pat. Nos. 6,013,171, 6,080,301 or 6,165,949. These patents are incorporated herein by reference for their disclosures of processes for treating FT synthesized hydrocarbons and the resulting products made from such processes.

The FT synthesis process may be conducted in a microchannel reactor that is housed in a mobile or transportable unit. The FT process may be conducted in combination with a hydrocracking process in a single plant or mobile unit or in multiple units that may use a connecting apparatus, for example a flanged pipe connection, to connect the process equipment.

The FT synthesis process may be conducted in combination with a steam reforming process or other syngas production process. The microchannel reactor may be located near a syngas producing feed stock, such as a natural gas pipeline, coal mine, geological gas source, landfill gas source, offshore gas, and the like. Heat exchange equipment, separation equipment, and the like, which may be in the form of microchannel heat exchangers, microchannel separators, etc., may be combined with the FT process microchannel reactor. The process may have any production capacity, for example, the process may have a production capacity ranging from about 1 to about 5000 barrels per day of liquid product. One or more microchannel FT synthesis processes arranged in series or parallel may be used to achieve the desired capacity and/or product quality.

The process for conducting the foregoing reactions may be described with reference to FIG. 2. Referring to FIG. 2, the process may be conducted using microchannel reactor 100, which comprises microchannel reactor core 102, feed stream header 104, and product footer 106. The microchannel reactor 100 may further comprise heat exchange fluid inlet header 108, and heat exchange fluid outlet footer 110. The reactor core 102 may comprise one or more repeating units. Each of the repeating units may comprise one or more process microchannels.

Figure 15:
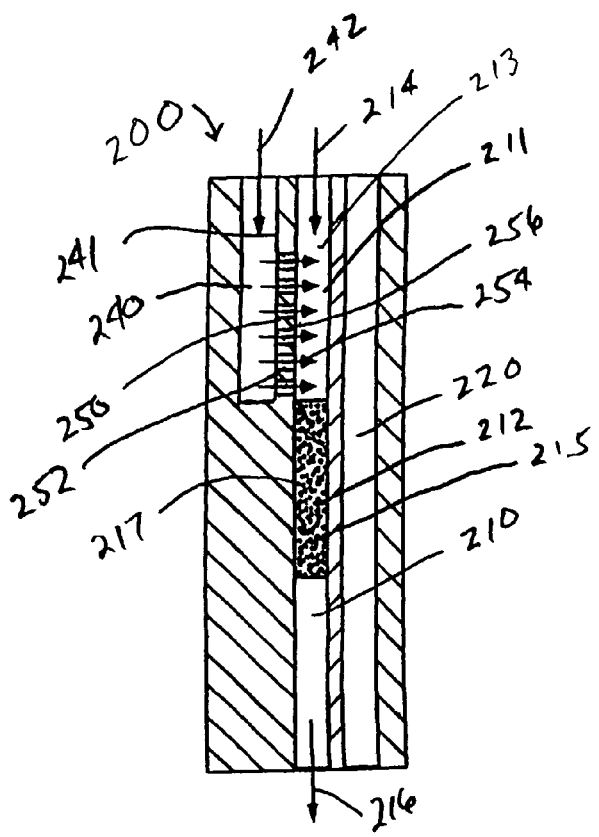
FIG. 15 is a schematic illustration of a staged addition repeating unit that may be used in the microchannel reactor shown in FIG. 2. This repeating unit comprises a process microchannel, an apertured section, a second reactant stream channel, and a heat exchange channel. The process microchannel contains a catalyst which, as illustrated, is in the form of a bed of solid particulates. However, the catalyst used in the process microchannel may be in the form of any of the catalysts disclosed in the specification and/or illustrated in the drawings. The catalyst is positioned in a reaction zone within the process microchannel. The process microchannel has a mixing zone upstream of the reaction zone.
Figure 16:
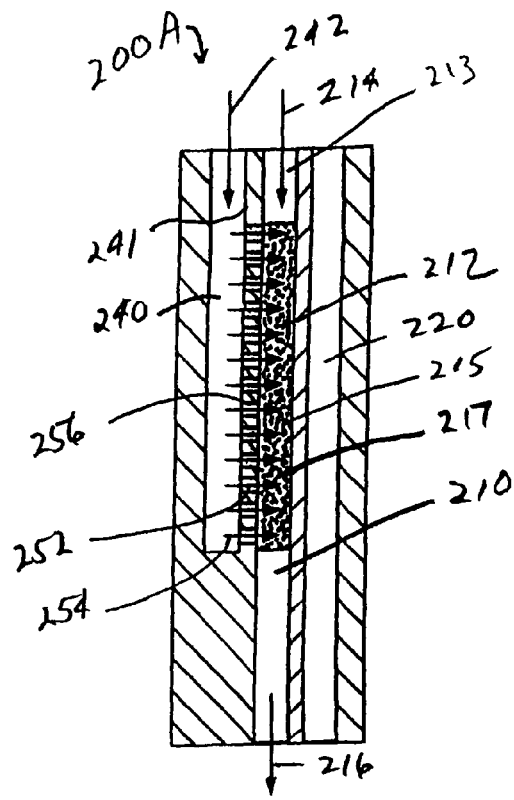
FIG. 16 is a schematic illustration of an alternate embodiment of a staged addition repeating unit that may be used in the microchannel reactor shown in FIG. 2. This repeating unit comprises a process microchannel, an apertured section, a second reactant stream channel, and a heat exchange channel. The process microchannel contains a catalyst which, as illustrated, is in the form of a bed of solid particulates. However, the catalyst used in the process microchannel may be in the form of any of the catalysts disclosed in the specification and/or illustrated in the drawings. The catalyst is positioned in a reaction zone within the process microchannel.
Figure 17:
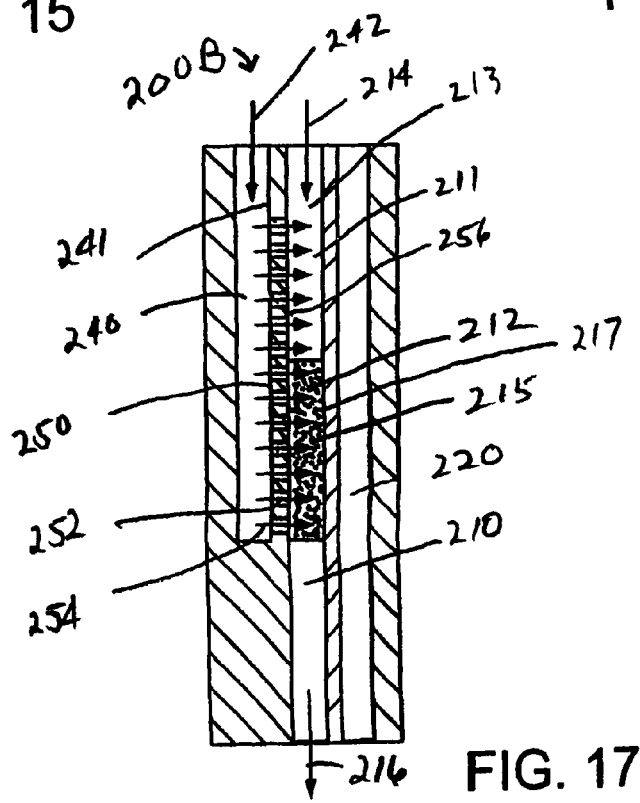
FIG. 17 is a schematic illustration of another alternate embodiment of a staged addition repeating unit that may be used in the microchannel reactor shown in FIG. 2. This repeating unit comprises a process microchannel, an apertured section, a second reactant stream channel, and heat exchange channel. The process microchannel contains a catalyst which, as illustrated, is in the form of a bed of solid particulates. However, the catalyst used in the process microchannel may be in the form of any of the catalysts disclosed in the specification and/or illustrated in the drawings. The catalyst is positioned in a reaction zone within the process microchannel. The process microchannel has a mixing zone upstream of the reaction zone.

The repeating units may be in the form of staged addition repeating units which may comprise one or more process microchannels and one or more second reactant stream channels. Apertured sections may be positioned in common walls between the process microchannels and second reactant stream channels. Examples of these are shown in FIGS. 15-17. In one embodiment, two or more process microchannels may be positioned adjacent each second reactant stream channel. In one embodiment, two or more second reactant stream channels may be positioned adjacent each process microchannel.

The process microchannels may contain one or more reaction zones wherein the reactants react to form the product. One or more catalysts in solid form may be present in the reaction zones. The catalysts may comprise homogeneous catalysts immobilized on solid supports. The catalysts may be graded catalysts.

Figure 46:
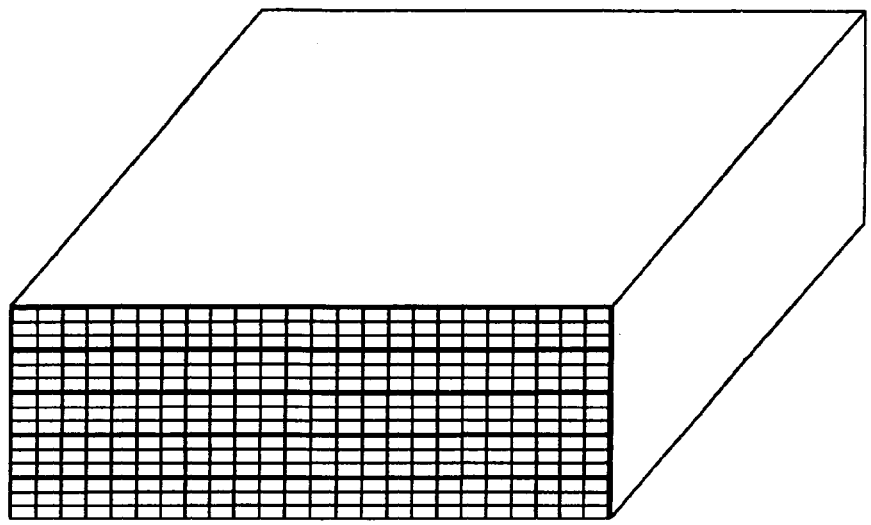
FIG. 46 is a schematic illustration of the reaction zone of a process microchannel that may be used in the microchannel reactor shown in FIG. 2. The reaction zone contains a plurality of parallel sub-microchannels, each of which may contain one or more catalysts.
Figure 47:
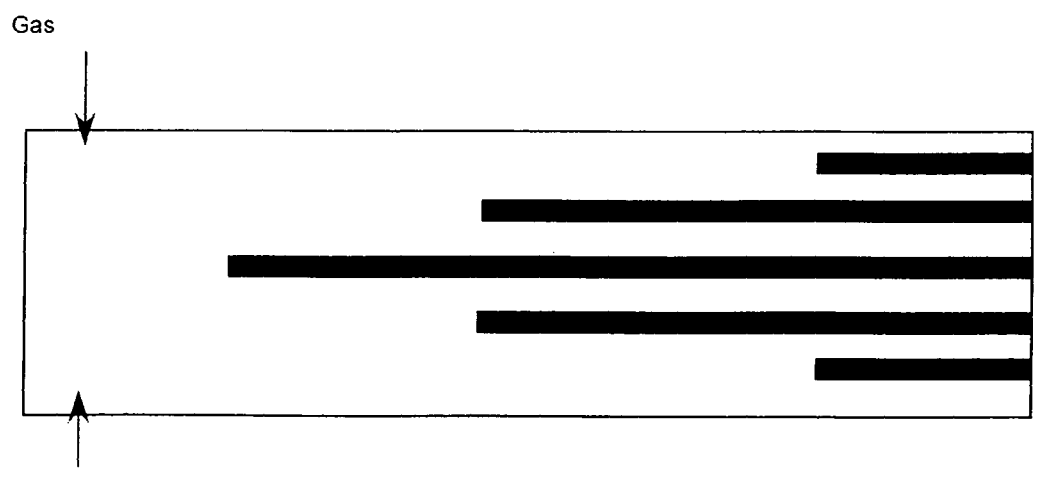
FIG. 47 is a schematic illustration of a processing zone and two divider zones for use in a process microchannel that may be used in the microchannel reactor shown in FIG. 2. The two divider zones are positioned downstream of the processing zone. The processing zone contains internal obstructions (e.g., surface features) not shown in the drawing.
Figure 48:
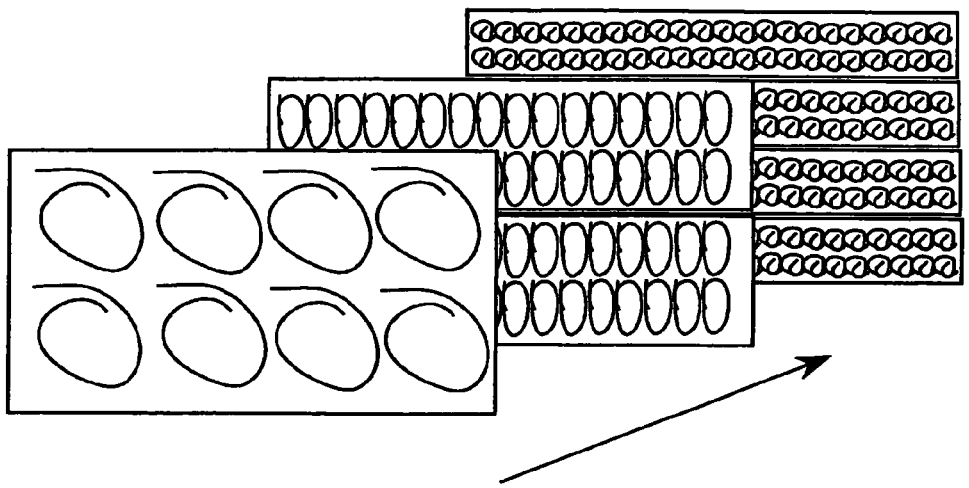
FIG. 48 is a schematic illustration of two divider zones that may be used in a process microchannel. In the process microchannel the reactant mixture is subdivided two times to provide reactant streams with progressively smaller diameters. The reactant streams are churning with the result being that a vortex is formed in each of the streams. The churning may be effected by flowing the reactant streams in contact with one or more surface features.

In one embodiment, each process microchannel may comprise a processing zone containing one or more internal obstructions and a reaction zone containing one or more structures for contacting and/or supporting the catalyst. The one or more structures for contacting and/or supporting the catalyst may contain openings to permit the reactants to flow through the one or more structures for contacting and/or supporting the catalyst and contact the catalyst. The one or more internal obstructions and the one or more structures for contacting and/or supporting the catalyst may have the same structure or their structures may be different. The one or more internal obstructions may comprise one or more surface features formed in and/or projecting from one or more interior walls of the process microchannel. The one or more structures for contacting and/or supporting the catalyst may comprise surface features projecting from one or more interior walls of the process microchannel. The one or more structures for contacting and/or supporting the catalyst may comprise a catalyst coated on the one or more structures or grown on the one or more structures. The catalyst may comprise particulate solids contacting the one or more structures for contacting and/or supporting the catalyst. The one or more internal obstructions may have at least one dimension perpendicular to the bulk flow direction for fluid flow in the processing zone that is larger than the diameter of the openings in the one or more structures for contacting and/or supporting the catalyst. FIG. 46 is a schematic illustration of the reaction zone wherein the reaction zone contains a plurality of parallel sub-microchannels, each of which may contain one or more catalysts. FIG. 47 is a schematic illustration of a processing zone and two divider zones. The two divider zones are positioned downstream of the processing zone. The processing zone contains internal obstructions (e.g., surface features) for disrupting the flow of fluid in the processing zone. FIG. 48 is a schematic illustration of two divider zones wherein the reactant mixture is subdivided two times to provide reactant streams with progressively smaller diameters. The reactant streams are churning with the result being that a vortex is formed in each of the streams. The churning may be effected by flowing the reactant streams in contact with one or more surface features.

Figure 49:
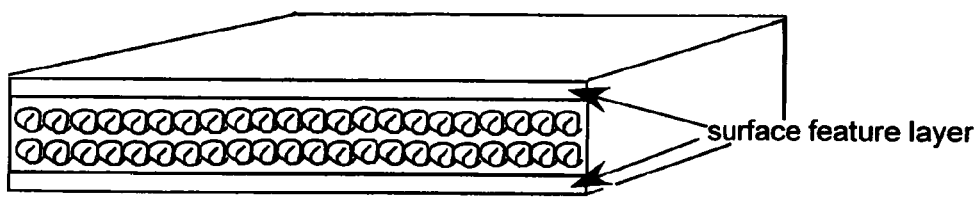
FIG. 49 is a schematic illustration of a process microchannel containing surface feature layers and a plurality of churning streams of the reactant mixture. The churning of the reactant streams may be effected by flowing the reactant streams in contact with the surface feature layers.
Figure 50:
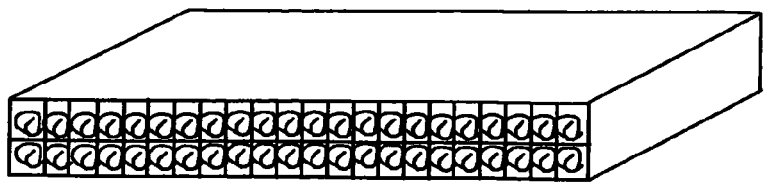
FIG. 50 is a schematic illustration showing the reactant mixture streams of FIG. 49 flowing in sub-microchannels within a process microchannel.

FIG. 49 is a schematic illustration of a process microchannel containing surface features layers and a plurality of churning streams of the reactant mixture. The churning of the reactant streams may be effected by flowing the reactant streams in contact with the surface feature layers. FIG. 50 is a schematic illustration showing the reactant mixture streams of FIG. 49 flowing in sub-microchannels within a process microchannel.

Figure 51:
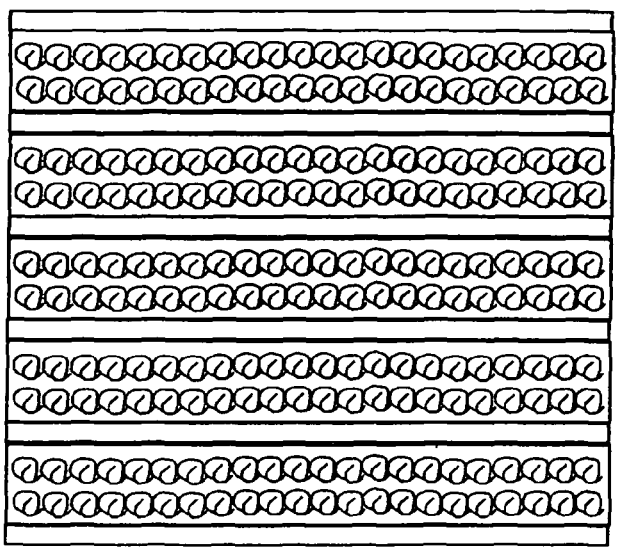
FIG. 51 is a schematic illustration showing a plurality of layers of churning streams of the reactant mixture, each of the layers being separated by surface feature layers. The surface features effect the churning of the reactant mixture streams as the reactant streams flow in contact with the surface features.
Figure 52:
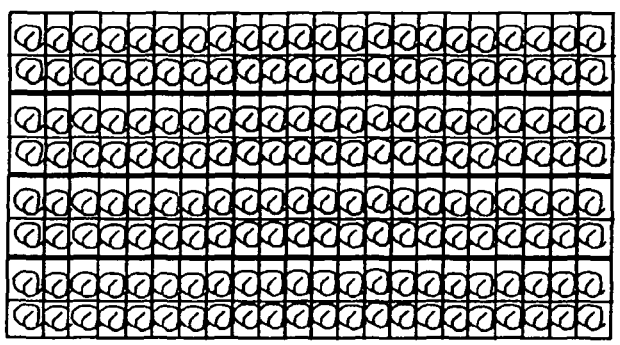
FIG. 52 is a schematic illustration showing the reactant mixture streams from FIG. 51 flowing in sub-microchannels within the process microchannel.

FIG. 51 is a schematic illustration showing a plurality of layers of churning streams of the reactant mixture, each of the layers being separated by surface feature layers. The surface features effect the churning of the reactant mixture streams as the reactant streams flow in contact with the surface features. FIG. 52 is a schematic illustration showing the reactant mixture streams from FIG. 51 flowing in sub-microchannels within the process microchannel.

Figure 53:
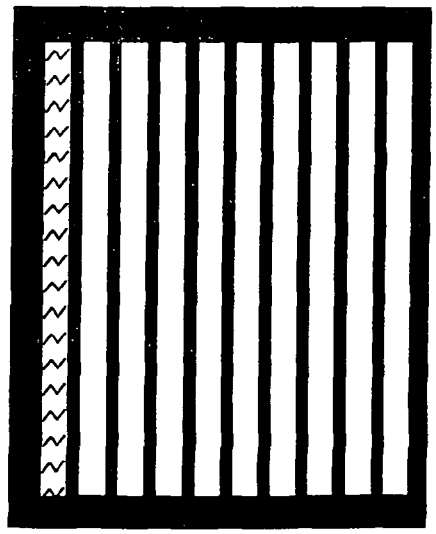
FIG. 53 is a schematic illustration of a plurality of sub-microchannels that may be used in the reaction zone of a process microchannel. The process microchannel may be used in the microchannel reactor illustrated in FIG. 2. The sub-microchannel on the left side of FIG. 53 contains etched surface features for modifying flow within the sub-microchannel.

FIG. 53 is a schematic illustration of a plurality of sub-microchannels that may be used in the reaction zone. The sub-microchannel on the left side of FIG. 53 contains etched surface features for modifying flow within the sub-microchannel.

Figure 54:
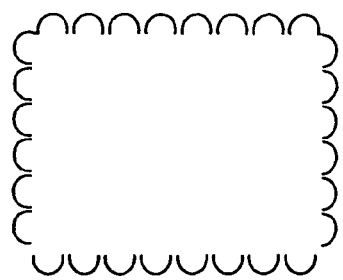
FIG. 54 is a schematic illustration of a sub-microchannel wherein the interior walls are scalloped. The scalloped interior walls may be used to control film thickness and enhance reactivity within the sub-microchannel.

FIG. 54 is a schematic illustration of a sub-microchannel wherein the interior walls are scalloped. The scalloped interior walls may be used to control film thickness and enhance reactivity within the sub-microchannel.

Figure 55:
FIGS. 55-57 are schematic illustrations of internal obstructions and/or structures for contacting and/or supporting a catalyst within a process microchannel. The internal obstructions and/or structures comprise a plurality of inter-connected oblique angles projecting from an interior wall of the process microchannel. The process microchannel has an open path adjacent to the inter-connected oblique angles.
Figure 56:
Figure 57:
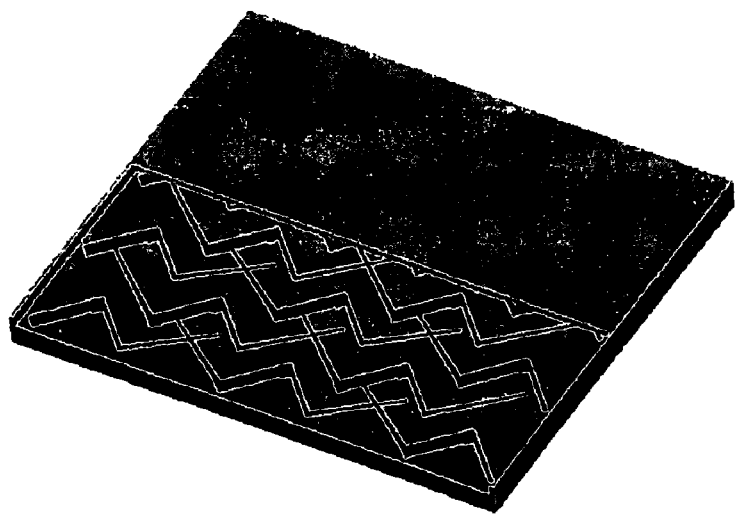

FIGS. 55-57 are schematic illustrations of internal obstructions and/or structures for contacting and/or supporting a catalyst within a process microchannel. The internal obstructions and/or structures comprise a plurality of inter-connected oblique angles projecting from an interior wall of the process microchannel. The process microchannel has an open path adjacent to the inter-connected oblique angles. FIG. 55 is a schematic illustration of a cross-sectional view of a process microchannel containing the internal obstructions and/or structures. FIG. 56 is a top plan view of the process microchannel illustrated in FIG. 55 with the top wall rendered transparent in order to view the underlying inter-connected oblique angles. FIG. 57 is a three-dimensional view of the structure illustrated in FIGS. 55 and 56. The upper wall in FIG. 57 is partially cut away to reveal the underlying inter-connected oblique angles. The oblique angles may be referred to as surface features.

The one or more structures for contacting and/or supporting the catalyst may comprise a plurality of parallel sub-microchannels positioned in the process microchannel downstream from the processing zone. An example of this is shown in FIG. 46 which shows a process microchannel containing a plurality of parallel sub-microchannels. The catalyst may be positioned in the sub-microchannels. The catalyst may be coated on one or more interior walls of the sub-microchannels or grown on one or more interior walls of the sub-microchannels. The catalyst may comprise particulate solids in the sub-microchannels.

One or more divider zones may be positioned between the processing zone and the reaction zone. Schematic illustrations of divider zones that may be used are shown in FIGS. 47 and 48. Each divider zone may be used to divide a stream of the reactant mixture into two or more smaller streams. In one embodiment, two or more divider zones may be positioned between the processing zone and the reaction zone. The two or more divider zones may be positioned in sequential order, one divider zone being downstream from the next divider zone.

Surface features may be positioned in and/or on one or more interior walls of the sub-microchannels. These surface features may be etched in one or more interior walls of the sub-microchannels. This is shown in FIG. 53. The interior walls of the sub-microchannels may be scalloped. This is shown in FIG. 54.

The one or more internal obstructions and/or the one or more structures for contacting and/or supporting the catalyst may comprise a plurality of interconnected oblique angles projecting from an interior wall of the process microchannel. The process microchannel may have an open path adjacent to the interconnected oblique angles. This is shown in FIGS. 55-57. The oblique angles may be referred to as surface features.

The ratio of the length of the reaction zone to the length of the processing zone may be in the range from about 0.01 to about 1000, and in one embodiment from about 0.1 to about 1000, and in one embodiment from about 0.1 to about 100, and in one embodiment from about 1 to about 100. The ratio of the length of the reaction zone to the length of the one or more divider zones may be in the range from about 0.1 to about 1000, and in one embodiment from about 1 to about 1000, and in one embodiment from about 0.1 to about 100, and in one embodiment from about 1 to about 100.

In one embodiment, each process microchannel may contain at least one first processing zone with a first open cross-sectional area upstream of the reaction zone and at least one second processing zone with a second open cross-sectional area. The reaction zone may comprise the second processing zone. Alternatively, the second processing zone may be positioned between the reaction zone and the first processing zone. The second open cross-sectional area may be smaller than the first open cross-sectional area. The cross-sectional area of the second processing zone may be narrower than the cross-sectional area of the first processing zone. The second processing zone may contain internal obstructions (e.g., spherical objects, surface features, catalyst, catalyst supports, etc.) which may provide for a reduced open cross-sectional area for the second processing zone. Each process microchannel may further comprise at least one additional zone downstream of reaction zone. The cross-sectional area of the additional zone may be the same as or larger than the cross-sectional area of the reaction zone.

The microchannel reactor core 102 may further comprise a heat source and/or heat sink in thermal contact with the process microchannels. The heat source and/or heat sink may comprise one or more heat exchange channels adjacent to and/or in thermal contact with the process microchannels, and in one embodiment the second reactant stream channels. The heat exchange channels may be microchannels. When the reaction that is conducted in the process microchannels is an exothermic reaction, the heat source and/or heat sink may be used to provide cooling to the process microchannels. When the reaction that is conducted in the process microchannels is an endothermic reaction, the heat source and/or heat sink may be used to provide heat to the process microchannels. Various combinations of heating and cooling may be employed to provide for desired temperature profiles within the process microchannels and along the length of the process microchannels, and in one embodiment within and along the length of the second reactant stream channels.

The feed stream header 104 may comprise one or more manifolds for distributing the reactants to the process microchannels. The reactants may be mixed upstream of the feed stream header 104 and/or in the feed stream header 104. The feed stream header 104 may be used to distribute one or more liquid or first reactants to the process microchannels, and one or more gaseous or second reactants to the second reactant stream channels. The product footer 106 may comprise one or more manifolds for collecting product from the process microchannels.

One or more liquid or first reactants and one or more gaseous or second reactants may flow into feed stream header 104, as indicated by arrow 112. The liquid or first reactant and gaseous or second reactant may be premixed upstream of the header 104 and then flow into and through the feed stream header 104 into the process microchannels. The liquid or first reactant and the gaseous or second reactant may flow into the feed stream header 104 separately, form a reactant mixture in the feed stream header, and then flow into the process microchannels. The liquid or first reactant and the gaseous or second reactant may flow through the feed stream header 104 separately, and then be mixed in the process microchannels.

The liquid or first reactant may flow through the feed stream header 104 and from the feed stream header 104 into the one or more process microchannels in reactor core 102. The gaseous or second reactant may flow through feed stream header 104 and from header 104 into one or more of the process microchannels. Alternatively, the gaseous or second reactant may flow through the feed stream header 104 into one or more second reactant stream channels in the reactor core 102, and then flow from the second reactant stream channels into the process microchannels and contact and mix with the liquid or first reactant in the process microchannels. Apertured sections may be positioned in common walls between the second reactant stream channels and process microchannels, and the gaseous or second reactant may flow from the second reactant stream channels through the apertured sections into the process microchannels.

In one embodiment, the reactant mixture may flow in the processing zone in contact with the one or more internal obstructions to enhance mixing of the liquid or first reactant and the gaseous or second reactant, and then flow in openings in the one or more structures for contacting and/or supporting the catalyst and contact the catalyst. The reactants may react with each other in the presence of the catalyst.

In one embodiment, at least one of the reactants, and in one embodiment both of the reactants, may flow through the first processing zone and then through the second processing zone. The local velocity of the at least one reactant increases as the at least one reactant flows from the first processing zone to and through the second processing zone. The liquid or first reactant and the gaseous or second reactant may contact the catalyst, form a liquid film layer on the catalyst, and react to form at least one product. The flow of the at least one reactant through the first processing zone and then through the second processing zone may result in an increased local velocity for the at least one reactant. This may have the effect of reducing the thickness of the liquid film layer on the catalyst. The increase in local velocity may result from the reduction in the open cross-sectional area when flowing from the first processing zone to and through the second processing zone. The reduced film thickness may provide for enhanced conversion.

The product may flow from the process microchannels to and through product footer 106, and from product footer 106 out of the microchannel reactor, as indicated by arrow 114. Unreacted reactants and any diluents that may be present may also flow from the process microchannels through the footer 106. Although an advantage of the process is that a high level of conversion to the desired product may be obtained with one pass through the microchannel reactor, in one embodiment, one or more unreacted reactants may be separated from the product using conventional or microchannel techniques and recycled back through the microchannel reactor. The unreacted reactants may be recycled through the microchannel reactor any number of times, for example, one, two, three, four times, etc.

The reaction process may be exothermic or endothermic. In order to control the reaction, heat may be transferred between the process microchannels and/or second reactant stream channels, and a heat source and/or heat sink. That is, during the reaction process the process microchannels and/or second reactant stream channels may be heated using a heat source and/or cooled using a heat sink. The heat source and/or heat sink may be adjacent to the process microchannels and/or second reactant stream channels. Alternatively, the heat source and/or heat sink may be remote from, that is not adjacent to, the process microchannels and/or second reactant stream channels, but in thermal contact with the process microchannels and/or second reactant stream channels.

The heat source and/or heat sink may comprise one or more heat exchange channels containing a heat exchange fluid. The heat source may comprise a non-fluid heating element such as an electric heating element or a resistance heater. The heat sink may comprise a non-fluid cooling element such as a Peltier electronic element. A heat exchange fluid may flow into and through heat exchange fluid inlet header 108, as indicated by arrow 116, and from there into the reactor core 102. The heat exchange fluid may flow through heat exchange channels in the reactor core 102, and then flow to an through heat exchange footer 110, as indicated by arrow 118. Heat transfer between the process fluids, i.e., reactants and product, and the heat source and/or heat sink may be effected using convective heat transfer. In one embodiment, heat transfer may be enhanced using a heat exchange fluid wherein the heat exchange fluid undergoes an exothermic or endothermic reaction and/or a full or partial phase change. Multiple heat exchange zones may be employed along the length of the process microchannels and/or second reactant stream channels to provide for different temperatures at different points along the lengths of the process microchannels and/or second reactant stream channels. This may provide the advantage of tailoring the heating and/or cooling profile in the process microchannels and/or second reactant stream channels.

The microchannel reactor 100 may be used in combination with one or more storage vessels, pumps, valves, manifolds, microprocessors, flow control devices, and the like, which are not shown in the drawings, but would be apparent to those skilled in the art. Repeating units or process microchannels that may be used in the reactor core 102 may include those illustrated in FIGS. 3 and 5-17.

The microchannel reactor core 102 may contain layers of process microchannels and heat exchange channels aligned side by side or stacked one above the other. An example of these channel layers is illustrated in FIG. 3. Referring to FIG. 3, process microchannel layers 130 and heat exchange channel layers 150 may be stacked one above another or positioned side by side one another to provide repeating unit 170. Process microchannel layer 130 comprises a plurality of process microchannels 132 which provide for the flow of process fluid (i.e., reactants and product). Heat exchange channel layer 150 comprises a plurality of heat exchange channels 152 which provide for the flow of heat exchange fluid. The heat exchange channels 152 may be microchannels. For each heat exchange layer 150, one or more process microchannel layers 130 may be used. Thus, for example, one, two, three, four, five, six or more process microchannel layers 130 may be employed with a single heat exchange channel layer 150. Alternatively, two or more heat exchange channel layers 150 may be employed with each process microchannel layer 130. The heat exchange channel layers 150 may be used for heating and/or cooling. In one embodiment, each process microchannel layer 130 may be positioned between adjacent heat exchange channel layers 150. In one embodiment, two or more process microchannel layers 130 may be positioned adjacent each other to form a vertically or horizontally oriented stack of process microchannel layers, and a heat exchange layer 150 may be positioned on one or both sides of the stack. In various embodiments, second reactant stream channels, which may be microchannels, may be used in combination with the process microchannels, and for these embodiments one or more layers of the second reactant stream channels may be positioned adjacent each process microchannel layer. Alternatively, one or more process microchannel layers 130 may be positioned adjacent each second reactant stream layer. When the second reactant stream channel layers are used, the second reactant stream channels and adjacent process microchannels may have common walls with apertured sections in the common walls to provide for the flow of the second reactant from the second reactant stream channels into the process microchannels. Each combination of process microchannel layers 130, heat exchange channel layers 150 and second reactant stream channels layers may be referred to as a repeating unit.

Microchannel layer 130 may contain a plurality of microchannels 132 aligned in parallel, each process microchannel 132 extending in a vertical direction along the length of microchannel layer 130 from end 134 to end 136, the process microchannels 132 extending along the width of microchannel layer 130 from end 138 to end 140. Bonding strips 142 and 144 may be positioned at the ends 138 and 140, respectively, of microchannel layer 130 to permit bonding of the microchannel layer 130 to the next adjacent layer, i.e., heat exchange layer 150, process microchannel layer 130 or second reactant stream channel layer. Alternatively, the microchannel reactor may be fabricated by methods not requiring bonding strips. For example the microchannel reactor may be fabricated using sheets with etched in features. A catalyst may be positioned in the process microchannels 132. The areas within the process microchannel 132 containing the catalyst may be referred to as reaction zones.

In one embodiment, each process microchannel 132 may comprise a processing zone containing one or more internal obstructions (e.g., surface features) and a reaction zone containing one or more structures for contacting and/or supporting the catalyst. The one or more structures for contacting and/or supporting the catalyst may contain openings to permit the reactants to flow through the one or more structures for contacting and/or supporting the catalyst and contact the catalyst. In one embodiment, one or more divider zones may be positioned between the processing zone and the reaction zone.

In one embodiment, each process microchannel 132 may contain at least one first processing zone, which may have a first open cross-sectional area and may be positioned upstream of the reaction zone, and at least one second processing zone, which may have a second open-cross sectional area. The second processing zone may be in the reaction zone and/or between the reaction zone and the first processing zone. The second open cross-sectional area may be smaller than the first open cross-sectional area. The open cross-sectional area of the second processing zone may be narrower than the open cross-sectional area of the first processing zone as a result of microchannel side walls diverging from the first processing zone to the second processing zone. The second processing zone may contain internal obstructions (e.g., spherical objects, surface features, catalyst, catalyst supports, etc.) which provide for a reduced open cross-sectional area for the second processing zone. Each process microchannel may further comprise at least one additional zone downstream of the reaction zone. The cross-sectional area of the additional zone may be the same as or larger than the cross-sectional area of the reaction zone.

The flow of process fluid, i.e., reactants and product, in the process microchannels 132 may be in the direction indicated by arrows 146 and 148. Each of the process microchannels 132 may have a cross section having any shape, for example, a square, rectangle, circle, semi-circle, etc. The internal height of each process microchannel 132 may be considered to be the vertical or horizontal distance or gap between the microchannel layer 130 and the next adjacent layer, i.e., heat exchange layer 150, process microchannel layer 130 or second reactant stream layer.

Heat exchange channel layer 150 may contain a plurality of heat exchange channels 152 aligned in parallel, each heat exchange channel 152 extending horizontally along the width of microchannel layer 150 from end 154 to end 156, the heat exchange channels 152 extending along the length of channel layer 150 from end 158 to end 160 of channel layer 150. The heat exchange channels 152 may be microchannels. Bonding strips 162 and 164 may be positioned at ends 154 and 156, respectively, of channel layer 150 to permit bonding of the channel layer 150 to the next adjacent process microchannel layer 130 or second reactant stream channel layer. Alternatively, the microchannel reactor may be fabricated by methods not requiring bonding strips. For example the microchannel reactor may be fabricated using sheets with etched in features. The heat exchange fluid may flow in the heat exchange channels 152 in the direction indicated by arrows 166 and 168. The flow of heat exchange fluid in the direction indicated by arrows 166 and 168 is cross-current to the flow of reactant and product flowing through process microchannels 132 as indicated by arrows 146 and 148. Alternatively, the heat exchange channels 152 may be oriented to provide for flow of the heat exchange fluid along the width of the channel layer 150 from end 158 to end 160 or from end 160 to end 158. This would result in the flow of heat exchange fluid in a direction that would be cocurrent or counter-current to the flow of process fluid in the process microchannels 132. Each of the heat exchange channels 152 may have a cross section having any shape, for example, a square, rectangle, circle, semi-circle, etc. The internal height or gap of each heat exchange channel 152 may be considered to be the vertical or horizontal distance or gap between the heat exchange microchannel layer 150 and the next adjacent layer, i.e., process microchannel layer 130 or second reactant stream layer.

Figure 5:
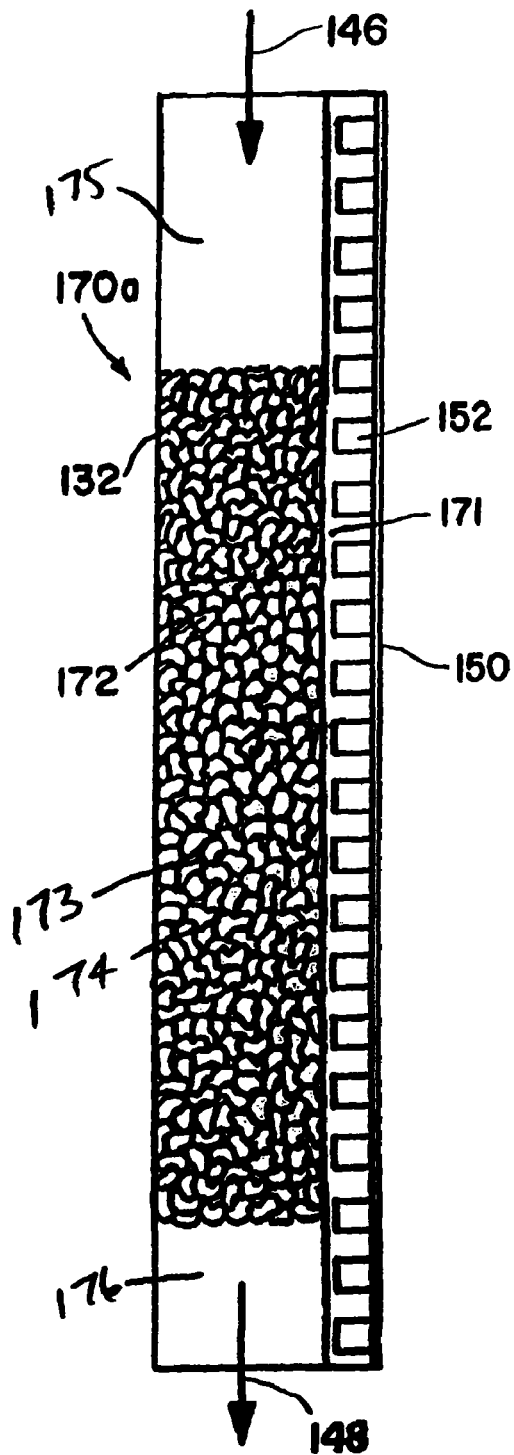
FIG. 5 is a schematic illustration of a repeating unit comprising a process microchannel and an adjacent heat exchange zone that may be used in the microchannel reactor core of the microchannel reactor shown in FIG. 2. The process microchannel contains a catalyst which, as illustrated, is in the form of a bed of solid particulates. However, the catalyst used in the process microchannel may be in the form of any of the catalysts disclosed in the specification and/or illustrated in the drawings. The heat exchange zone contains a plurality of heat exchange channels extending lengthwise at right angles relative to the lengthwise direction of the process microchannel. The flow of heat exchange fluid in the heat exchange channels may be cross-current relative to the bulk flow of process fluids in the process microchannel.

The process microchannels 132 and heat exchange channels 152 may be aligned as provided in repeating unit 170a. Repeating unit 170a is illustrated in FIG. 5. Referring to FIG. 5, process microchannel 132 is positioned adjacent to microchannel layer 150 which contains heat exchange channels 152. A common wall 171 separates the process microchannel 132 from the heat exchange channel layer 150. This common wall may be referred to as a heat transfer wall. A catalyst 172 is positioned in the process microchannel 132. The catalyst 172, as illustrated, is in the form of a bed of solid particulates. However, the catalyst 172 may be in the form of any of the catalysts disclosed in the specification and/or illustrated in the drawings. The catalyst 172 is positioned in reaction zone 173. The reaction zone 173 may comprise second processing zone 174. Processing zone 175 is positioned upstream of the reaction zone 173. In one embodiment, processing zone 175 may contain internal obstructions (e.g., surface features) to enhance the mixing of the reactants. In one embodiment, processing zone 175 may be referred to as a first processing zone. Additional zone 176 is positioned downstream of the reaction zone 173. The second processing zone 174 may have a smaller open cross-sectional area than the processing zone 175 as a result of the catalyst 172 being positioned in the second processing zone 174. The cross-sectional area of the additional zone 176 may be the same as the cross-sectional area of the reaction zone 173. The reactants flow in process microchannel 132 in the direction indicated by arrow 146, contact catalyst 172, and react to form the desired product. The reactants may flow through the processing zone 175 and then through the second processing zone 174 which may result in an increased local velocity for the reactants in the second processing zone 174. A liquid film layer may form on the catalyst 172. However, the local velocity of the reactants flowing through the second processing zone 174 may have the effect of reducing the thickness of the liquid film layer. The product, and in one embodiment unreacted reactants and/or diluents, may flow out of the process microchannel 132 as indicated by arrow 148. The channel layer 150 may form one or more heat exchange zones. Heat exchange fluid may flow through the heat exchange channels 152 in a direction that is cross-current to the flow of process fluid in the process microchannel 132.

Figure 6:
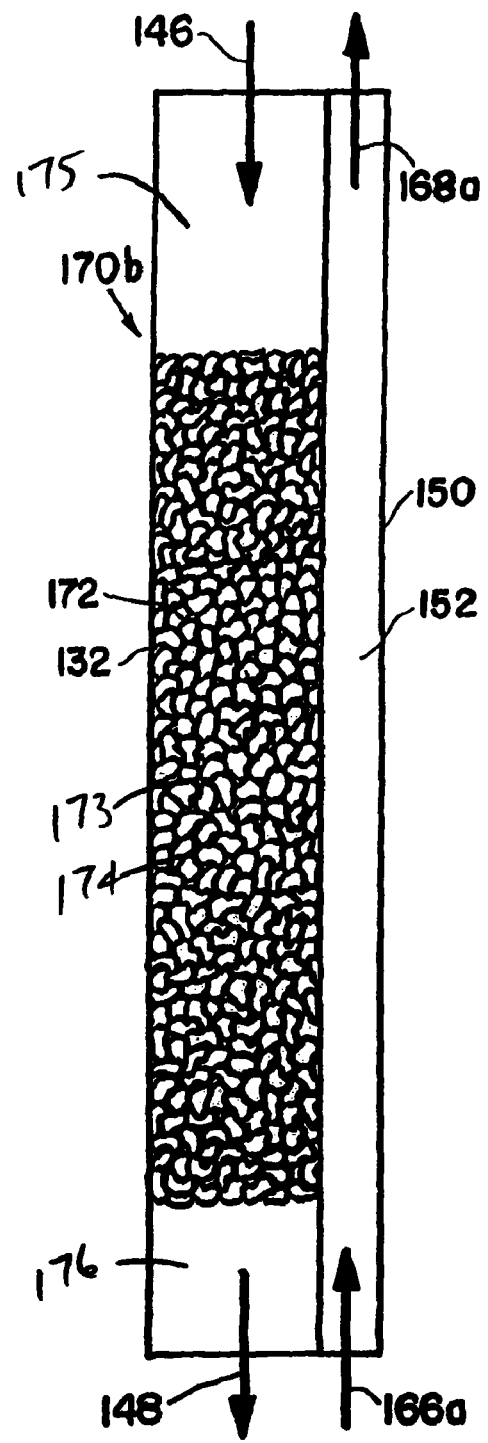
FIG. 6 is a schematic illustration of a repeating unit similar to the repeating unit illustrated in FIG. 5 except that the flow of heat exchange fluid in the heat exchange channel illustrated in FIG. 6 is counter-current relative to the bulk flow of process fluids in the process microchannel. Alternatively, the flow of the heat exchange fluid may be co-current relative to the bulk flow of process fluids in the process microchannel.

The process microchannels and heat exchange channels may be aligned as provided in repeating unit 170b. Repeating unit 170b, which is illustrated in FIG. 6, is identical to the repeating unit 170a illustrated in FIG. 5 with the exception that the heat exchange channel layer 150 in FIG. 6 is rotated 90 degrees from the position shown in FIG. 5 and the heat exchange fluid flowing in the heat exchange channel 152 flows in the direction indicated by arrows 166a and 168a which is countercurrent to the flow of process fluid in the process microchannel 132. Alternatively, the heat exchange fluid may flow in the direction opposite to that indicated by directional arrows 166a and 168a and thereby provide for the flow of heat exchange fluid through the heat exchange channel 152 in a direction that would be cocurrent relative to the direction of process fluid in the process microchannel 132.

Figure 7:
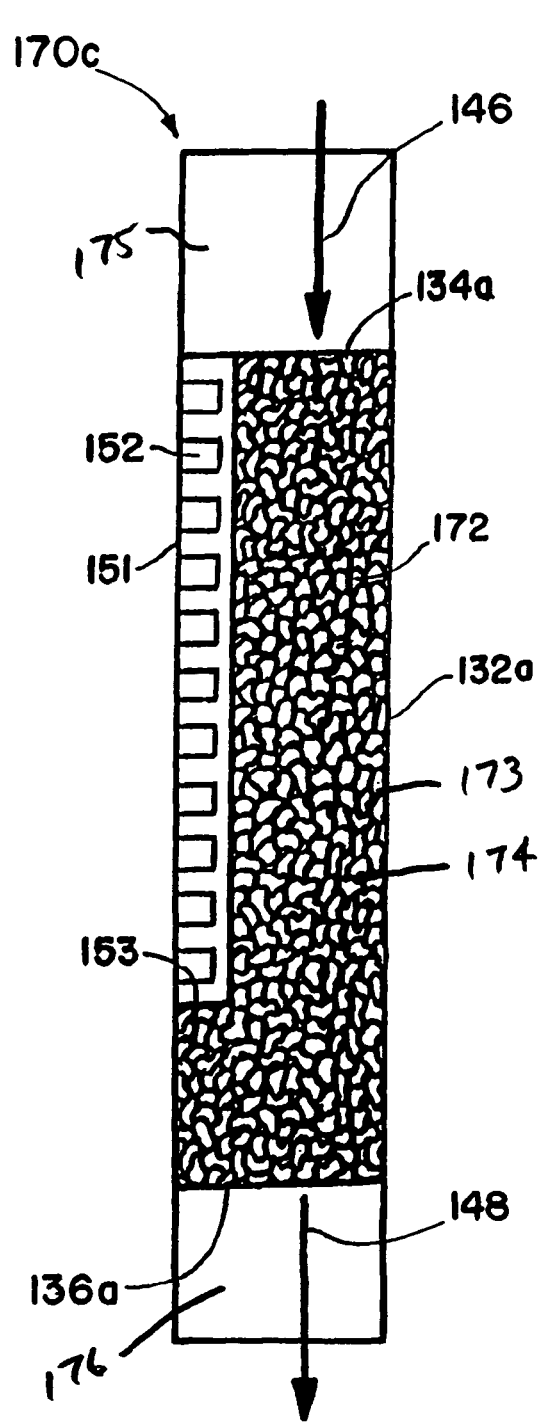
FIG. 7 is a schematic illustration of a repeating unit comprising a process microchannel and an adjacent heat exchange zone that may be used in the microchannel reactor core of the microchannel reactor shown in FIG. 2. The process microchannel contains a catalyst which, as illustrated, is in the form of a bed of solid particulates. However, the catalyst used in the process microchannel may be in the form of any of the catalysts disclosed in the specification and/or illustrated in the drawings. The heat exchange zone contains a plurality of heat exchange channels extending lengthwise at right angles relative to the lengthwise direction of the process microchannel. The heat exchange zone extends lengthwise in the same direction as the process microchannel and is positioned at or near the process microchannel entrance. The length of the heat exchange zone is less than the length of the process microchannel. The flow of the heat exchange fluid in the heat exchange channels is cross-current relative to the bulk flow of process fluids in the process microchannel.

The process microchannels and heat exchange channels may be aligned as provided in repeating unit 170c. Repeating unit 170c is illustrated in FIG. 7. Referring to FIG. 7, process microchannel 132a is positioned adjacent to heat exchange zone 151. Heat exchange zone 151 contains a plurality of heat exchange channels 152 aligned in parallel relative to one another, each heat exchange channel 152 extending lengthwise at a right angle relative to the lengthwise direction of the process microchannel 132a. Heat exchange zone 151 may be shorter in length than process microchannel 132a. Heat exchange zone 151 may extend lengthwise from or near the entrance 134a to process microchannel 132a to a point along the length of the process microchannel 132a short of the exit 136a to the process microchannel 132a. In one embodiment, the length of heat exchange zone 151 may be up to about 100% of the length of process microchannel 132a, and in one embodiment the length of heat exchange zone 151 may be from about 5 to about 100% of the length of the process microchannel 132a, and in one embodiment the length of the heat exchange zone 151 may be from about 5 to about 50% of the length of the process microchannel 132a, and in one embodiment the length of the heat exchange zone 151 may be from about 50% to about 100% of the length of the process microchannel 132a. The width of the process microchannel 132a may be expanded or extended in the area downstream of the end 153 of the heat exchange zone 151. This arrangement may provide the advantage of heat exchange (i.e., cooling or heating) at or near the entrance 134a to the process microchannel 132a as well as to parts of the process microchannel 132a downstream from the entrance. A catalyst 172 is positioned in the process microchannel 132a. The catalyst 172, as illustrated, is in the form of a bed of solid particulates. However, the catalyst 172 may be in the form of any of the catalysts disclosed in the specification and/or illustrated in the drawings. The catalyst 172 is positioned in reaction zone 173. The reaction zone 173 comprises second processing zone 174. Processing zone 175 is positioned upstream of the reaction zone 173. Processing zone 175 may contain internal obstructions (e.g., surface features) for enhancing the mixing of the reactants. Processing zone 175 may be referred to as a first processing zone. Additional zone 176 is positioned downstream of the reaction zone 173. The second processing zone 174 may have a smaller open cross-sectional area than the processing zone 175 as a result of the catalyst 172 being positioned in the second processing zone 174. The cross-sectional area of the additional zone 176 may be the same as the cross-sectional area of the reaction zone 173. The reactants flow in process microchannel 132a in the direction indicated by arrow 146, contact catalyst 172, and react to form product. The reactants flow through the processing zone 175 and then through the second processing zone 174 which may result in an increased local velocity for the reactants in the second processing zone 174. A liquid film layer forms on the catalyst 172. However, the local velocity of the reactants flowing through the second processing zone 174 may have the effect of reducing the thickness of the film layer. The product, and in one embodiment unreacted reactants and/or diluents, may flow out of the process microchannel 132a, as indicated by arrow 148. Heat exchange fluid flows through the heat exchange channels 152 in a direction that is cross-current to the flow of process fluid is the process microchannel 132a.

Figure 8:
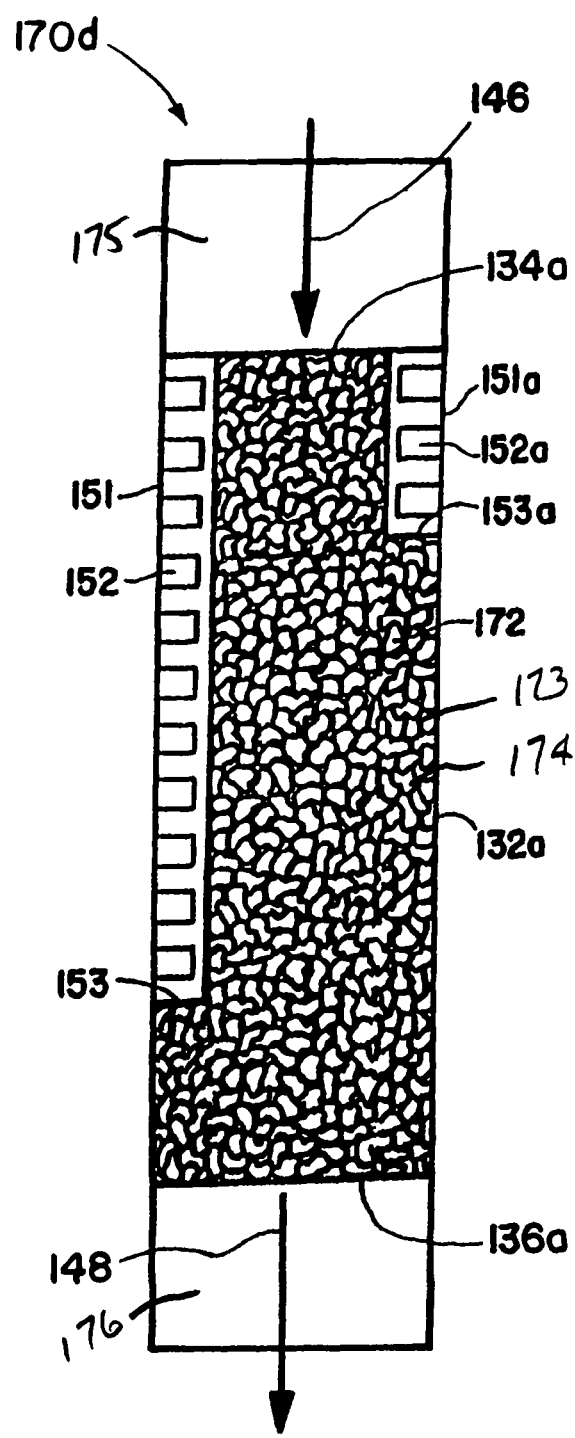
FIG. 8 is a schematic illustration of a repeating unit comprising process microchannel and first and second adjacent heat exchange zones that may be used in the microchannel reactor core of the microchannel reactor shown in FIG. 2. The process microchannel contains a catalyst which, as illustrated, is in the form of a bed of solid particulates. However, the catalyst used in the process microchannel may be in the form of any of the catalysts disclosed in the specification and/or illustrated in the drawings. Each of the heat exchange zones contains a plurality of heat exchange channels extending lengthwise at right angles relative to the lengthwise direction of the process microchannel. The heat exchange zones extend lengthwise in the same direction as the process microchannel and are positioned at or near the process microchannel entrance. The length of the first heat exchange zone is less than the length of the process microchannel. The length of the second heat exchange zone is less than the length of the first heat exchange zone. The flow of the heat exchange fluid in the heat exchange channels is cross-current relative to the bulk flow of process fluids in the process microchannel.

The process microchannels and heat exchange channels may be aligned as provided in repeating unit 170d. Repeating unit 170d, which is illustrated in FIG. 8, is identical to the repeating unit 170c illustrated in FIG. 7 with the exception that repeating unit 170d includes heat exchange zone 151a adjacent to process microchannel 132a on the opposite side of the process microchannel 132a from the heat exchange zone 151. Heat exchange zone 151a contains a plurality of parallel heat exchange channels 152a which are the same as or similar in size and design to the heat exchange channels 152 discussed above. Heat exchange zone 151a may extend lengthwise from or near the entrance 134a to process microchannel 132a to a point along the length of process microchannel 132a short of the end 153 of heat exchange zone 151. The length of the heat exchange zone 151a may be the same as or shorter than the length of the heat exchange zone 151. In one embodiment, the length of the heat exchange zone 151a may be up to about 100% of the length of the process microchannel 132a, and in one embodiment the length of the heat exchange zone 151a may be from about 5 to about 100% of the length of the process microchannel 132a, and in one embodiment the length of the heat exchange zone 151a may be from about 5 to about 50% of the length of the process microchannel 132a, and in one embodiment the length of the heat exchange zone 151a may be from about 50% to about 100% of the length of the process microchannel 132a. The width of the process microchannel 132a may be expanded in the areas downstream of the ends 153 and 153a of the heat exchange zones 151 and 151a, respectively. This arrangement may provide the advantage of heat exchange (i.e., cooling or heating) at or near the entrance 134a to the process microchannel 132a as well to parts of the process microchannel 132a downstream from the entrance 134a. The use of the two heat exchange zones 151 and 151a of different lengths may allow for a relatively high level of heat exchange in the area of the process microchannel 132a near its entrance, and a relatively moderate heat exchange in the process microchannel downstream from about the end 153a of heat exchange zone 151a. Catalyst 172 is positioned in the process microchannel 132a. The catalyst 172, as illustrated, is in the form of a bed of solid particulates. However, the catalyst 172 may be in the form of any of the catalyst disclosed in the specification and/or illustrated in the drawings. The catalyst 172 is positioned in reaction zone 173. The reaction zone 173 comprises second processing zone 174. Processing zone 175 is positioned upstream of the reaction zone 173. The processing zone 175 may contain internal obstructions (e.g., surface features) for enhancing the mixing of the reactants. Processing zone 175 may be referred to as a first processing zone. Additional zone 176 is positioned downstream of the reaction zone 173. The second processing zone 174 may have a smaller open cross-sectional area than the first processing zone 175 as a result of the catalyst 172 being positioned in the second processing zone 174. The cross-sectional area of the additional zone 176 may be the same as the cross-sectional area of the reaction zone 173. The reactants may flow in process microchannel 132a in the direction indicated by arrow 146, contact the catalyst 172, and react to form the desired product. The reactants may flow through the processing zone 175 and then through the second processing zone 174 which results in an increased local velocity for the reactants in the second processing zone 174. A liquid film layer may form on the catalyst 172. However, the local velocity of the reactants flowing through the second processing zone 174 may have the effect of reducing the thickness of the film layer. The product, and in one embodiment unreacted reactants and/or diluent, may flow out of the process microchannel 132a, as indicated by directional arrow 148. Heat exchange fluid flows through the heat exchange channels 152 and 152a in a direction which is cross-current to the flow of reactant process fluid in the process microchannel 132a.

The increase in local velocity of the at least one reactant flowing through a first and then a second processing zone may be achieved as a result of a reduction in the open cross-sectional area of the second processing zone relative to the open cross-sectional area of the first processing zone. The reduction in the open cross-sectional area may be provided by converging the side walls of the process microchannel from the relatively large open cross-sectional area of the first processing zone to the relatively small open-cross sectional area of the second processing zone. It may also be achieved by providing internal obstructions (e.g., spherical objects, surface features, catalyst, catalyst supports, etc.) in the second processing zone which may have the effect of reducing the open cross-sectional area of the second processing zone. The second processing zone may contain sinusoidal depressions and projections in opposite interior walls of the process microchannel to provide for the reduced open cross-sectional area. The change in the open cross-sectional area from the first processing zone to the second processing zone may be abrupt or gradual. There may be one change in the open cross-sectional area from the first processing zone to the second processing zone or there may be a plurality of changes. The decrease in the open cross-sectional area in the second processing zone may be followed by an increase in the cross-sectional area in an additional zone downstream of the reaction zone. The use of surface features may be effective when spaced far enough out to restart the boundary layer after the last change in cross-section. The increase in local velocity for the at least one reactant may have the effect of increasing local shear stress and static pressures which may contribute to thinning the liquid film layer.

The change in the open cross-sectional area from a relatively large value in the first processing zone to a relatively small value in the second processing zone may be a continuous and smooth change in the direction of bulk flow. This may allow a gaseous stream to continue to exert shear stress on the liquid film with less concern about the gas flow detaching or losing a significant amount of shear stress on the interface by the detachment of a recirculation vortex. This change may not prevent gas phase detachment, but may help avoid it over a relatively wide range of flow rates. The change in open cross-sectional area may be continuous with points where the change may not be differentiable. The change in cross-sectional area may be discontinuous or a stepwise change. This may be overcome in surface features and microgrooves by the use of angled features in the direction of flow to allow the boundary layer not to draw in liquid and gas flow.

FIGS. 9-14 are schematic illustrations of process microchannels 132b-132g that may be used in the microchannel reactor core 102 of the microchannel reactor 100 illustrated in FIG. 2. Each of these process microchannels contain a first processing zone and a second processing zone wherein the open cross-sectional area of the second processing zone is smaller than the open cross-sectional area of the first processing zone. FIG. 9 illustrates process microchannel 132b which comprises a reaction zone 173, a first processing zone 175 and a second processing zone 174. The reaction zone 173 comprises the second processing zone 174. The first processing zone 175 is upstream from the reaction zone 173. The reaction zone 173 has a smaller cross-sectional area than the first processing zone 175. The reactants flow through the first processing zone 175 and then through the second processing zone 174 which results in an increased local velocity for the reactants in the second processing zone 174. A liquid film layer forms on the catalyst 172. However, the increase in local velocity of the reactants flowing through the second processing zone 174 may have the effect of providing for a reduced thickness of the film layer. The reactants react in the presence of the catalyst to form the product. The product flows out of the process microchannel through additional zone 176.

FIG. 10 illustrates process microchannel 132c which comprises reaction zone 173, a first processing zone 175 and a second processing zone 174. The first processing zone 175 is upstream from the reaction zone 173. The second processing zone 174 is positioned between the first processing zone 175 and the reaction zone 173. The second processing zone 174 has a smaller cross-sectional area than the first processing zone 175. The reactants flow through the first processing zone 175 and then through the second processing zone 174 which results in an increased local velocity for the reactants in the second processing zone 174. A liquid film layer forms on the catalyst 172. However, the increase in local velocity of the reactants flowing through the second processing zone 174 may have the effect of providing for a reduced thickness of the film layer. The reactants react in the presence of the catalyst to form the product. The product flows out of the process microchannel through additional zone 176.

FIG. 11 illustrates process microchannel 132d which comprises a reaction zone 173, a first processing zone 175, a second processing zone 174, and an additional zone 176. The reaction zone 173 comprises the second processing zone 174. The first processing zone 175 is upstream from the reaction zone 173. The additional zone 176 is downstream from the reaction zone 173. The reaction zone 173 has a smaller cross-sectional area than the first processing zone 175 and the additional zone 176. The reactants flow through the first processing zone 175 and then through the second processing zone 174 which results in an increased local velocity for the reactants in the second processing zone 174. A liquid film layer forms on the catalyst 172. However, the increase in local velocity of the reactants flowing through the second processing zone 174 may have the effect of providing for a reduced thickness of the film layer. The reactants react in the presence of the catalyst to form the product. The product flows out of the process microchannel through additional zone 176.

FIG. 12 illustrates process microchannel 132e which comprises a reaction zone 173, a first processing zone 175 and a second processing zone 174. The second processing zone 174 comprises internal obstructions 178 which are in the form of spherical objects. The second processing zone 174 is positioned between the reaction zone 173 and the first processing zone 175. As a result of the presence of the internal obstructions 178 in the second processing zone 174, the second processing zone 174 has a smaller open cross-sectional area than the first processing zone 175. The reactants flow through the first processing zone 175 and then through the second processing zone 174 which results in an increased local velocity for the reactants in the second processing zone 174. A liquid film layer forms on the catalyst 172. However, the increase in local velocity of the reactants flowing through the second processing zone 174 may have the effect of providing for a reduced thickness of the film layer. The reactants react in the presence of the catalyst to form the product. The product flows out of the process microchannel through additional zone 176.

FIG. 13 illustrates process microchannel 132f which comprises a reaction zone 173, a first processing zone 175 upstream from the reaction zone 173, and a second processing zone 174 positioned between the first processing zone 175 and the reaction zone 173. The second processing zone 174 comprises surface features 179 on the interior walls of the channel. The surface features 179 provide for reducing of the open cross-sectional area of the second processing zone and for modifying the flow of fluid in the second processing zone 174. The reactants flow through the first processing zone 175 and then through the second processing zone 174 which results in an increased local velocity for the reactants in the second processing zone 174. A liquid film layer forms on the catalyst 172. However, the increase in local velocity of the reactants flowing through the second processing zone 174 may have the effect of providing for a reduced thickness of the film layer. The reactants react in the presence of the catalyst to form the product. The product flows out of the process microchannel through additional zone 176.

FIG. 14 illustrates a process microchannel 132 g which comprises a reaction zone 173, a first processing zone 175 upstream from the reaction zone 173 and a second processing zone 174 positioned between the reaction zone 173 and the first processing zone 175. The first processing zone 175 and the second processing zone 174 having cross-sectional areas that are wider than the cross-sectional area of the reaction zone 173. The second processing zone 174 contains internal obstructions 178 in the form of spherical objects. The presence of these internal obstructions has the effect of reducing the open cross-sectional area of the second processing zone 174. Thus, the second processing zone 174 has a smaller open cross-sectional area than the first processing zone 175. The reactants flow through the first processing zone 175 and then through the second processing zone 174 which results in an increased local velocity for the reactants in the second processing zone 174. A liquid film layer forms on the catalyst 172. However, the increase in local velocity of the reactants flowing through the second processing zone 174 has the effect of providing for a reduced thickness of the film layer. The reactants react in the presence of the catalyst to form the product. The product flows out of the process microchannel through additional zone 176.

FIG. 15 illustrates repeating unit 200 which may be used in the reactor core 102. Repeating unit 200 is in the form of a staged addition repeating unit. Repeating unit 200 comprises process microchannel 210, heat exchange channel 220, second reactant stream channel 240, and apertured section 250. A common wall 241 separates process microchannel 210 and second reactant stream channel 240. The apertured section 250, which contains apertures 252 formed in sheet or plate 256, is positioned in common wall 241. The process microchannel 210 has a mixing zone 211, and a reaction zone 212. A catalyst 215 is positioned in the reaction zone 212. The mixing zone 211 is upstream from the reaction zone 212.

Processing zone 213 is upstream of the reaction zone 212 and includes the mixing zone 211. Processing zone 213 may contain internal obstructions (e.g., surface features) for enhancing the mixing of the reactants. Processing zone 213 may be referred to as a first processing zone. The second processing zone 217 may also be the reaction zone 212. The open cross-sectional area of the second processing zone 217 may be smaller than the open cross-sectional area of the first processing zone 213 as a result of the presence of the catalyst 215 in the second processing zone. The catalyst 215, as illustrated, is in the form of a bed of solid particulates. However, the catalyst 215 may be in the form of any of the catalysts disclosed in the specification and/or illustrated in the drawings. The liquid or first reactant flows through the feed stream header 104 and from there into process microchannel 210, as indicated by the arrow 214, and into the mixing zone 211. The gaseous or second reactant flows through the feed stream header 104 and from there into second reactant stream channel 240, as indicated by arrow 242. The gaseous or second reactant flows from the second reactant stream channel 240 through the apertured section 250 into mixing zone 211, as indicated by arrows 254. The direction of flow of the gaseous or second reactant in the second reactant stream channel 240, as indicated by arrow 242, is cocurrent with the direction of flow of the liquid or first reactant in the process microchannel 210, as indicated by arrow 214. Alternatively, the flow of the second reactant in the second reactant stream channel 240 may be counter-current or cross-current relative to the flow of the first reactant in the process microchannel 210. The liquid or first reactant and the gaseous or second reactant contact each other in the mixing zone 211 and form a reactant mixture. The reactant mixture flows from the mixing zone 211 into the reaction zone 212, contacts the catalyst 215, and reacts to form product. The reactants flow through the processing zone 213 and then through the second processing zone 217 which results in an increased local velocity for the reactants in the second processing zone 217. A liquid film layer may form on the catalyst 215. However, the local velocity of the reactants flowing through the second processing zone 217 may have the effect of providing for a reduced thickness of the film layer. The product, and any unreacted reactants and/or diluents, flow out of the process microchannel 210, as indicated by arrow 216. The product flowing out of the process microchannel 210 may flow through the product footer 106 and out of the microchannel reactor 100, as indicated by arrow 114. Heat exchange fluid flows from heat exchange header 108 through heat exchange channel 220 and then to heat exchange footer 110. The flow of heat exchange fluid through the heat exchange channel 220 may be co-current or counter-current to the flow of process fluid flowing in process microchannel 210. Alternatively, the heat exchange channel 220 may be oriented to provide for the flow of the heat exchange fluid in a direction that is cross-current to the flow of process fluid in the process microchannel 210.

In an alternate embodiment of the repeating unit 200 illustrated in FIG. 15, a supplemental mixing zone may be provided in the process microchannel 210 between the mixing zone 211 and reaction zone 212. This supplemental mixing zone comprises part of the first processing zone 213. The residence time for mixing in the supplemental mixing zone may be defined using the sum of the total of the flow through the apertured section 250 and the flow of the first reactant feed stream in process microchannel 210, at standard conditions of temperature (i.e., 0° C.) and pressure (i.e., atmospheric pressure), and the volume defined by the process microchannel 210 between the end of the mixing zone 211 and the beginning of the reaction zone 212. This residence time for mixing in the supplemental mixing zone may be in the range up to about 500 milliseconds (ms), and in one embodiment from about 0.25 ms to about 500 ms, and in one embodiment from about 0.25 ms to about 250 ms, and in one embodiment from about 0.25 to about 50 ms, and in one embodiment from about 0.25 to about 2.5 ms.

The repeating unit 200A illustrated in FIG. 16 is identical to the repeating unit 200 illustrated in FIG. 15 with the exception that the repeating unit 200A does not contain the separate mixing zone 211. With repeating unit 200A, the second reactant flows through the apertured section 250 into the reaction zone 212 where it contacts the first reactant and the catalyst, and reacts to form product. The product, and any unreacted reactants and/or diluents, then flow out of the process microchannel 210, as indicated by arrow 216.

The repeating unit 200B illustrated in FIG. 17 is identical to the repeating unit 200 illustrated in FIG. 15 with the exception that part of the second reactant mixes with the first reactant in the mixing zone 211, and the remainder of the second reactant mixes with the first reactant in the reaction zone 212. The amount of the second reactant that mixes with the first reactant in the mixing zone 211 may be in the range from about 1% to about 99% by volume of the second reactant, and in one embodiment from about 5% to about 95% by volume, and in one embodiment from about 10% to about 90% by volume, and in one embodiment from about 20% to about 80% by volume, and in one embodiment from about 30% to about 70% by volume, and in one embodiment from about 40% to about 60% by volume of the second reactant. The remainder of the second reactant mixes with the first reactant in the reaction zone 212. The addition of the gaseous or second reactant into the reaction zone may provide the additional benefit of increasing the gas superficial velocity in the reaction zone. This may result in further thinning of the liquid film layer that may form on the catalyst.

The number of microchannels in each of the microchannel layers 130 and 150 may be any desired number, for example, one, two, three, four, five, six, eight, ten, hundreds, thousands, tens of thousands, hundreds of thousands, millions, etc. Similarly, the number of repeating units 170 (or 170a through 170d) or 200 (or 200A or 200B) in the microchannel reactor core 102 may be any desired number, for example, one, two, three, four, six, eight, ten, hundreds, thousands, etc.

The process microchannels 132-132g and 210 are microchannels. The second reactant stream channels 240 may be microchannels although they may have larger dimensions that would not characterize them as microchannels. The process microchannels 132-132g and 210, and second reactant stream channels 240, may have at least one internal dimension of height or width of up to about 10 mm, and in one embodiment up to about 5 mm, and in one embodiment up to about 2 mm, over all or only part of the length of the channels, for example, over about 1% to about 100% of the length of the channels, and in one embodiment over about 5% to about 100% of the length, and in one embodiment over about 20% to about 80% of the length. In one embodiment the height or width may be in the range from about 0.05 to about 10 mm, and in one embodiment from about 0.05 to about 5 mm, and in one embodiment from about 0.05 to about 2 mm, and in one embodiment from about 0.05 to about 1.5 mm, and in one embodiment from about 0.05 to about 1 mm, and in one embodiment from about 0.05 to about 0.5 mm. The height or width may be in the range from about 0.15 to about 10 mm, and in one embodiment from about 0.2 to about 10 mm, and in one embodiment from about 0.3 to about 10 mm. The height or width may be in the range from about 0.2 to about 5 mm, and in one embodiment from about 0.2 to about 3 mm, and in one embodiment from about 0.3 to about 2 mm. The other internal dimension of height or width may be of any value, for example, it may range up to about 100 cm, and in one embodiment from about 0.01 to about 100 cm, and in one embodiment from about 0.1 cm to about 100 cm, and in one embodiment from about 0.1 to about 75 cm, and in one embodiment from about 0.1 to about 50 cm, and in one embodiment about 0.2 cm to about 25 cm. The length of the process microchannels and second reactant stream channels may be of any value, although, as suggested by the drawings, the length of the second reactant stream channels may be less than the length of the next adjacent process microchannels. The lengths of each of these channels may be in the range up to about 15 meters, and in one embodiment in the range from about 0.01 to about 10 meters, and in one embodiment from about 0.01 to about 5 meters, and in one embodiment from about 0.01 to about 2.5 meters, and in one embodiment from about 0.01 to about 1 meter, and in one embodiment from about 0.02 to about 0.5 meters, and in one embodiment from about 0.02 to about 0.25 meter. The length may be in the range from about 15 cm to about 15 m.

The heat exchange channels 152, 152*a* and 220 may be microchannels or they may have larger dimensions. Each of the heat exchange channels 152, 152*a* and 220 may have a cross section having any shape, for example, a square, rectangle, circle, semi-circle, etc. Each of the heat exchange channels 152, 152*a* and 220 may have an internal height or gap of up to about 10 mm, and in one embodiment in the range from about 0.05 to about 10 mm, and in one embodiment from about 0.05 to about 5 mm, and in one embodiment from about 0.05 to about 2 mm. The width of each of these channels may be of any dimension, for example, up to about 3 meters, and in one embodiment from about 0.01 to about 3 meters, and in one embodiment from about 0.1 to about 3 meters. The length of each of the heat exchange channels 152 and 220 may be of any dimension, for example, up to about 10 meters, and in one embodiment from about 0.01 to about 10 meters, and in one embodiment from about 0.01 to about 5 meters, and in one embodiment from 0.01 to about 2.5 meters, and in one embodiment from about 0.01 to about 1 meter, and in one embodiment from about 0.02 to about 0.5 meter, and in one embodiment from about 0.02 to about 0.25 meter. The length may be in the range from about 15 cm to about 15 m.

The process microchannel 132-132*g* or 210, second reactant stream channel 240, and/or heat exchange channels 152, 152*a* or 220 may have cross sections that are rectangular, or alternatively they may have cross sections having any shape, for example, a square, circle, semi-circle, trapezoid, etc. The shape and/or size of the cross section of the process microchannel 132-132*g* or 210, second reactant stream channel 240, and/or heat exchange channel 152, 152*a* or 220 may vary over its length. For example, the height or width may taper from a relatively large dimension to a relatively small dimension, or vice versa, over the length of the microchannel.

The separation between adjacent process microchannels, second reactant stream channels and/or heat exchange channels may be in the range from about 0.05 mm to about 50 mm, and in one embodiment about 0.1 to about 10 mm, and in one embodiment about 0.2 mm to about 2 mm.

The flow and/or mixing within the process microchannels 132-132*g* or 210, second reactant stream channels 240, and/or heat exchange channels 152, 152*a* or 220 may be modified by the use of surface features formed on one, two or more interior walls of such channels. The internal obstructions in the processing zone of the process microchannels may be in the form of such surface features. The structures for contacting and/or supporting the catalyst in the reaction zones may be in the form of such surface features. The sub-microchannels used in the reaction zone may contain such surface features. The surface features may be in the form of depressions in and/or projections from one or more of the channel walls. These surface features may be oriented at angles relative to the direction of flow through the channels. The surface features may be aligned at an angle from about 1° to about 89°, and in one embodiment from about 30° to about 75°, relative to the direction of flow. The angle of orientation may be an oblique angle. The angled surface features may be aligned toward the direction of flow or against the direction of flow. The flow of fluids in contact with the surface features may force one or more of the fluids into depressions in the surface features, while other fluids may flow above the surface features. Flow within the surface features may conform with the surface feature and be at an angle to the direction of the bulk flow in the channel. As fluid exits the surface features it may exert momentum in the x and y direction for an x,y,z coordinate system wherein the bulk flow is in the z direction. This may result in a churning or rotation in the flow of the fluids. This pattern may be helpful for mixing a two-phase flow as the imparted velocity gradients may create fluid shear that breaks up one of the phases into small and well dispersed droplets.

Two or more surface feature regions within the process microchannels 132-132*g* or 210 may be placed in series such that mixing of the process fluids may be accomplished using a first surface feature region, followed by at least one second surface feature region where a different flow pattern may be used. The second flow pattern may be used to separate one or more liquids or gases from the fluid mixture. In the second surface feature region, a flow pattern may be used that creates a centrifugal force that drives one liquid toward the interior walls of the process microchannels while another liquid remains in the fluid core. One pattern of surface features that may create a strong central vortex may comprise a pair of angled slots on the top and bottom of the process microchannel. This pattern of surface features may be used to create a central swirling flow pattern.

The apertured section 250 may comprise an interior portion that forms part of one or more of the interior walls of process microchannel 210. A surface feature sheet may overlie this interior portion of the apertured section. Surface features may be formed in and/or on the surface feature sheet. The second reactant stream may flow through the apertured section and the surface feature sheet into the process microchannel. Part of the second reactant stream may be detached from the surface of the surface feature sheet while part may flow within the surface features of the surface feature sheet. The surface feature sheet may contain angled surface features that have relatively small widths or spans relative to the overall flow length. The surface feature sheet may provide mechanical support for the apertured section. The surface features may impart a vortical flow pattern to the fluids in the process microchannel and promote good mixing and/or promote the formation of small droplets. The vortical flow pattern may impart shear to the second reactant stream flowing through the apertured section and thus reduce the size of gas bubbles and/or liquid droplets in the bulk flow path.

Figure 36:
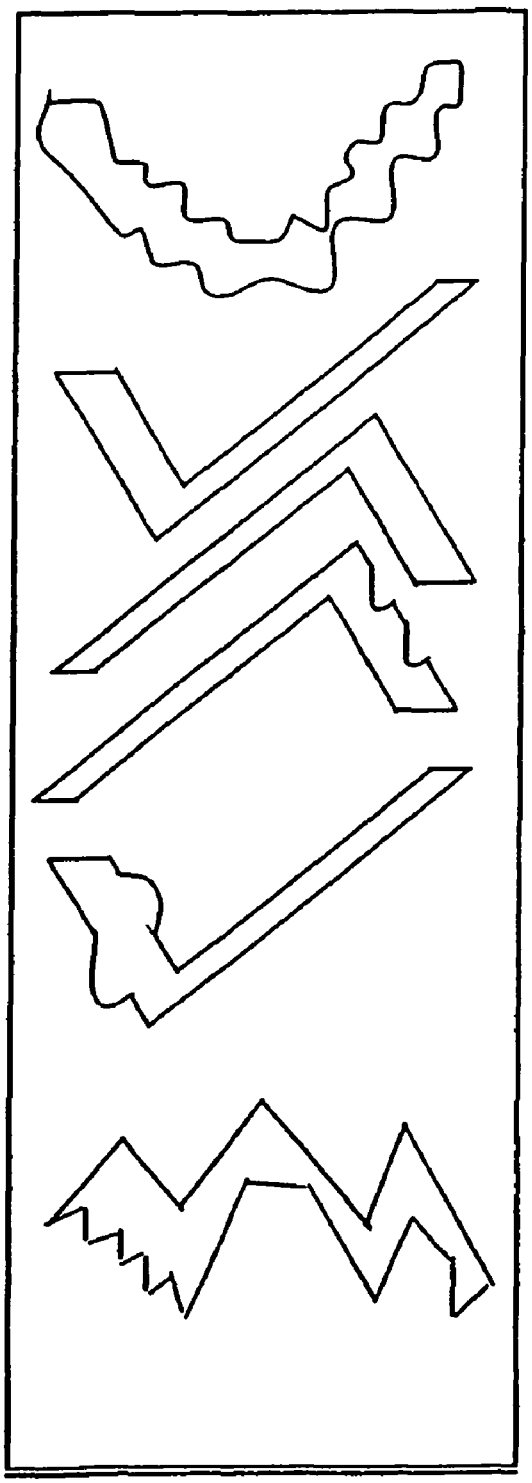
FIGS. 36 and 37 are schematic illustrations of surface features that may be used in microchannels used with the disclosed process.
Figure 37:
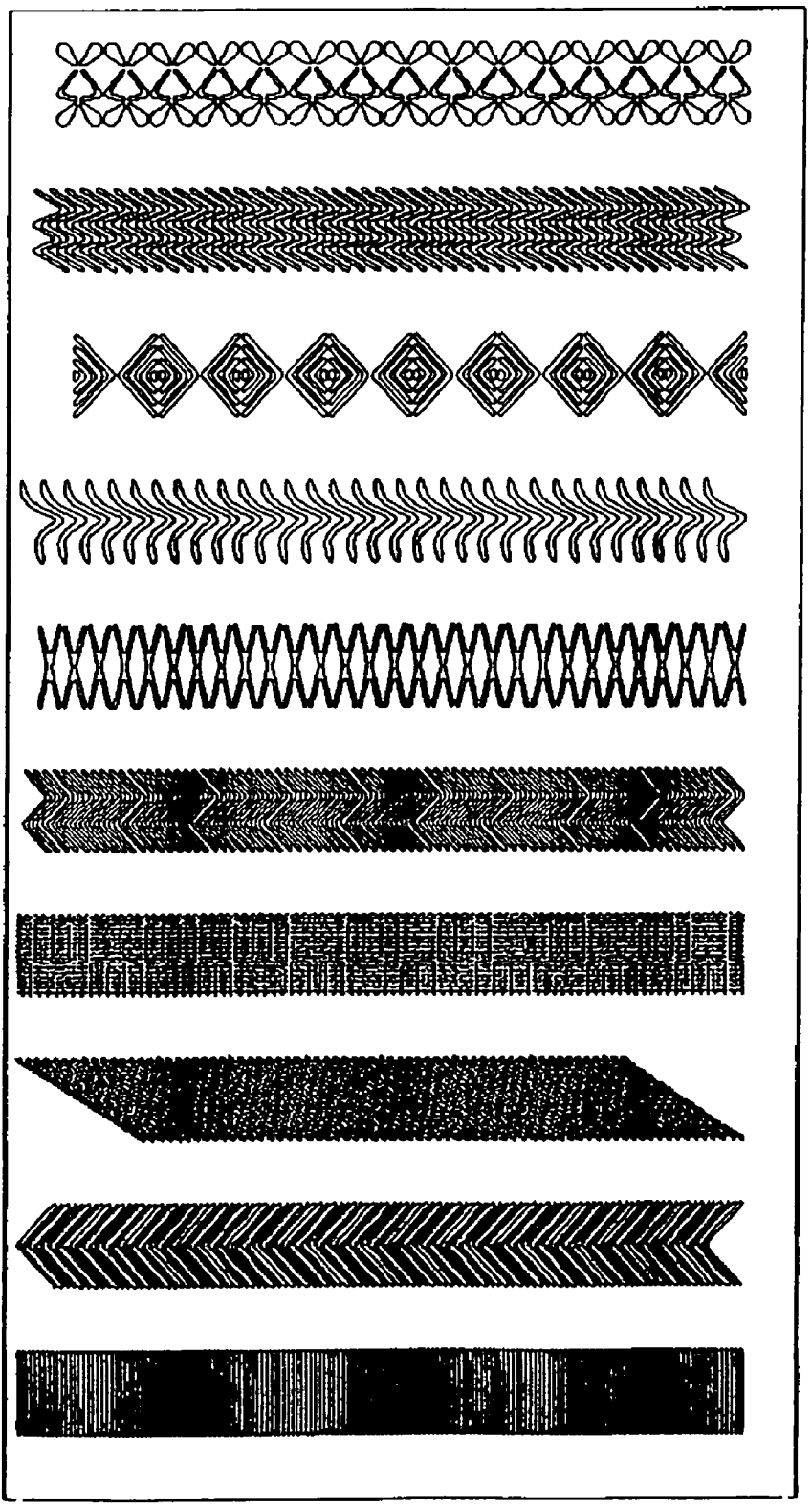

Examples of the surface features include those illustrated in FIGS. 36-37. The surface features may have two or more layers stacked on top of each other or intertwined in a three-dimensional pattern. The pattern in each discrete layer may be the same or different. Flow may rotate or advect in each layer or only in one layer. Sub-layers, which may not be adjacent to the bulk flow path of the channel, may be used to create additional surface area. The flow may rotate in the first level of surface features and diffuse molecularly into the second or more sublayers to promote reaction. Three-dimensional surface features may be made via metal casting, photochemical machining, laser cutting, etching, ablation, or other processes where varying patterns may be broken into discrete planes as if stacked on top of one another. Three-dimensional surface features may be provided adjacent to the bulk flow path within the microchannel where the surface features have different depths, shapes, and/or locations accompanied by sub-features with patterns of varying depths, shapes and/or locations.

The use of surface features or fully etched plates with patterns may be advantageous to provide structural support for thin or weak apertured plates or sheets used to form the apertured section 250. In one embodiment, the apertured section 250 may be made from a polymeric material that has very small mean pore diameters (less than 1 micron) but can withstand a high pressure differential (greater than about 10 psi, or greater than about 50 psi, or greater than about 100 psi, or larger) that may be required to force the second reactant stream through the apertured section 250 into the process microchannel 210. The open span required for structural support may be reduced from the cross section of the process microchannel 210 to the open span and run the length of the surface feature. The span of the surface feature may be made smaller as required if the apertured sheet or plate has reduced mechanical integrity. One advantage of the surface features, may be that convective flow, which may occur within the surface features, may create a significant shear stress at the wall of the apertured section 250 to assist with the detachment of small gas bubbles and/or liquid droplets.

An example of a three-dimensional surface feature structure may comprise recessed oblique angles or chevrons at the interface adjacent the bulk flow path of the microchannel. Beneath the chevrons there may be a series of three-dimensional structures that connect to the surface features adjacent to the bulk flow path but are made from structures of assorted shapes, depths, and/or locations. It may be further advantageous to provide sublayer passages that do not directly fall beneath an open surface feature that is adjacent to the bulk flow path within the microchannel but rather connect through one or more tortuous two-dimensional or three-dimensional passages. This approach may be advantageous for creating tailored residence time distributions in the microchannels, where it may be desirable to have a wider versus more narrow residence time distribution.

The length and width of a surface feature may be defined in the same way as the length and width of a microchannel. The depth may be the distance which the surface feature sinks into or rises above the microchannel surface. The depth of the surface features may correspond to the direction of stacking a stacked and bonded microchannel device with surface features formed on or in the sheet surfaces. The dimensions for the surface features may refer the maximum dimension of a surface feature; for example the depth of a rounded groove may refer to the maximum depth, that is, the depth at the bottom of the groove.

The surface features may have depths that are up to about 5 mm, and in one embodiment up to about 2 mm, and in one embodiment in the range from about 0.01 to about 5 mm, and in one embodiment in the range from about 0.01 to about 2 mm, and in one embodiment in the range from about 0.01 mm to about 1 mm. The width of the surface features may be sufficient to nearly span the microchannel width (for example, herringbone designs), but in one embodiment (such as fill features) may span about 60% or less of the width of the microchannel, and in one embodiment about 50% or less, and in one embodiment about 40% or less, and in one embodiment from about 0.1% to about 60% of the microchannel width, and in one embodiment from about 0.1% to about 50% of the microchannel width, and in one embodiment from about 0.1% to about 40% of the microchannel width. The width of the surface features may be in the range from about 0.05 mm to about 100 cm, and in one embodiment in the range from about 0.5 mm to about 5 cm, and in one embodiment in the range from about 1 to about 2 cm.

Multiple surface features or regions of surface features may be included within a microchannel, including surface features that recess at different depths into one or more microchannel walls. The spacing between recesses may be in the range from about 0.01 mm to about 10 mm, and in one embodiment in the range from about 0.1 to about 1 mm. The surface features may be present throughout the entire length of a microchannel or in portions or regions of the microchannel. The portion or region having surface features may be intermittent so as to promote a desired mixing or unit operation (for example, separation, cooling, etc.) in tailored zones. For example, a one-centimeter section of a microchannel may have a tightly spaced array of surface features, followed by four centimeters of a flat channel without surface features, followed by a two-centimeter section of loosely spaced surface features. The term "loosely spaced surface features" may be used to refer to surface features with a pitch or feature to feature distance that is more than about five times the width of the surface feature.

The surface features may be positioned in one or more surface feature regions that extend substantially over the entire axial length of a channel. In one embodiment, a channel may have surface features extending over about 50% or less of its axial length, and in one embodiment over about 20% or less of its axial length. In one embodiment, the surface features may extend over about 10% to about 100% of the axial length of the channel, and in one embodiment from about 20% to about 90%, and in one embodiment from about 30% to about 80%, and in one embodiment from about 40% to about 60% of the axial length of a channel.

FIGS. 36 and 37 show a number of different patterns that may be used for surface features. Other patterns may be used. These patterns may be used in different axial or lateral sections of a microchannel.

The process microchannels 132-132*g* and 210, second reactant stream channels 240 and/or heat exchange channels 152, 152*a* and 220 may have their interior walls coated with a lipophobic coating (the same coating may also provide hydrophobic properties) to reduce surface energy. Teflon may be an example of a coating material that may exhibit both lipophobic and hydrophobic tendencies. The surface of the apertured section 240 that faces the interior of the process microchannel 210 may be coated with a lipophobic coating to reduce droplet drag and promote the formation of smaller droplets. The coating on the apertured section may reduce the energy required to detach a droplet from the surface of the apertured section. In addition, the drag exerted on the second reactant stream may be lower during droplet detachment and while flowing beyond the apertured section downstream in the process microchannel. In one embodiment, a hydrophobic coating may be applied to the apertured section to assist with the detachment of droplets. In one embodiment, fluids may not wet surfaces coated with the lipophobic coating. As such, the fluids may slip past the surface and thus negate or reduce the usual no-slip boundary condition of fluids against a wall. As the fluids slip, the local friction factor may decrease as a result of reduced drag and the corresponding pressure drop may be reduced per unit length of the channels. The local heat transfer rate may increase as a result of forced convection over a coated surface as opposed to conductive heat transfer through a stagnant film. The effect of the coating may have a different impact on different types of non-Newtonian fluids. For the case of pseudoplastic (power law) fluid without yield may appear Newtonian above shear rates that are fluid dependent. The viscosity of the fluid may be higher when the shear rate is below a certain value. If the shear rate is locally larger because of the coated wall, then the fluid may be able to shear droplets more easily, move with less energy (lower pumping requirements), and have better heat transfer properties than if the coating were not used. For the case of pseudoplastic (power law) fluid with yield may still have a yield stress, at the wall the yield stress may be greatly reduced with the use of the lipophobic coating. Heat transfer and frictional properties may be enhanced if the apparent yield is low when the coating is used as compared to when the coating is not used. The shear-related effects may be more pronounced for non-Newtonian fluids than for Newtonian fluids.

The microchannel reactor 100, including the microchannel reactor core 102, may be constructed of any material that provides sufficient strength, dimensional stability and heat transfer characteristics for carrying out the inventive process. Examples of suitable materials may include steel (e.g., stainless steel, carbon steel, and the like), aluminum, titanium, nickel, and alloys of any of the foregoing metals, plastics (e.g., epoxy resins, UV cured resins, thermosetting resins, and the like), monel, inconel, ceramics, glass, composites, quartz, silicon, or a combination of two or more thereof. The microchannel reactor may be fabricated using known techniques including wire electrodischarge machining, conventional machining, laser cutting, photochemical machining, electrochemical machining, molding, water jet, stamping, etching (for example, chemical, photochemical or plasma etching) and combinations thereof. The microchannel reactor may be constructed by forming layers or sheets with portions removed that allow flow passage. A stack of sheets may be assembled via diffusion bonding, laser welding, diffusion brazing, and similar methods to form an integrated device. The microchannel reactor may have appropriate manifolds, valves, conduit lines, etc. to control flow of the reactants and product, and the flow of heat exchange fluid. These are not shown in the drawings, but can be readily provided by those skilled in the art.

The microchannel reactor core 102 may be made by the process illustrated in FIG. 4. This process includes laminating or diffusion bonding thin sheets of any of the above-indicated materials (e.g., metal, plastic or ceramic) so that each layer has a defined geometry of channels and openings through which to convey fluids. After the individual layers are created, they may be stacked in a prescribed order to build up the lamination. The layers may be stacked side-by-side or one above the other. The completed stack may then be diffusion bonded to prevent fluids from leaking into or out of the microchannel reactor or between streams. After bonding, the device may be trimmed to its final size and prepared for attachment of pipes and manifolds. An additional step for the process microchannels that contain the catalyst may be to integrate the catalyst into the device prior to final assembly.

Feature creation methods may include photochemical etching, milling, drilling, electrical discharge machining, laser cutting, and stamping. A useful method for mass manufacturing is stamping. In stamping, care should be taken to minimize distortion of the material and maintain tight tolerances of channel geometries, for example, less than about ±0.5 mm displacement of feature location. Preventing distortion, maintaining shim alignment and ensuring that layers are stacked in the proper order are factors that should be controlled during the stacking process.

The stack may be bonded through a diffusion process. In this process, the stack may be subjected to elevated temperatures and pressures for a precise time period to achieve the desired bond quality. Selection of these parameters may require modeling and experimental validation to find bonding conditions that enable sufficient grain growth between metal layers.

The next step, after bonding, may be to machine the device. A number of processes may be used, including conventional milling with high-speed cutters, as well as highly modified electrical discharge machining techniques. A full-sized bonded microchannel reactor unit or sub-unit that has undergone post-bonding machining operations may comprise, for example, tens, hundreds or thousands of shims.

The process microchannels 132-132g or 210, second reactant stream channels 240, and heat exchange channels 152, 152a or 220 that may be used in the microchannel reactor core 102 may have rectangular cross sections and be aligned in side-by-side vertically oriented planes or horizontally oriented stacked planes. These planes may be tilted at an inclined angle from the horizontal. These configurations may be referred to as parallel plate configurations. Various combinations of process microchannels, second reactant stream channels and heat exchange channels may be employed. Combinations of these rectangular channels may be arranged in modularized compact repeating units for scale-up.

The cross-sectioned shape and size of the process microchannels 132-132g and 210 may vary along their axial length to accommodate changing hydrodynamics within the channel. For example, if a reaction is conducted and one of the reactants is in excess, the fluidic properties of the reaction mixture may change over the course of the reaction. Surface features may be used to provide a different geometry, pattern, angle, depth, or ratio of size relative to the cross-section of the process microchannel along its axial length to accommodate these hydrodynamic changes.

The process microchannels 210 and the second reactant stream channels 240 may be formed from parallel spaced sheets and/or plates, the second reactant stream channels being adjacent to the process microchannels. The heat exchange channels 220 may be formed from parallel spaced sheets and/or plates. The heat exchange channels may be adjacent to the process microchannels, the second reactant stream channels, or both the process microchannels and the second reactant stream channels. The process microchannels and second reactant stream channels may be aligned in interleaved side-by-side planes or interleaved planes stacked one above another.

The process microchannel 210 and the second reactant stream channel 240 may comprise circular tubes aligned concentrically. The process microchannel may be in an annular space and the second reactant stream channel may be in the center space or an adjacent annular space. The process microchannel may be in the center space and the second reactant stream channel may be in an adjacent annular space.

The apertures 252 in the apertured section 250 may be of sufficient size to permit the flow of the second reactant stream through the apertured section. The apertures may be referred to as pores. The apertured sections 250 may have thicknesses in the range from about 0.01 to about 50 mm, and in one embodiment about 0.05 to about 10 mm, and in one embodiment about 0.1 to about 2 mm. The apertures 252 may have average diameters in the range up to about 1000 microns, and in one embodiment up to about 250 microns, and in one embodiment up to about 50 microns, and in one embodiment in the range from about 0.001 to about 50 microns, and in one embodiment from about 0.05 to about 50 microns, and in one embodiment from about 0.1 to about 50 microns. In one embodiment, the apertures may have average diameters in the range from about 0.5 to about 10 nanometers (nm), and in one embodiment about 1 to about 10 nm, and in one embodiment about 5 to about 10 nm. The number of apertures 252 in the apertured sections 250 may be in the range from about 1 to about $5 \times 10^8$ apertures per square centimeter, and in one embodiment about 1 to about $1 \times 10^6$ apertures per square centimeter. The apertures may or may not be isolated from each other. A portion or all of the apertures may be in fluid communication with other apertures within the apertured section; that is, a fluid may flow from one aperture to another aperture. The ratio of the thickness of the apertured sections 250 to the length of the apertured sections along the process flow path of the fluids flowing in the process microchannels 210 may be in the range from about 0.001 to about 1, and in one embodiment about 0.01 to about 1, and in one embodiment about 0.03 to about 1, and in one embodiment about 0.05 to about 1, and in one embodiment about 0.08 to about 1, and in one embodiment about 0.1 to about 1.

Figure 28:
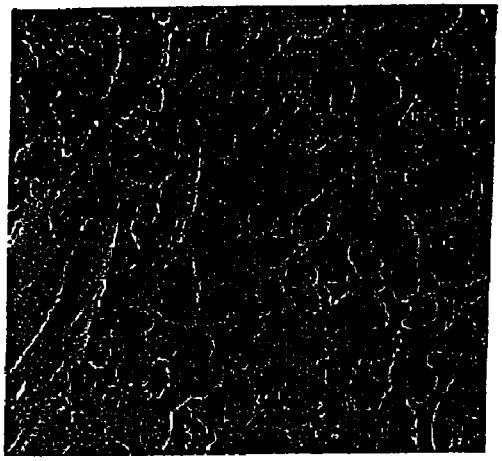
FIG. 28 is a scanning electron microscopic (SEM) image of a porous stainless steel substrate before being heat treated. This substrate may be used for making an apertured section for a staged addition repeating unit. The staged addition repeating unit may be used in the microchannel reactor illustrated in FIG. 2.
Figure 29:
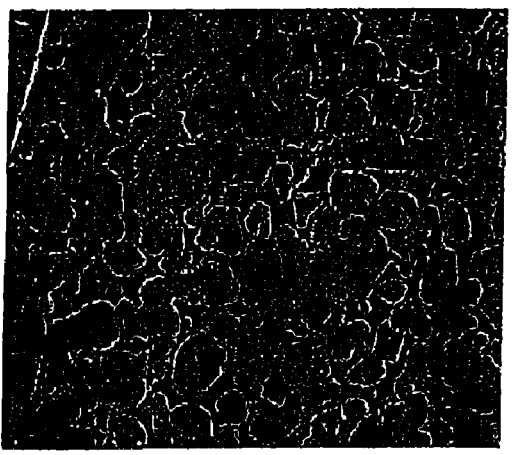
FIG. 29 is an SEM image of the substrate illustrated in FIG. 28 after being heat treated. This substrate may be used for making an apertured section for a staged addition repeating unit. The staged addition repeating unit may be used in the microchannel reactor illustrated in FIG. 2.

The apertured sections 250 may be constructed of any material that provides sufficient strength and dimensional stability to permit the operation of the process. These materials may include: steel (e.g., stainless steel, carbon steel, and the like); monel; inconel; aluminum; titanium; nickel; platinum; rhodium; copper; chromium; brass; alloys of any of the foregoing metals; polymers (e.g., thermoset resins); ceramics; glass; composites comprising one or more polymers (e.g., thermoset resins) and fiberglass; quartz; silicon; microporous carbon, including carbon nanotubes or carbon molecular sieves; zeolites; or a combination of two or more thereof. The apertures may be formed using known techniques such as laser drilling, microelectro machining system (MEMS), lithography electrodeposition and molding (LIGA), electrical sparkling, or electrochemical or photochemical etching. The apertures may be formed using techniques used for making structured plastics, such as extrusion, or membranes, such as aligned carbon nanotube (CNT) membranes. The apertures may be formed using techniques such as sintering or compressing metallic powder or particles to form tortuous interconnected capillary channels and the techniques of membrane fabrication. The aperatures may be reduced in size from the size provided by any of these methods by the application of coatings over the apertures internal side walls to partially fill the apertures. The selective coatings may also form a thin layer exterior to the porous body that provides the smallest pore size adjacent to the continuous flow path. The smallest average pore opening may be in the range from about one nanometer to about several hundred microns depending upon the desired droplet size for the emulsion. The aperatures may be reduced in size by heat treating as well as by methods that form an oxide scale or coating on the internal side walls of the apertures. These techniques may be used to partially occlude the aperatures to reduce the size of the openings for flow. FIGS. 28 and 29 show a comparison of SEM surface structures of a stainless steel porous substrate before and after heat treatment at the same magnification and the same location. FIG. 28 shows the surface before heat treating and FIG. 29 shows the surface after heat treating. The surface of the porous material after the heat treatment has a significantly smaller gap and opening size. The average distance between the openings is correspondingly increased.

Figure 30:
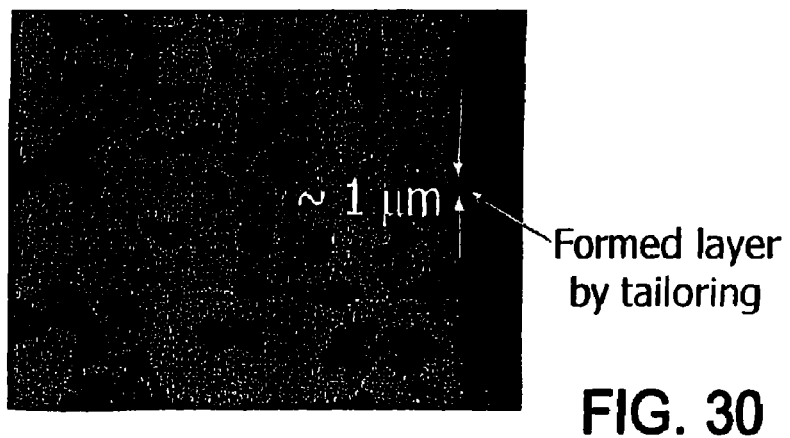
FIG. 30 is an SEM image of a tailored porous substrate which may be used for making an apertured section for a staged addition repeating unit. The staged addition repeating unit may be used in the microchannel reactor illustrated in FIG. 2.

The apertured sections 250 may be made from a metallic or nonmetallic porous material having interconnected channels or pores of an average pore size in the range from about 0.01 to about 200 microns. These pores may function as the apertures 252. The porous material may be made from powder or particulates so that the average inter-pore distance is similar to the average pore size. When very small pore sizes are used, the inter-pore distance may also be very small. The porous material may be tailored by oxidization at a high temperature in the range from about 300° C. to about 1000° C. for a duration of about 1 hour to about 20 days, or by coating a thin layer of another material such as alumina by sol coating or nickel using chemical vapor deposition over the surface and the inside of pores to block the smaller pores, decrease pore size of larger pores, and in turn increase the inter-pore distance. An SEM image of a tailored substrate or apertured section is shown in FIG. 30.

The making of substrates for use as apertured sections 250 with sufficiently small apertures or pores 252 to provide reactants having gas bubble sizes smaller than about one micron may be problematic but can be accomplished as indicated below. A reason for the problem may lie in the fact that relatively high surface roughness may occur with untreated regular porous materials such as a metallic porous substrates made from powder/particles by compression and/or sintering. These metallic porous substrates may not have the required pore size in the surface region when a given nominal pore size is lower than a certain value. While the bulk of the porous material may have the specified nominal pore size, the surface region may be characterized by merged pores and cavities of much larger sizes. This problem may be overcome by tailoring these substrates to provide for the desired pore size and inter-pore distance in the surface region. This may be done by removing a surface layer from the porous substrate and adding a smooth new surface with smaller openings. The gas bubble size in the reactant mixture that may be formed using these tailored substrates may be reduced without increasing the pressure drop across the substrate. Since direct grinding or machining of the porous surface may cause smearing of the surface structure and blockage of the pores, the porous structure may be filled with a liquid filler, followed by solidification and mechanical grinding/polishing. The filler may then be removed to regain the porous structure of the material. The filler may be a metal with a low melting point such as zinc or tin or the precursor of a polymer such as an epoxy. The liquid filling and removing steps may be assisted by the use of a vacuum. Grinding/polishing may be effected using a grinding machine and a grinding powder. Metal filler removal may be effected by melting and vacuum suction, or by acid etching. Epoxies or other polymers may be removed by solvent dissolution or by burn-off in air.

Figure 31:
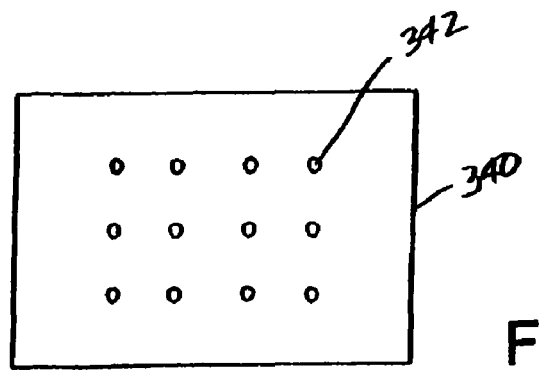
FIG. 31 is a schematic illustration of a plan view of an apertured sheet which may be used in making an apertured section for a staged addition repeating unit. The staged addition repeating unit may be used in the microchannel reactor illustrated in FIG. 2.
Figure 32:
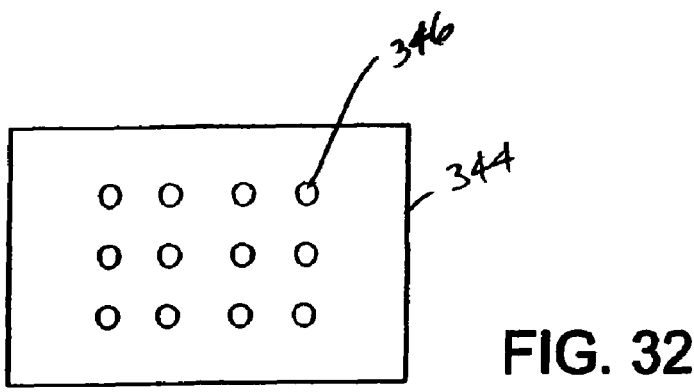
FIG. 32 is a schematic illustration of a plan view of an apertured sheet or plate which may be used in making an apertured section for a staged addition repeating unit. The staged addition repeating unit may be used in the microchannel reactor illustrated in FIG. 2.
Figure 33:
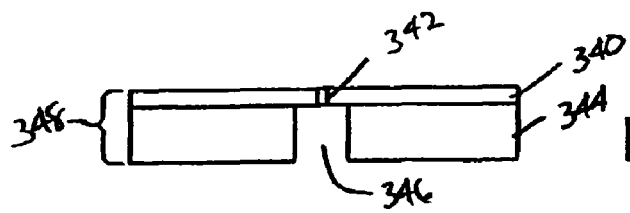
FIG. 33 is a schematic illustration of a relatively thin apertured sheet overlying a relatively thick apertured sheet or plate which may be used in making an apertured section for a staged addition repeating unit. The staged addition repeating unit may be used in the microchannel reactor illustrated in FIG. 2.

Referring to FIGS. 31-33, the apertured section 250, in one embodiment, may be constructed of a relatively thin sheet 340 containing relatively small apertures 342, and a relatively thick sheet or plate 344 containing relatively large apertures 346. The apertures 342 may be aligned with or connected to the apertures 346. The relatively thin sheet 340 overlies and is bonded to the relatively thick sheet or plate 344, the relatively thin sheet 340 facing the interior of process microchannel 210 and the relatively thick sheet 344 facing the interior of the second reactant stream channel 240. The relatively thin sheet 340 may be bonded to the relatively thick sheet 344 using any suitable procedure (e.g., diffusion bonding) to provide a composite construction 348 with enhanced mechanical strength. The relatively thin sheet 340 may have a thickness in the range from about 0.001 to about 0.5 mm, and in one embodiment about 0.05 to about 0.2 mm. The relatively small apertures 342 may have any shape, for example, circular, triangular or rectangular. The relatively small apertures 342 may have an average diameter in the range from about 0.05 to about 50 microns, and in one embodiment about 0.05 to about 20 microns. The relatively thick sheet or plate 344 may have a thickness in the range from about 0.01 to about 5 mm, and in one embodiment about 0.1 to about 2 mm. The relatively large apertures 346 may have any shape, for example, circular, triangular or rectangular. The relatively large apertures 346 may have an average diameter in the range from about 0.01 to about 4000 microns, and in one embodiment about 1 to about 2000 microns, and in one embodiment about 10 to about 1000 micron. The total number of apertures 342 in sheet 340 and the total number of apertures 346 in sheet or plate 344 may be in the range from about 1 to about 10000 apertures per square centimeter, and in one embodiment from about 1 to about 1000 apertures per square centimeter. The sheet 340 and the sheet or plate 344 may be constructed of any of the materials described above as being useful for constructing the apertured section 250. The apertures 342 and 346 may be aligned or connected in such a manner that fluid flowing through the apertured section 250 flows initially through the apertures 346 then through the apertures 342. The relatively short passageway for the fluid to flow through the relatively small apertures 342 enables the fluid to flow through the apertures 342 with a relatively low pressure drop as compared to the pressure drop that would occur if the passageway in the apertures had a depth equal to the combined depth of apertures 342 and 346.

Figure 34:
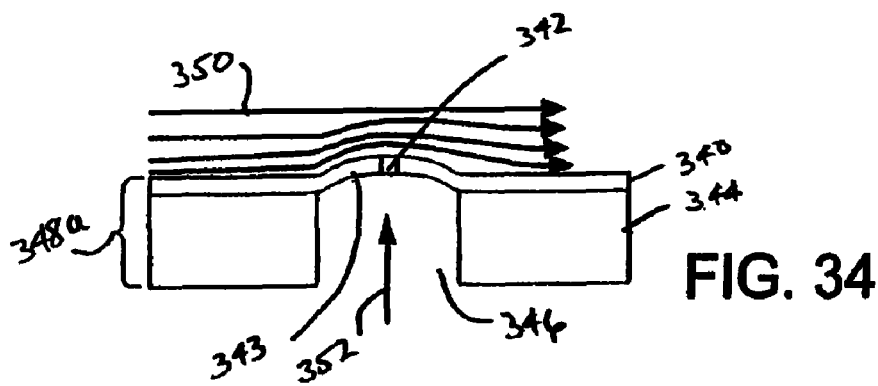
FIG. 34 is a schematic illustration of a relatively thin apertured sheet overlying a relatively thick apertured sheet or plate which may be used in making an apertured section for a staged addition repeating unit. The staged addition repeating unit may be used in the microchannel reactor illustrated in FIG. 2.

In the embodiment illustrated in FIG. 34, the composite construction 348a has the same design as illustrated in FIG. 33 with the exception that convex portion 343 of the relatively thin sheet 340 covering the aperture 346 is provided. Convex portion 343 provides increased local shear force in the adjacent channel. The second reactant feed stream flows through the apertures 346 and 342 in the direction indicated by arrow 352. The directional arrows 350 in FIG. 34 show the flow of the first reactant feed stream in the process microchannel adjacent to the aperture 342. The increased local shear force may lead to a smaller gas bubble or liquid droplet size for the fluid flowing through the aperture 342.

Figure 35:
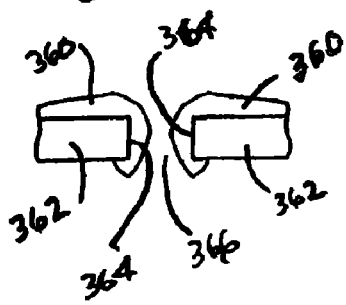
FIG. 35 is a schematic illustration of an alternate embodiment of an aperture that may be used in the apertured section of a staged addition repeating unit that may be used in the microchannel reactor illustrated in FIG. 2. The aperture has a coating partially filling it and overlying its sidewalls.

In the embodiment illustrated in FIG. 35, a surface coating 360 is deposited on the surface of sheet or plate 362 and on the internal sidewalls 364 of aperture 366. This coating provides a facilitated way of reducing the diameter of the apertures. The coating material used to form coating 360 may be alumina, nickel, gold, or a polymeric material (e.g., Teflon). The coating 360 may be applied to the sheet or plate 332 using known techniques including chemical vapor deposition, metal sputtering, metal plating, sintering, sol coating, and the like. The diameter of the apertures may be controlled by controlling the thickness of the coating 360.

The apertured section 250 may be formed from an asymmetric porous material, for example, a porous material having multiple layers of sintered particles. The number of layers may be two, three, or more. An advantage of these multilayered substrates is that they may provide enhanced durability and adhesion. Examples may include sintered ceramics that have relatively large pores on one side and relatively small pores on the other side. The relatively small pores may have diameters in the range form about 2 to about 10 nanometers (nm). The relatively small pores may be positioned in a relatively thin layer of the multilayered substrate. The relatively thin layer may have a thickness in the range from about 1 to about 10 microns. The side with the relatively small pores may be placed facing the interior of the process microchannel 210 to take advantage of relatively high shear forces to remove the relatively small gas bubbles of reactant as they are formed.

The apertured section 250 may extend along at least about 5% of the axial length of the process microchannel 210, and in one embodiment at least about 20% of the axial length of the process microchannel, and in one embodiment at least about 35% of the axial length of the process microchannel, and in one embodiment at least about 50% of the axial length of the process microchannel, and in one embodiment at least about 65% of the axial length of the process microchannel, and in one embodiment at least about 80% of the axial length of the process microchannel, and in one embodiment at least about 95% of the axial length of the process microchannel, and in one embodiment from about 5% to about 100% of the axial length of the process microchannel, and in one embodiment from about 10% to about 95% of the axial length of the process microchannel, and in one embodiment from about 25% to about 75% of the axial length of the process microchannel, and in one embodiment from about 40% to about 60% of the axial length of the process microchannel 210.

The gaseous reactant(s) in the process microchannels may be in the form of gas bubbles in a reactant mixture. The gas bubbles may have volume-based mean diameters in the range up to about 200 microns, and in one embodiment about 0.01 to about 200 microns, and in one embodiment from about 0.01 to about 100 microns, and in one embodiment about 0.01 to about 50 microns, and in one embodiment about 0.01 to about 25 microns, and in one embodiment about 0.01 to about 10 microns, and in one embodiment about 0.01 to about 5 microns, and in one embodiment about 0.01 to about 2 microns, and in one embodiment about 0.01 to about 1 micron, and in one embodiment about 0.01 to about 0.5 micron, and in one embodiment about 0.01 to about 0.2 micron, and in one embodiment about 0.01 to about 0.1 micron, and in one embodiment about 0.01 to about 0.08 micron, and in one embodiment about 0.01 to about 0.05 micron, and in one embodiment about 0.01 to about 0.03 micron. An advantage of the process is that at least in one embodiment the gas bubbles may be characterized by having a relatively narrow distribution of average diameters.

"Relative span" is often referred to as "span." It is a dimensionless parameter calculated from volume distribution. Volume median diameter (VMD), D[v,0.1] and D[v,0.9] are diameters representing the points at which 10% and 90%, respectively, of the volume of bubbles dispersed is in bubbles of smaller diameter. The span may be defined as D[v,0.9] minus D[v,0.1] which is then divided by the VMD (D[v,0.5]). In one embodiment, the span for the bubbles of reactant in the reaction mixture may be in the range from about 1.3 to about 5, and in one embodiment about 1.8 to about 2.5. In one embodiment, the process may be conducted in a single process microchannel and the span may be in the range of from about 1.3 to about 2.5. In one embodiment, the process may be conducted in a scaled-up process employing multiple process microchannels and the span may be in the range from about 1.3 to about 5.

The volume-based mean diameter for the bubbles in the reactant mixture may be in the range from about 0.1 to about 25 microns, and the span may be in the range from about 1 to about 5. In one embodiment, the volume-based mean diameter may be in the range from about 1 to about 10 microns, and the span may be in the range from about 1.8 to about 2.5. In one embodiment, the bubbles may have a volume-based mean diameter in the range from about 1 to about 25 microns, and a span in the range from about 1.9 to about 2.5.

An advantage of the process, at least in one embodiment, is that the gap distances between the process microchannels, second reactant stream channels, and heat exchange channels may be the same whether the process is intended for laboratory or pilot plant scale or for full production scale. As a result, the bubble size distribution of the second reactant in the reactant mixture that may be used in the process may be substantially the same whether the microchannel reactor is built on a laboratory or pilot plant scale or as a full scale plant unit.

The catalyst may be positioned in a single reaction zone or it may be positioned in more than one reaction zone in the process microchannels. The same or different catalyst may be used in each reaction zone. The catalyst may be a graded catalyst. In each reaction zone the length of one or more heat exchange zone(s) adjacent to or in thermal contact with the reaction zone may vary in their dimensions. For example, in one embodiment, the length of the one or more adjacent heat exchange zones may be less than about 50% of the length of each reaction zone. Alternatively, the one or more heat exchange zones may have lengths that are more than about 50% of the length of each reaction zone up to about 100% of the length of each reaction zone.

The catalyst may be in the form of a bed of particulates which may be graded in composition or graded with a thermally conductive inert material. The thermally conductive inert material may be interspersed with the active catalyst. Examples of thermally conductive inert materials that may be used include diamond powder, silicon carbide, aluminum, alumina, copper, graphite, and the like. The catalyst bed fraction may range from about 100% by weight active catalyst to less than about 50% by weight active catalyst. The catalyst bed fraction may range from about 10% to about 90% by weight active catalyst, and in one embodiment from about 25% to about 75% by weight. In an alternate embodiment the thermally conductive inert material may be deployed at the center of the catalyst or within the catalyst particles. The active catalyst may be deposited on the outside, inside or intermittent within a composite structure that includes the thermally conductive inert. The resultant catalyst composite structure may have an effective thermal conductivity when placed in a process microchannel that is at least about 0.3 W/m/K, and in one embodiment at least about 1 W/m/K, and in one embodiment at least about 2 W/m/K.

The catalyst bed may be graded only locally within the process microchannel. For example, a process microchannel may contain a catalyst bed with a first reaction zone and a second reaction zone. The top or bottom (or front or back) of the catalyst bed may be graded in composition whereby a more or less active catalyst is employed in all or part of the first or second reaction zone. The composition that is reduced in one reaction zone may generate less heat per unit volume and thus reduce the hot spot and potential for the production of undesirable by-products, such as methane in a Fischer-Tropsch reaction. The catalyst may be graded with an inert material in the first and/or second reaction zone, in full or in part. The first reaction zone may contain a first composition of catalyst or inert material, while the second reaction zone may contain a second composition of catalyst or inert material.

Different particle sizes may be used in different axial regions of the process microchannels to provide for graded catalyst beds. For example, very small particles may be used in a first reaction zone while larger particles may be used in a second reaction zone. The average particle diameters may be less than half the height or gap of the process microchannels. The very small particles may be less than one-fourth of the process microchannel height or gap. Larger particles may cause lower pressure drops per unit length of the process microchannels and may also reduce the catalyst effectiveness. The effective thermal conductivity of a catalyst bed may be lower for larger size particles. Smaller particles may be used in regions where improved heat transfer is sought throughout the catalyst bed or alternatively larger particles may be used to reduce the local rate of heat generation.

Relatively short contact times, high selectivity to the desired product and relatively low rates of deactivation of the catalyst may be achieved by limiting the diffusion path required for the catalyst. This may be achieved when the catalyst is in the form of a thin layer on an engineered support such as a metallic foam or on the wall of the process microchannel. This may allow for increased space velocities. The thin layer of catalyst may be produced using chemical vapor deposition. This thin layer may have a thickness in the range up to about 1 micron, and in one embodiment in the range from about 0.1 to about 1 micron, and in one embodiment in the range from about 0.1 to about 0.5 micron, and in one embodiment about 0.25 micron. These thin layers may reduce the time the reactants are within the active catalyst structure by reducing the diffusional path. This may decrease the time the reactants spend in the active portion of the catalyst. The result may be increased selectivity to the product and reduced unwanted by-products. An advantage of this mode of catalyst deployment may be that, unlike conventional catalysts in which the active portion of the catalyst may be bound up in an inert low thermal conductivity binder, the active catalyst film may be in intimate contact with either an engineered structure or a wall of the process microchannel. This may leverage high heat transfer rates attainable in the microchannel reactor and allow for close control of temperature. This may result in the ability to operate at increased temperature (faster kinetics) without promoting the formation of undesired by-products, thus producing higher productivity and yield and prolonging catalyst life.

The microchannel reactor configuration may be tailored to match the reaction kinetics. Near the entrance or top of a first reaction zone of a process microchannel, the microchannel height or gap may be smaller than in a second reaction zone near the exit or bottom of the process microchannel. Alternatively, the reaction zones may be smaller than half the process microchannel length. For example, a first process microchannel height or gap may be used for the first 25%, 50%, 75%, or 90% of the length of the process microchannel for a first reaction zone, while a larger second height or gap may be used in a second reaction zone downstream from the first reaction zone. This configuration may be suitable for conducting Fischer-Tropsch synthesis reactions. For other reactions, alternate configurations may be used. For example, for a reaction such as the water gas shift reaction or a methanol synthesis reaction wherein higher temperatures near the entrance of the reactor than near the exit of the reactor may be used, a larger process microchannel height or gap may be used near the entrance of the process microchannels and a smaller process microchannel height or gap may be used near the reactor exit. Other gradations in the process microchannel height or gap may be used. For example, a first height or gap may be used near the entrance of the microchannel to provide a first reaction zone, a second height or gap downstream from the first reaction zone may be used to provide a second reaction zone, and a third height or gap may be used to provide a third reaction zone near the exit of the microchannel. The first and third heights or gaps may be the same or different. The first and third heights or gaps may be larger or smaller than the second height or gap. The third height or gap may be smaller or larger than the second height or gap. The second height or gap may be larger or smaller than the third height or gap.

The catalyst may be a solid catalyst or a homogeneous catalyst immobilized on a solid support. The catalyst may be a graded catalyst. The catalyst may have any size and geometric configuration that fits within the process microchannels. The catalyst may be in the form of particulate solids (e.g., pellets, powder, fibers, and the like) having a median particle diameter of about 1 to about 1000 microns, and in one embodiment about 10 to about 500 microns, and in one embodiment about 25 to about 250 microns. In one embodiment, the particulate solids may have diameters of at least about 225 microns, and in one embodiment in the range from about 225 to about 1000 microns. In one embodiment, the catalyst may be in the form of a fixed bed of particulate solids.

The catalyst may be in the form of a fixed bed of particulate solids wherein the median particle diameter of the catalyst particulate solids is relatively small, and the length of each process microchannel is relatively short. The median particle diameter may be in the range of about 1 to about 1000 microns, and in one embodiment about 10 to about 500 microns, and the length of each process microchannel may be in the range of up to about 500 cm, and in one embodiment about 10 to about 500 cm, and in one embodiment about 50 to about 300 cm.

The catalyst may be supported on a porous support structure such as a foam, felt, wad or a combination thereof. The term "foam" is used herein to refer to a structure with continuous walls defining pores throughout the structure. The term "felt" is used herein to refer to a structure of fibers with interstitial spaces there between. The term "wad" is used herein to refer to a structure of tangled strands, like steel wool. The catalyst may be supported on a honeycomb structure.

The catalyst may be positioned on a wall of a microchannel and surface features may be formed on a wall opposite the catalyst. The surface features may be used to improve the mixing of the reactants and enhance contact with the catalyst.

Figure 18:
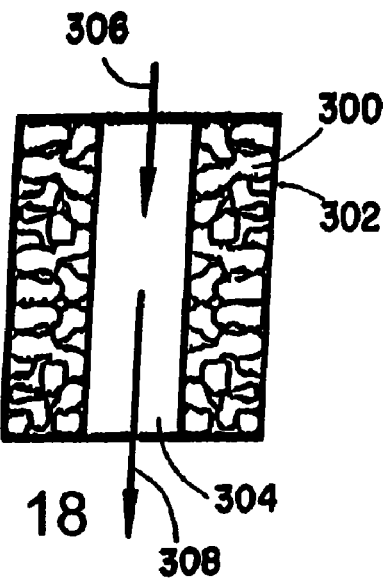
FIG. 18 is a schematic illustration of a process microchannel that may be used in the microchannel reactor illustrated in FIG. 2. The process microchannel contains a catalyst having a flow-by configuration.

The catalyst may be supported on a flow-by support structure such as a felt with an adjacent gap, a foam with an adjacent gap, a fin structure with gaps, a washcoat on any inserted substrate, or a gauze that is parallel to the flow direction with a corresponding gap for flow. An example of a flow-by structure is illustrated in FIG. 18. In FIG. 18, the catalyst 300 is contained within process microchannel 302. An open passage way 304 permits the flow of fluid through the process microchannel 302 in contact with the catalyst 300 as indicated by arrows 306 and 308.

Figure 19:
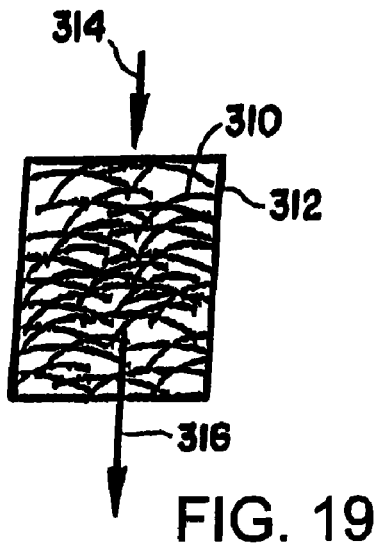
FIG. 19 is a schematic illustration of a process microchannel that may be used in the microchannel reactor illustrated in FIG. 2. The process microchannel contains a catalyst having a flow-through configuration.

The catalyst may be supported on a flow-through support structure such as a foam, wad, pellet, powder, or gauze. An example of a flow-through structure is illustrated in FIG. 19. In FIG. 19, the flow-through catalyst 310 is contained within process microchannel 312 and the fluid flows through the catalyst 310 as indicated by arrows 314 and 316.

The support structure for a flow-through catalyst may be formed from a material comprising silica gel, foamed copper, sintered stainless steel fiber, steel wool, alumina, poly(methyl methacrylate), polysulfonate, poly(tetrafluoroethylene), iron, nickel sponge, nylon, polyvinylidene difluoride, polypropylene, polyethylene, polyethylene ethylketone, polyvinyl alcohol, polyvinyl acetate, polyacrylate, polymethylmethacrylate, polystyrene, polyphenylene sulfide, polysulfone, polybutylene, or a combination of two or more thereof. In one embodiment, the support structure may be made of a heat conducting material, such as a metal, to enhance the transfer of heat away from the catalyst.

The catalyst may be directly washcoated on the interior walls of the process microchannels or sub-microchannels, grown on the walls from solution, or coated in situ on a fin structure or other support structure. The thickness of the catalytic layer may be at least about 110 microns, and in one embodiment in the range from about 110 to about 1000 microns. The catalyst may be in the form of a single piece of porous contiguous material, or many pieces in physical contact. In one embodiment, the catalyst may be comprised of a contiguous material and has a contiguous porosity such that molecules can diffuse through the catalyst. In this embodiment, the fluids flow through the catalyst rather than around it. In one embodiment, the cross-sectional area of the catalyst occupies about 1 to about 99%, and in one embodiment about 10 to about 95% of the cross-sectional area of the process microchannels. The catalyst may have a surface area, as measured by BET, of greater than about 0.5 $m^2/g$, and in one embodiment greater than about 2 $m^2/g$.

The catalyst may comprise a porous support, an interfacial layer on the porous support, and a catalyst material on the interfacial layer. The interfacial layer may be solution deposited on the support or it may be deposited by chemical vapor deposition or physical vapor deposition. In one embodiment the catalyst has a porous support, a buffer layer, an interfacial layer, and a catalyst material. Any of the foregoing layers may be continuous or discontinuous as in the form of spots or dots, or in the form of a layer with gaps or holes.

The porous support may have a porosity of at least about 5% as measured by mercury porosimetry and an average pore size (sum of pore diameters divided by number of pores) of about 1 to about 1000 μm. The porous support may be a porous ceramic or a metal foam. Other porous supports that may be used include carbides, nitrides, and composite materials. The porous support may have a porosity of about 30% to about 99%, and in one embodiment about 60% to about 98%. The porous support may be in the form of a foam, felt, wad, or a combination thereof. The open cells of the metal foam may range from about 20 pores per inch (ppi) to about 3000 ppi, and in one embodiment about 20 to about 1000 ppi, and in one embodiment about 40 to about 120 ppi. The term "ppi" refers to the largest number of pores per inch (in isotropic materials the direction of the measurement is irrelevant; however, in anisotropic materials, the measurement is done in the direction that maximizes pore number).

The buffer layer, when present, may have a different composition and/or density than both the porous support and the interfacial layers, and in one embodiment has a coefficient of thermal expansion that is intermediate the thermal expansion coefficients of the porous support and the interfacial layer. The buffer layer may be a metal oxide or metal carbide. The buffer layer may be comprised of $Al_2O_3$, $TiO_2$, $SiO_2$, $ZrO_2$, or combination thereof. The $Al_2O_3$ may be $\alpha$-$Al_2O_3$, $\gamma$-$Al_2O_3$ or a combination thereof. $\alpha$-$Al_2O_3$ provides the advantage of excellent resistance to oxygen diffusion. The buffer layer may be formed of two or more compositionally different sublayers. For example, when the porous support is metal, for example a stainless steel foam, a buffer layer formed of two compositionally different sub-layers may be used. The first sublayer (in contact with the porous support) may be $TiO_2$. The second sublayer may be $\alpha$-$Al_2O_3$ which is placed upon the $TiO_2$. In one embodiment, the $\alpha$-$Al_2O_3$ sublayer is a dense layer that provides protection of the underlying metal surface. A less dense, high surface area interfacial layer such as alumina may then be deposited as support for a catalytically active layer.

The porous support may have a thermal coefficient of expansion different from that of the interfacial layer. In such a case a buffer layer may be needed to transition between the two coefficients of thermal expansion. The thermal expansion coefficient of the buffer layer can be tailored by controlling its composition to obtain an expansion coefficient that is compatible with the expansion coefficients of the porous support and interfacial layers. The buffer layer should be free of openings and pin holes to provide superior protection of the underlying support. The buffer layer may be nonporous. The buffer layer may have a thickness that is less than one half of the average pore size of the porous support. The buffer layer may have a thickness of about 0.05 to about 10 µm, and in one embodiment about 0.05 to about 5 µm.

In one embodiment of the invention, adequate adhesion and chemical stability may be obtained without a buffer layer. In this embodiment the buffer layer may be omitted.

The interfacial layer may comprise nitrides, carbides, sulfides, halides, metal oxides, carbon, or a combination thereof. The interfacial layer provides high surface area and/or provides a desirable catalyst-support interaction for supported catalysts. The interfacial layer may be comprised of any material that is conventionally used as a catalyst support. The interfacial layer may be comprised of a metal oxide. Examples of metal oxides that may be used include $Al_2O_3$, $SiO_2$, $ZrO_2$, $TiO_2$, tungsten oxide, magnesium oxide, vanadium oxide, chromium oxide, manganese oxide, iron oxide, nickel oxide, cobalt oxide, copper oxide, zinc oxide, molybdenum oxide, tin oxide, calcium oxide, aluminum oxide, lanthanum series oxide(s), zeolite(s) and combinations thereof. The interfacial layer may serve as a catalytically active layer without any further catalytically active material deposited thereon. Usually, however, the interfacial layer is used in combination with a catalytically active layer. The interfacial layer may also be formed of two or more compositionally different sublayers. The interfacial layer may have a thickness that is less than one half of the average pore size of the porous support. The interfacial layer thickness may range from about 0.5 to about 100 µm, and in one embodiment from about 1 to about 50 µm. The interfacial layer may be either crystalline or amorphous. The interfacial layer may have a BET surface area of at least about 1 $m^2/g$.

The catalyst may be deposited on the interfacial layer. Alternatively, the catalyst material may be simultaneously deposited with the interfacial layer. The catalyst layer may be intimately dispersed on the interfacial layer. That the catalyst layer is "dispersed on" or "deposited on" the interfacial layer includes the conventional understanding that microscopic catalyst particles are dispersed: on the support layer (i. e., interfacial layer) surface, in crevices in the support layer, and in open pores in the support layer.

Figure 20:
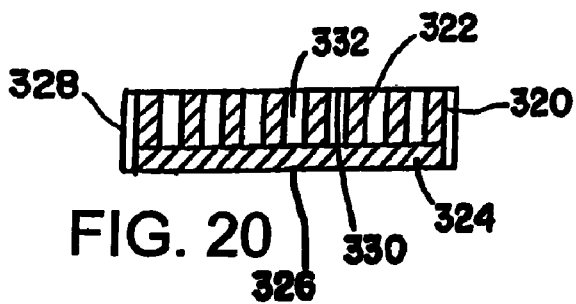
FIG. 20 is a schematic illustration of a process microchannel that may be used in the microchannel reactor illustrated in FIG. 2. The process microchannel contains a fin assembly comprising a plurality of fins. A catalyst is supported by the fins.
Figure 21:
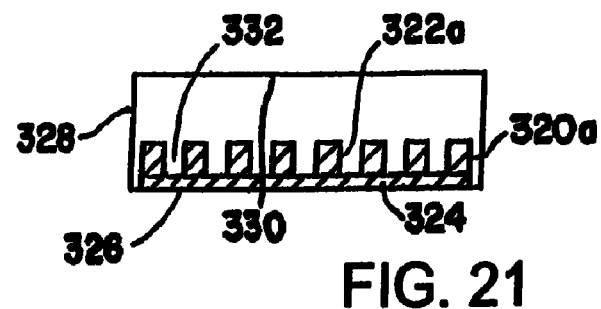
FIG. 21 illustrates an alternate embodiment of the process microchannel and fin assembly illustrated in FIG. 20.
Figure 22:
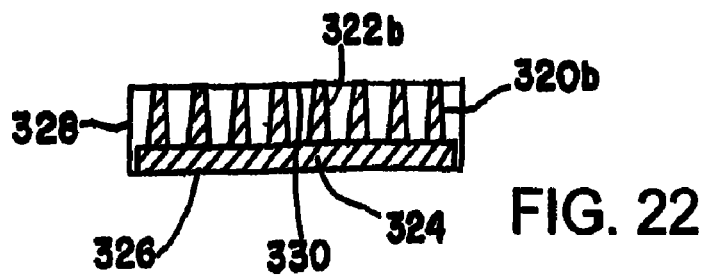
FIG. 22 illustrates another alternate embodiment of the process microchannel and fin assembly illustrated in FIG. 20.

The catalyst may be supported on an assembly of one or more fins or other structures positioned within the process microchannels. Examples are illustrated in FIGS. 20-22. Referring to FIG. 20, fin assembly 320 includes fins 322 which are mounted on fin support 324 which overlies base wall 326 of process microchannel 328. The fins 322 project from the fin support 324 into the interior of the process microchannel 328. The fins 322 extend to and may contact the interior surface of upper wall 330 of process microchannel 328. Fin channels 332 between the fins 322 provide passage ways for fluid to flow through the process microchannel 328 parallel to its length. Each of the fins 322 has an exterior surface on each of its sides, this exterior surface provides a support base for the catalyst. With the inventive process, the reactant composition flows through the fin channels 332, contacts the catalyst supported on the exterior surface of the fins 322, and reacts to form the product. The fin assembly 320a illustrated in FIG. 21 is similar to the fin assembly 320 illustrated in FIG. 20 except that the fins 322a do not extend all the way to the interior surface of the upper wall 330 of the microchannel 328. The fin assembly 320b illustrated in FIG. 22 is similar to the fin assembly 320 illustrated in FIG. 20 except that the fins 322b in the fin assembly 320b have cross-sectional shapes in the form of trapezoids. Each of the fins may have a height ranging from about 0.02 mm up to the height of the process microchannel 328, and in one embodiment from about 0.02 to about 10 mm, and in one embodiment from about 0.02 to about 5 mm, and in one embodiment from about 0.02 to about 2 mm. The width of each fin may range from about 0.02 to about 5 mm, and in one embodiment from about 0.02 to about 2 mm and in one embodiment about 0.02 to about 1 mm. The length of each fin may be of any length up to the length of the process microchannel 328, and in one embodiment up to about 10 m, and in one embodiment about 0.5 to about 10 m, and in one embodiment about 0.5 to about 6 m, and in one embodiment about 0.5 to about 3 m. The gap between each of the fins may be of any value and may range from about 0.02 to about 5 mm, and in one embodiment from about 0.02 to about 2 mm, and in one embodiment from about 0.02 to about 1 mm. The number of fins in the process microchannel 328 may range from about 1 to about 50 fins per centimeter of width of the process microchannel 328, and in one embodiment from about 1 to about 30 fins per centimeter, and in one embodiment from about 1 to about 10 fins per centimeter, and in one embodiment from about 1 to about 5 fins per centimeter, and in one embodiment from about 1 to about 3 fins per centimeter. Each of the fins may have a cross-section in the form of a rectangle or square as illustrated in FIG. 20 or 21, or a trapezoid as illustrated in FIG. 22. When viewed along its length, each fin may be straight, tapered or have a serpentine configuration. The fin assembly may be made of any material that provides sufficient strength, dimensional stability and heat transfer characteristics to permit operation for which the process microchannel is intended. These materials include: steel (e.g., stainless steel, carbon steel, and the like); monel; inconel; aluminum; titanium; nickel; platinum; rhodium; copper; chromium; brass; alloys of any of the foregoing metals; polymers (e.g., thermoset resins); ceramics; glass; composites comprising one or more polymers (e.g., thermoset resins) and fiberglass; quartz; silicon; or a combination of two or more thereof. The fin assembly may be made of an $Al_2O_3$ forming material such as an alloy comprising Fe, Cr, Al and Y, or a $Cr_2O_3$ forming material such as an alloy of Ni, Cr and Fe.

The catalyst may be supported by the microgrooved support strip illustrated in FIG. 23. Referring to FIG. 23, microgrooved support strip 400 comprises support strip 410 which is rectangular in shape and has a length (l), width (w) and thickness (t). The support strip 410 has a first or top surface 412, a second or bottom surface 414, a first side edge 416, a second side edge 418, a front edge 420 and a back edge 422. The support strip 410 has a center axis 424 extending along the length (l) of the support strip. A plurality of parallel microgrooves 430 are formed in the first surface 412. The microgrooves 430 extend between the first side edge 416 of the support strip 410 and the second side edge 418, but do not project through the side edges. The microgrooved support strip 400 includes non-grooved sections 434 and 436 which provide the microgrooved support strip 400 with a front edge 420 and a back edge 422 that are closed. That is, the front edge 420 and the back edge 422 of the microgrooved support strip 400 are sufficiently blocked to prevent fluid from flowing through the front edge 420 and back edge 422. The microgrooves 430 are oriented at an angle 425 relative to the center axis 424 that is sufficient to permit fluid to flow in the microgrooves 430 in a general direction from the front edge 420 toward the back edge 422, or from the back edge 422 toward the front edge 420. The front edge 420, back edge 422 and side edges 416 and 418 of the microgrooved support strip 400 are closed. These closed edges do not permit the flow of fluid through the front edge, back edge and side edges.

The microgrooves 430 illustrated in FIG. 23 have cross-sections in the form of squares. Alternatively, each of the microgrooves 430 may have a rectangular cross-section, a vee shaped cross-section, a semi-circular cross-section, a dovetail shaped cross-section, Or a trapezoid shaped cross-section. Those skilled in the art will recognize that microgrooves with other cross-sectional shapes may be used. Each of the microgrooves 430 has a depth, width and length. The depth of each of the microgrooves 430 may be in the range up to about 5000 microns, and in one embodiment in the range from about 0.1 to about 5000 microns, and in one embodiment from about 1 to about 2000 microns, and in one embodiment in the range from about 1 to about 1000 microns. The width, which would be the width at its widest dimension, for each of the microgrooves 430 may be in the range of about 0.1 to about 1000 microns, and in one embodiment from about 1 to about 500 microns. The length of each of the microgrooves 430 may be of any dimension which depends upon the width (w) of the support strip 410. The length of each microgroove 430 may be in the range of about 0.1 to about 100 cm, and in one embodiment from about 0.1 to about 10 cm. The spacing between the microgrooves 430 may be in the range up to about 1000 microns, and in one embodiment from about 0.1 to about 1000 microns, and in one embodiment from about 1 to about 1000 microns. Each of the microgrooves 430 may be oriented toward the back edge 422 and the first side edge 416 and forms an angle 425 with the center axis 424 that is sufficient to permit fluid to flow in the microgrooves in a general direction toward the second side edge 418 and back edge 422, or toward the first side edge 416 and front edge 420. The angle 425 may be more than about 0° and less than 90°. The angle 425 may be in the range from about 50° to about 80°, and in one embodiment from about 60° to about 75°. The microgrooves 430 may be formed in the first surface 412 of the support strip 410 by any suitable technique, including photochemical machining, laser etching, water jet machining, and the like.

The support strip 410 may have a thickness (t) in the range from about 0.1 to about 5000 microns, and in one embodiment from about 1 to about 1000 microns. The support strip 410 may have any width (w) and any length (l), the width and length depending upon the dimensions of the microchannel for which the support strip 410 is to be used. The support strip 410 may have a width (w) in the range from about 0.01 to about 100 cm, and in one embodiment from about 0.1 to about 10 cm. The length (l) of the support strip 410 may be in the range of about 0.01 to about 100 cm, and in one embodiment from about 0.1 to about 10 cm. The support strip 410 as illustrated in FIG. 30 is in the form of a rectangle. However, it is to be understood that the support strip 410 may have any configuration, for example, square, circle, oval, etc., to conform to the design of the microchannel for which it is to be used.

The support strip 410 may be made of any material that provides sufficient strength, dimensional stability and heat transfer characteristics to permit the use of the microgrooved support strip 400 in a microchannel for supporting a catalyst. The support strip 410 may be made of metal, silicon carbide, graphite or a combination of two or more thereof. The metal may comprise steel, aluminum, titanium, nickel, platinum, rhodium, copper, chromium, brass, or an alloy of any of the foregoing metals. The support structure 410 may be made of stainless steel or an alloy comprising iron, chromium, aluminum and yttrium.

The microgrooved support strip 400 may be used as a flow-by support structure in a microchannel.

A plurality of the microgrooved support strips may be stacked one above another or positioned side by side to form a composite support structure which may be used to support a catalyst for use in the inventive process. The composite support structure, in one embodiment, is illustrated in FIGS. 26 and 27. The support strips 400A and 400B illustrated in FIGS. 26 and 27 have open front 420 and back edges 422, closed side edges 416 and 418, and microgrooves 430 that penetrate all the way through the support strip 410 from the top surface 412 to the bottom surface 414. The open front edges 420, back edges 422 and microgrooves 430 permit fluid to flow through the microgrooved support strips from one support strip to another support strip within the composite support structure as the fluid flows through the composite support structure. The number of microgrooved support strips employed in such a composite support structure may be of any number, for example up to about 50, and in one embodiment up to about 30, and in one embodiment up to about 15, and in one embodiment up to about 10. The composite support structure also includes end plates to prevent fluid from flowing out of the sides of the composite construction.

The composite support structure 402 illustrated in FIGS. 26 and 27 may comprise eight (8) microgrooved support strips, four each of microgrooved support strips 400A and 400B positioned side by side in alternating sequence and two end plates 405 (only one end plate is shown in FIGS. 26 and 27). The microgrooved support strips 400A and 400B each comprise support strip 410 which is rectangular in shape and has a length, width and thickness. The support strip 410 has a center axis extending along the length of the support strip. A plurality of parallel microgrooves 430 are formed in the support strip 410 and project through the support strip from the top surface 412 to the bottom surface 414. The open front 420 and back edges 422 and the open microgrooves 430 permit fluid to flow from one microgrooved support strip to another within the composite support structure 402. A first group of parallel microgrooves extends from the first side edge 416 of the support strip 410 to the second side edge 418. A second group of the microgrooves 430 extends from the front edge 420 to the second side edge 418. A third group of the microgrooves 430 extends from the first side edge 416 of the support strip 410 to the back edge 422. The microgrooves 430 extend to the side edges 416 and 418 but do not project through these side edges. The end plates 405 prevent fluid from flowing out of the sides of the composite support structure 402. The second end plate 405 that is not shown in the drawings would be positioned adjacent to the first microgrooved support strip 400A on the left side in FIGS. 26 and 27. The microgrooves 430 in the support strips 400A are oriented at a first angle relative to the center axis of the support strip and the side edge 416 that may be more than about 90° and less than about 180°, and in one embodiment in the range from about 100° to about 150°. The microgrooves 430 in the support strip 400B may be oriented at a second angle relative to the center axis of the support strip and the side edge 116 that may be more than about 0° and less than about 90°, and in one embodiment in the range from about 50° to about 80°. The first angle and the second angle may be sufficiently different to provide for crossings of the microgrooves 430 in the support strip 400A with microgrooves in the support strip 400B. The crossings of the microgrooves may provide a plurality of apertures or through holes sufficient to permit fluid to flow from one support strip to another support strip. Fluid may flow through the composite structure 402 by entering the front edge 420 of the support strips 400A and 400B, flowing in and through the microgrooves 430 and transferring from the microgrooves 430 in one support strip (400A or 400B) to the microgrooves 430 in another support strip (400A or 400B) until the fluid reaches the back edge 422 of the support strips and then flows out of composite support structure 402. FIG. 27 shows an example of a flow path through the composite support structure 402 for a fluid entering opening 'A' of the composite support structure illustrated in FIG. 26. The flow of fluid through the composite support structure 402 may be described as permeating, diffusing and advecting from one support strip or layer to another until the fluid passes from the front end of the composite support structure to the back end.

The catalyst may be deposited on the microgrooved support strips (400, 400A, 400B) using conventional techniques. These may include washcoating the catalyst on the microgrooved support strips, growing the catalyst on the microgrooved support strips, or depositing the catalyst on the microgrooved support strips using vapor deposition. The vapor deposition may be chemical vapor deposition or physical vapor deposition. The catalyst may be deposited by slurry-coating, sol-coating or solution-coating. In one embodiment, the catalyst may be in the form of microsized particulates deposited in and adhered to the microgrooves 430 of the support strip or composite support structure. The catalyst loading may be in the range from about 0.1 to about 100 milligrams (mg) per square centimeter of microgrooved support strip, and in one embodiment in the range from about 1 to about 10 mg of catalyst per square centimeter of microgrooved support strip. The microsized particulates may have average particle sizes in the range from about 0.01 to about 100 microns, and in one embodiment in the range from about 0.1 to about 50 microns, and in one embodiment in the range from about 0.1 to about 10 microns, and in one embodiment from about 0.1 to about 7 microns, and in one embodiment from about 0.1 to about 5 microns, and in one embodiment from about 0.1 to about 3 microns, and in one embodiment from about 0.1 to about 2 microns, and in one embodiment from about 0.1 to about 1 micron, and in one embodiment from about 0.1 to about 0.5 micron.

An advantage of providing the microgrooves at an angular orientation relative to the center of axis of the microgrooved support strips is that the flow of fluid over the microgrooved support strips and in the microgrooves may be facilitated as compared to providing the grooves straight across the microgrooved support structure where flow in the bulk flow region may be disrupted by the microgrooves and downstream flow of the fluid in the microgrooves would not be possible.

Another advantage of the angled microgrooves may be that alignment problems that may occur using fins and the like that extend lengthwise along the center axis of the microchannel can be eliminated.

An advantage of the microgrooved support strips and composite structures may relate to the fact that microsized particles of catalyst may be positioned in and anchored to the microgrooves thus reducing the tendency of the particulates being swept away by the flow of process fluids through the microchannels.

Process microchannels that may be used in the microchannel reactor core 102 employing microgrooved support strip 400 for supporting a catalyst are illustrated in FIGS. 24 and 25. The number of these process microchannels that may be used in the microchannel reactor core 102 may be any number, for example, one, two, three, four, five, six, eight, ten, hundreds, thousands, etc. Referring to FIG. 24, process microchannel 132 contains microgrooved support strip 400 mounted on interior wall 181 of the process microchannel 132. The microgrooved support 400 is positioned in reaction zone 173. The catalyst 172 is positioned in the microgrooves 430 of the microgrooved support 400. The reaction zone 173 comprises second processing zone 174. Processing zone 175 is positioned upstream of the reaction zone 173. The processing zone may contain internal obstructions (e.g., surface features) for enhancing the mixing of the reactants. Processing zone 175 may be referred to as a first processing zone. Additional zone 176 is positioned downstream of the reaction zone 173. The second processing zone 174 may have a smaller open cross-sectional area than the first processing zone 175 as a result of the microgrooved support 400 being positioned in the second processing zone 174. The cross-sectional area of the additional zone 176 is the same as the cross-sectional area of the reaction zone 173. Bulk flow region 183 is defined by the space within the process microchannel 132 above the microgrooved support strip 400. Process fluid flows in the process microchannel 132 as indicated by arrows 146 and 148. In flowing in the process microchannel 132, the process fluid flows through the bulk flow region 183 in contact with the catalyst 172 supported by the microgrooved support strip 400. The microgrooved support strip 400 is a flow-by support strip. However, some of the process fluid may flow in the microgrooves 430 in contact with the catalyst. The flow of the process fluid in the microgrooves 430 may be in the general direction from the side edge 418 toward the side edge 416 and the back edge 422. The reactants may flow through the processing zone 175 and then through the second processing zone 174 which may result in an increased local velocity for the reactants in the second processing zone 174. A liquid film layer may form on the catalyst 172. However, the local velocity of the reactants flowing through the second processing zone 174 may have the effect of reducing the thickness of the film layer. The reactants may react in the presence of the catalyst to form the product. The product may flow out of the process microchannel through additional zone 176.

The process microchannel 132 illustrated in FIG. 25 is similar to the process microchannel 132 illustrated in FIG. 24 with the exception that the process microchannel 132 illustrated in FIG. 25 contains opposite interior walls 181 and 182 and a catalyst supporting microgrooved support strip 400 is mounted on each of the opposite interior walls.

The reaction zone(s) in the process microchannels 132-132g or 210 may be characterized by having a bulk flow path. A contiguous bulk flow region may allow rapid fluid flow in the process microchannels without large pressure drops. In one embodiment, the flow of fluid in the bulk flow region is laminar. Bulk flow regions within each process microchannel 132-132g or 210 may have a cross-sectional area in the range from about 0.05 to about 10,000 mm$^2$, and in one embodiment from about 0.05 to about 5000 mm$^2$, and in one embodiment from about 0.1 to about 2500 mm$^2$. The bulk flow regions may comprise from about 5% to about 95%, and in one embodiment from about 30% to about 80% of the cross-section of the process microchannels.

The catalyst may be regenerated. This may be done by flowing a regenerating fluid through the process microchannels in contact with the catalyst. The regenerating fluid may comprise hydrogen or a diluted hydrogen stream. The diluent may comprise nitrogen, argon, helium, methane, carbon dioxide, steam, or a mixture of two or more thereof. The regenerating fluid may flow from the header 104 through the process microchannels and to the footer 106, or in the opposite direction from the footer 106 through the process microchannels to the header 104. The temperature of the regenerating fluid may be from about 50 to about 400° C., and in one embodiment about 200 to about 350° C. The pressure within the process microchannels during this regeneration step may range from about 1 to about 40 atmospheres, and in one embodiment about 1 to about 20 atmospheres, and in one embodiment about 1 to about 5 atmospheres. The residence time for the regenerating fluid in the process microchannels may range from about 0.01 to about 1000 seconds, and in one embodiment about 0.1 second to about 100 seconds.

When the catalyst is an FT catalyst, it may be regenerated by increasing the molar ratio of $H_2$ to CO in the reactant composition to at least about 2.5:1, and in one embodiment at least about 3:1, and flowing the resulting adjusted feed composition through the process microchannels in contact with the catalyst at a temperature in the range from about 150° C. to about 300° C., and in one embodiment in the range from about 180° C. to about 250° C., for a period of time in the range from about 0.1 to about 100 hours, and in one embodiment in the range from about 0.5 to about 20 hours, to provide the regenerated catalyst. The feed composition may be adjusted by interrupting the flow of all feed gases except hydrogen and flowing the hydrogen through the process microchannels in contact with the catalyst. The flow of $H_2$ may be increased to provide for the same contact time used for the reactant composition comprising $H_2$ and CO. The adjusted feed composition may comprise $H_2$ and is characterized by the absence of CO. Once the catalyst is regenerated, the Fischer-Tropsch process may be continued by contacting the regenerated catalyst with the original reactant composition comprising $H_2$ and CO.

The heat exchange fluid may be any fluid. These may include air, steam, liquid water, steam, gaseous nitrogen, other gases including inert gases, carbon monoxide, molten salt, oils such as mineral oil, and heat exchange fluids such as Dowtherm A and Therminol which are available from Dow-Union Carbide.

The heat exchange fluid may comprise a stream of the first and/or second reactant. This may provide process pre-heat and increase in overall thermal efficiency of the process.

The heat exchange channels may comprise process channels wherein an endothermic process or an exothermic process is conducted. These heat exchange process channels may be microchannels. Examples of endothermic processes that may be conducted in the heat exchange channels include steam reforming and dehydrogenation reactions. Steam reforming of an alcohol that occurs at a temperature in the range from about 200° C. to about 300° C. is an example of an endothermic process suited for an exothermic reaction such as an FT synthesis reaction in the same temperature range. The incorporation of a simultaneous endothermic reaction to provide an improved heat sink may enable a typical heat flux of roughly an order of magnitude above the convective cooling heat flux. Examples of exothermic processes that may be conducted in the heat exchange channels include water-gas shift reactions, methanol synthesis reactions and ammonia synthesis reactions. The use of simultaneous exothermic and endothermic reactions to exchange heat in a microchannel reactor is disclosed in U.S. patent application Ser. No. 10/222,196, filed Aug. 15, 2002, which is incorporated herein by reference.

The heat exchange fluid may undergo a partial or full phase change as it flows in the heat exchange channels. This phase change may provide additional heat removal from the process microchannels beyond that provided by convective cooling. For a liquid heat exchange fluid being vaporized, the additional heat being transferred from the process microchannels may result from the latent heat of vaporization required by the heat exchange fluid. An example of such a phase change may be an oil or water that undergoes boiling or partial boiling. In one embodiment, about 50% by weight of the heat exchange fluid may be vaporized, and in one embodiment about 35% by weight may be vaporized, and in one embodiment about 20% by weight may be vaporized, and in one embodiment about 10% by weight may be vaporized. In one embodiment, from about 10% to about 50% by weight may be vaporized.

The heat flux for heat exchange in the microchannel reactor may be in the range from about 0.01 to about 500 watts per square centimeter of surface area of the one or more process microchannels ($W/cm^2$) in the microchannel reactor, and in one embodiment in the range from about 0.1 to about 250 $W/cm^2$, and in one embodiment from about 1 to about 125 $W/cm^2$. The heat flux for convective heat exchange in the microchannel reactor may be in the range from about 0.01 to about 250 $W/cm^2$, and in one embodiment in the range from about 0.1 to about 50 $W/cm^2$, and in one embodiment from about 1 to about 25 $W/cm^2$, and in one embodiment from about 1 to about 10 $W/cm^2$. The heat flux for phase change and/or an exothermic or endothermic reaction of the heat exchange fluid may be in the range from about 0.01 to about 500 $W/cm^2$, and in one embodiment from about 1 to about 250 $W/cm^2$, and in one embodiment, from about 1 to about 100 $W/cm^2$, and in one embodiment from about 1 to about 50 $W/cm^2$, and in one embodiment from about 1 to about 25 $W/cm^2$, and in one embodiment from about 1 to about 10 $W/cm^2$.

The cooling and/or heating of the process microchannels during the reaction process, in one embodiment, may be advantageous for controlling selectivity towards the main or desired product due to the fact that such added cooling and/or heating may reduce or eliminate the formation of undesired by-products from undesired parallel reactions with higher activation energies. As a result of this added cooling and/or heating, in one embodiment, the temperature of the reactants (or mixture of reactants and diluents) entering the process microchannels may be within about 200° C., and in one embodiment within about 150° C., and in one embodiment within about 100° C., and in one embodiment within about 50° C., and in one embodiment within about 25° C., and in one embodiment within about 10° C., of the temperature of the product (or mixture of product and unreacted reactants and/or diluents) exiting the process microchannels.

Shear force or stress on a liquid control element in the direction of velocity u may be calculated by the formula $F_x$=mu*du/dy, where mu is viscosity, and du/dy is the velocity gradient for the liquid flow normal to the apertured section. However, as in a location of fluid (represented by a control element) the velocity may have three components, and shear force may also have three components. For a channel flow near and at the surface, a one dimensional assumption can be made and $F_x$ can approximate the net shear stress at an element surface of the liquid. The use of computational fluid dynamics, including commercial software packages such as Fluent or FEMLAB, may solve the required transport equations such that the surface shear force may be calculated. The surface shear force or stress may be calculated along the channel length, parallel to the direction of flow. Shear force or stress may also be calculated between parallel channels, where flow distribution effects are included to determine the mass flux into each parallel channel as a function of the detailed channel and manifold geometry. Additional calculation methods can be found, for example, in "Fundamentals of Fluid Mechanics," $3^{rd}$ Ed., B. R. Munson, D. F. Young and T. H. Okiishi, John Wiley & Son, Inc., Weinheim, 1998.

The shear force deviation factor (SFDF) for a process employing a single process microchannel may be within about 50% of the SFDF for a scaled-up process involving multiple process microchannels. SFDF may be calculated using the formula $$SFDF = (F_{max} - F_{min})/(2F_{mean})$$

wherein: $F_{max}$ is the maximum shear stress force in a process microchannel for a specific liquid; $F_{min}$ is the minimum shear stress force in the process microchannel for the liquid; and $F_{mean}$ is the arithmetic average shear force for the fluid at the surface of the apertured section 250 within the process microchannel 210. Within a single process microchannel, operated in accordance with the inventive process, the SFDF may be less than about 2, and in one embodiment less than about 1, and in one embodiment less than about 0.5, and in one embodiment less than about 0.2.

The process may provide for a relatively uniform shear stress force while employing multiple process microchannels. To measure the shear force uniformity among multiple process microchannels, the average shear force is calculated for each channel and compared. $F_{max}$ is the largest value of the average channel shear force, and $F_{min}$ is the smallest value of the average shear force. $F_{mean}$ is the mean of the average shear forces of all the channels. SFDF may be calculated from these values. Among multiple process microchannels, at least in one embodiment of the process, the SFDF may be less than about 2, and in one embodiment less than about 1, and in one embodiment less than about 0.5, and in one embodiment less than about 0.2.

The deviation in the shear force within a process microchannel may also be defined as:

$$SFDF' = \frac{F_{max} - F_{min}}{F_{max}}$$

wherein $F_{max}$, $F_{min}$ are as defined above. In one embodiment, the SFDF' may be less than about 0.9, and in one embodiment less than about 0.5, and in one embodiment less than about 0.1.

For a multiple process channel, the deviation in shear force may be defined as:

$$SFDF'' = \frac{F'_{max} - F'_{min}}{F'_{max}}$$

wherein $F'_{max}$ is defined as the maximum shear force at a given axial location for multiple process microchannels, and $F'_{min}$ is defined as the minimum shear force at the same axial location for the multiple process microchannels. In one embodiment, the SFDF'' may be less than about 0.9, and in one embodiment less than about 0.5, and in one embodiment less than about 0.1.

In a scale up device, for certain applications, it may be required that the mass of the process fluid be distributed uniformly among the microchannels. Such an application may be when the process fluid is required to be heated or cooled down with adjacent heat exchange channels. The uniform mass flow distribution may be obtained by changing the cross-sectional area from one parallel microchannel to another microchannel. The uniformity of mass flow distribution may be defined by Quality Index Factor (Q-factor) as indicated below. A Q-factor of 0% means absolute uniform distribution.

$$Q = \frac{\dot{m}_{max} - \dot{m}_{min}}{\dot{m}_{max}} \times 100$$

A change in the cross-sectional area may result in a difference in shear stress on the wall. In one embodiment, the Q-factor for the process microchannels may be less than about 50%, and in one embodiment less than about 20%, and in one embodiment less than about 5%, and in one embodiment less than about 1%.

In one embodiment, the Q-factor for the process microchannel may be less than about 50% and the SFDF'' may be less than about 0.8. In one embodiment, the Q-factor may be less than about 5%, and the SFDF'' less than about 0.5. In one embodiment, the Q-factor may be less than about 1%, and the SFDF'' may be less than about 0.1.

The superficial velocity for the liquid phase fluid flowing in the process microchannels may be at least about 0.01 meters per second (m/s), and in one embodiment at least about 0.1 m/s, and in one embodiment in the range from about 0.01 to about 100 m/s, and in one embodiment in the range from about 0.01 to about 1 m/s, and in one embodiment in the range from about 0.1 to about 10 m/s, and in one embodiment in the range from about 1 to about 100 m/s. The superficial velocity for the gas phase fluid flowing in the process microchannels may be at least about 0.1 m/s, and in one embodiment at least about 1 m/s, and in one embodiment at least about 10 m/s, and in one embodiment in the range from about 0.1 to about 250 m/s, and in one embodiment in the range from about 0.1 to about 5 m/s, and in one embodiment in the range from about 1 to about 20 ms, and in one embodiment in the range from about 10 to about 250 m/s. In one embodiment, the superficial velocity for the liquid phase may be at least about 0.01 m/s, and in one embodiment in the range from about 0.01 to about 100 m/s, while the superficial velocity for the gas phase may be at least about 0.1 m/s, and in one embodiment in the range from about 0.1 to about 250 m/s.

The free stream velocity for the liquid phase fluid flowing in the process microchannels may be at least about 0.001 m/s, and in one embodiment at least about 0.01 m/s, and in one embodiment in the range from about 0.001 to about 200 m/s, and in one embodiment in the range from about 0.01 to about 100 m/s, and in one embodiment in the range from about 0.01 to about 200 m/s. The free stream velocity for the gas phase fluid flowing in the process microchannels may be at least about 0.1 m/s, and in one embodiment at least about 1 m/s, and in one embodiment in the range from about 0.1 to about 250 m/s, and in one embodiment in the range from about 0.5 to about 100 m/s. In one embodiment, the free stream velocity for the liquid phase may be at least about 0.001 m/s, and in one embodiment in the range from about 0.001 to about 200 m/s, while the free stream velocity for the gas phase may be at least about 0.1 m/s, and in one embodiment in the range from about 0.1 to about 250 m/s.

The local velocity for the liquid phase fluid flowing in the processing zone (e.g., the first processing zone) of the process microchannels may be at least about 0.01 m/s, and in one embodiment at least about 0.1 m/s, and in one embodiment in the range from about 0.01 to about 100 m/s, and in one embodiment in the range from about 0.01 to about 1 m/s, and in one embodiment in the range from about 0.1 to about 10 m/s, and in one embodiment in the range from about 1 to about 100 m/s. The local velocity for gas phase fluid flowing in the processing zone (e.g., the first processing zone) of the process microchannels may be at least about 0.1 m/s, and in one embodiment at least about 1 m/s, and in one embodiment in the range from about 0.1 to about 250 m/s, and in one embodiment in the range from about 0.1 to about 5 m/s, and in one embodiment in the range from about 1 to about 20 m/s, and in one embodiment in the range from about 10 to about 250 m/s. In one embodiment, the local velocity for the liquid phase in the processing zone (e.g., the first processing zone) may be at least about 0.01 m/s, and in one embodiment in the range from about 0.01 to about 100 m/s, while the local velocity for the gas phase may be at least about 0.1 m/s, and in one embodiment in the range from about 0.1 to about 250 m/s.

The local velocity for the liquid phase fluid flowing in the second processing zone of the process microchannels may be at least about 0.01 m/s, and in one embodiment at least about 0.1 m/s, and in one embodiment in the range from about 0.01 to about 200 m/s, and in one embodiment in the range from about 0.1 to about 25 m/s, and in one embodiment in the range from about 0.1 to about 10 m/s, and in one embodiment in the range from about 1 to about 100 m/s. The local velocity for gas phase fluid flowing in the second processing zone of the process microchannels may be at least about 0.1 m/s, and in one embodiment at least about 1 m/s, and in one embodiment at least about 10 m/s, and in one embodiment in the range from about 0.1 to about 500 m/s, and in one embodiment in the range from about 0.1 to about 25 m/s, and in one embodiment in the range from about 1 to about 50 ms, and in one embodiment in the range from about 10 to about 250 m/s. In one embodiment, the local velocity for the liquid phase in the second processing zone may be at least about 0.01 m/s, and in one embodiment in the range from about 0.01 to about 200 m/s, while the local velocity for the gas phase may be at least about 0.1 m/s, and in one embodiment in the range from about 0.1 to about 500 m/s.

The ratio of the local velocity of the liquid phase reactants in the second processing zone to the local velocity of the liquid phase reactants in the first processing zone may be in the range from about 1.2 to about 100, and in one embodiment in the range from about 1.3 to about 10.

The ratio of the local velocity of the gaseous phase reactants in the second processing zone to the local velocity of the gaseous phase reactants in the first processing zone may be in the range from about 1.2 to about 100, and in one embodiment in the range from about 1.3 to about 10.

The ratio of the open cross-sectional area of the second processing zone to the open cross-sectional area of the first processing zone may be in the range from about 1.2 to about 25, and in one embodiment in the range from about 1.2 to about 10.

The dynamic pressure for the liquid in the process microchannels may be at least about 0.1 Pa ($9.87 \times 10^{-7}$ atm), and in one embodiment at least about 5 Pa ($4.93 \times 10^{-5}$ atm), and in one embodiment at least about 25 Pa (0.000248 atm), and in one embodiment in the range from about 0.1 to about 100 Pa ($9.87 \times 10^{-7}$ to 0.000987 atm). The dynamic pressure for the gas in the process microchannels may be at least about 0.5 Pa ($4.93 \times 10^{-6}$ atm), and in one embodiment at least about 5 Pa ($4.93 \times 10^{-5}$ atm), and in one embodiment at least about 10 Pa ($9.87 \times 10^{-5}$ atm), and in one embodiment in the range from about 0.5 to about 200 Pa ($4.93 \times 10^{-6}$ to 0.00197 atm).

The thickness of the liquid film layer on the catalyst may be in the range from about 10 nm to about 100 microns, and in one embodiment in the range from about 0.1 micron to about 20 microns, and in one embodiment in the range from about 0.5 to about 5 microns.

The liquid phase reactant may have a viscosity in the range from about 0.01 to about 1000 centipoise, and in one embodiment in the range from about 0.1 to about 500 centipoise. The gaseous phase reactant may have a viscosity in the range from about 0.001 to about 0.1 centipoise, and in one embodiment from about 0.01 to about 0.1 centipoise. The product may have a viscosity in the range from about 0.01 to about 1000 centipoise, and in one embodiment from about 0.1 to about 500 centipoise.

The alpha number for the process fluid flowing in the process microchannels may be at least about 0.6, and in one embodiment in the range from about 0.75 to about 0.98, and in one embodiment in the range from about 0.85 to about 0.95.

The contact time of the reactants with the catalyst within the process microchannels may range up to about 2000 milliseconds (ms), and in one embodiment from about 10 ms to about 1000 ms, and in one embodiment about 20 ms to about 500 ms. In one embodiment, the contact time may range up to about 300 ms, and in one embodiment from about 20 to about 300 ms, and in one embodiment from about 50 to about 150 ms, and in one embodiment about 75 to about 125 ms, and in one embodiment about 100 ms.

The space velocity (or gas hourly space velocity (GHSV)) for the flow of the process fluid in the process microchannels may be at least about 1000 hr$^{-1}$ (normal liters of feed/hour/liter of volume within the process microchannels) or at least about 800 ml feed/(g catalyst) (hr). The space velocity may be in the range from about 1000 to about 1,000,000 hr$^{-1}$, or from about 800 to about 800,000 ml feed/(g catalyst) (hr). In one embodiment, the space velocity may be in the range from about 10,000 to about 100,000 hr$^{-1}$, or about 8,000 to about 80,000 ml feed/(g catalyst) (hr).

The temperature of the reactants entering the process microchannels may be in the range from about −40° C. to about 950° C., and in one embodiment about 0° C. to about 600° C., and in one embodiment about 20° C. to about 300° C., and in one embodiment in the range from about 150° C. to about 270° C.

The temperature of the process fluid, i.e., reactants and product, within the process microchannels may range from about −40° C. to about 950° C., and in one embodiment from about 0° C. to about 600° C., and in one embodiment from about 20° C. to about 300° C., and in one embodiment in the range from about 150° C. to about 270° C.

The temperature of the product flowing out of the process microchannels may be in the range from about −40° C. to about 950° C., and in one embodiment about 0° C. to about 600° C., and in one embodiment from about 20° C. to about 300° C., and in one embodiment in the range from about 150° C. to about 270° C.

The pressure within the process microchannels may be at least about 5 atmospheres, and in one embodiment at least about 10 atmospheres, and in one embodiment at least about 15 atmospheres, and in one embodiment at least about 20 atmospheres, and in one embodiment at least about 25 atmospheres, and in one embodiment at least about 30 atmospheres. In one embodiment the pressure may range from about 5 to about 75 atmospheres, and in one embodiment from about 10 to about 50 atmospheres, and in one embodiment from about 10 to about 30 atmospheres, and in one embodiment from about 10 to about 25 atmospheres, and in one embodiment from about 15 to about 25 atmospheres.

The pressure drop of the process fluid, i.e., reactants and product, as it flows in the process microchannels may range up to about 15 atmospheres per meter of length of the process microchannel (atm/m), and in one embodiment up to about 10 atm/m, and in one embodiment up to about 5 atm/m.

The Reynolds Number for the flow of vapor in the process microchannels may be in the range from about 10 to about 4000, and in one embodiment from about 100 to about 2000. The Reynolds Number for the flow of liquid in the process microchannels may be in the range from about 10 to about 4000, and in one embodiment from about 100 to about 2000.

The conversion of the first reactant may be at least about 10% per cycle, and in one embodiment at least about 30% per cycle.

The conversion of the second reactant may be at least about 10% per cycle, and in one embodiment at least about 30% per cycle. The yield of product may be at least about 20% per cycle, and in one embodiment at least about 40% per cycle.

The heat exchange fluid entering the heat exchange channels may be at a temperature in the range from about −40° C. to about 950° C., and in one embodiment from about 0° C. to about 600° C. The heat exchange fluid exiting the heat exchange channels may be at a temperature in the range from about −40° C. to about 950° C., and in one embodiment about 0° C. to about 600° C. The residence time of the heat exchange fluid in the heat exchange channels may be in the range from about 50 to about 5000 ms, and in one embodiment from about 100 to about 1000 ms. The pressure drop for the heat exchange fluid as it flows in the heat exchange channels may range up to about 10 atm/m, and in one embodiment from about 0.01 to about 10 atm/m, and in one embodiment from about 0.02 to about 5 atm/m. The heat exchange fluid may be in the form of a vapor, a liquid, or a mixture of vapor and liquid. The Reynolds Number for the flow of vapor in the heat exchange channels may be from about 10 to about 4000, and in one embodiment from about 100 to about 2000. The Reynolds Number for the flow of liquid in heat exchange channels may be from about 10 to about 4000, and in one embodiment about 100 to about 2000.

Example 1

A first microchannel reactor (Reactor A) in the form of a stainless steel 316 tube with an internal diameter of 0.055 inch (1.4 mm) and flow length of 36 inches (91.4 cm) is used to test an alumina supported 30 wt % Co-4.5 wt % Re catalyst (Catalyst A) in a Fischer-Tropsch synthesis reaction. The catalyst is in the form of particulate solids, the solids having a 50 to 80 mesh particle size range and an average particle size of about 275 microns. The reactant mixture is made up of hydrogen and carbon monoxide at a 1.65:1 molar ratio and contains 9% by volume diluent nitrogen. A concentric jacket with an internal diameter of 2 mm is placed around the reactor. The reactor is maintained in a near isothermal state by circulating a heat exchange oil in the jacket. The temperature is monitored using 6 thermocouples positioned on the skin of the reactor tube and spaced along the length of the reactor tube. Three test runs are conducted. These test runs are identified in Table 1 as A-1, A-2 and A-3. The temperature of the reactor is maintained at 223.5° C. (test run A-1), 223.6° C. (test run A-2) or 233° C. (test run A-3) at the reactor inlet. The inlet pressure is at 321 psig (22.8 atm absolute pressure) (test run A-1), 318 psig (22.6 atm absolute pressure) (test run A-2), or 319 psig (22.7 atm absolute pressure) (test run A-3). The pressure drop for run A-1 is measured to be 46.4 psig. The pressure drop for run A-2 is measured to be 45.9 psig. The pressure drop for run A-3 is measured to be 49.5 psig. The productivity of the catalyst during run A-1 is 8.8 gmol CO/gram of catalyst/s. The productivity of the catalyst during run A-2 is 8.8 gmol CO/gram of catalyst/s (similar to that in run A-1). The productivity of the catalyst during run A-3 is 9.8 gmol CO/gram of catalyst/s.

For this reactor (Reactor A), when the total feed rate is 355 sccm and the average temperature is 224° C. and the inlet pressure is 350 psig, the pressure drop is 70 psig. Under these conditions the conversion of CO is 60.7% and the selectivity to methane is 7.8%.

For this reactor (Reactor A), when the total feed rate is 538 sccm and the average temperature is 229° C. and the inlet pressure is 306 psig, the pressure drop is 128.9 psig. The conversion of CO is 38.9% and the selectivity to methane is 12.9%.

The contact time is 237 ms (test run A-1), 327 ms (test run A-2) or 282 ms (test run A-3). Testing is conducted continuously over a period of 650 hours. Hydrocarbon liquid samples are taken periodically and characterized via assessing the alpha number. The alpha number is in excess of 0.90. The superficial velocity ($U_o$) is 0.266 m/s. The free stream velocity (U) is estimated to be 8.73 feet per second (ft/s) (2.66 meters per second (m/s)). The values for test run A-1 are shown in Table 2.

The median particle size for this catalyst sample (Catalyst A) is about 275 microns. This is sufficiently large such that methane selectivity greater than about 15% would be expected based on higher hydrogen diffusion into the liquid filled and covered catalyst portion. 'Rim' or 'eggshell' type catalysts wherein the metal is impregnated to a depth as little as 100 microns or in 'all through' spherical catalysts with a diameter as small as 200 microns may be used to produce a methane selectivity less than about 10%, and in one embodiment less than about 10%. (Iglesia, E., Design, "Synthesis and Use of Cobalt Based Fischer-Tropsch Synthesis Catalysts," Applied Catalysis A: General, v. 161, p. 59-78, 1997).

Figure 39:
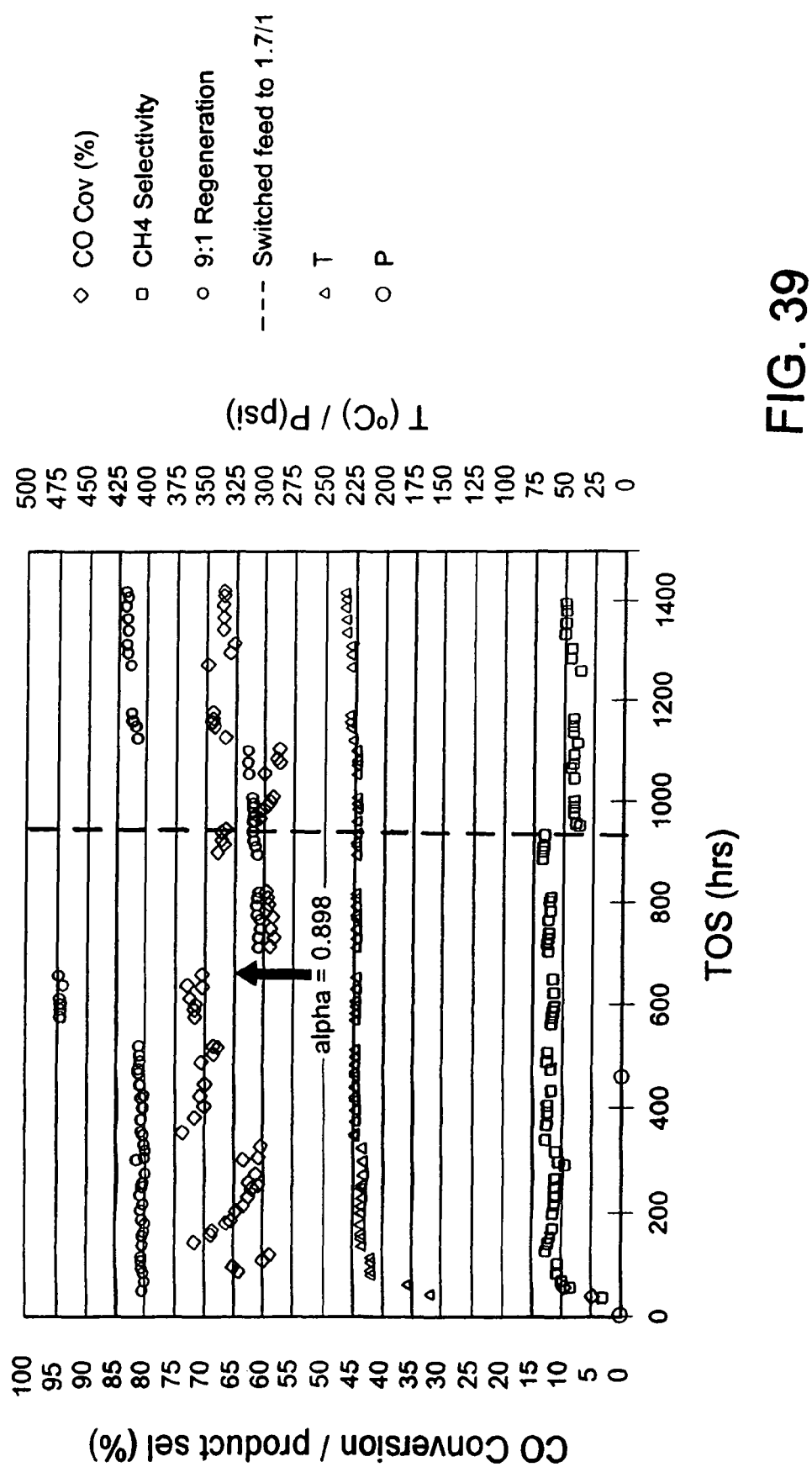
FIG. 39 is a plot of time on stream (TOS) testing data for Catalyst B in Reactor B of Example 1.

A second microchannel reactor (Reactor B) has a rectangular cross section with a height or gap of 0.02 inch (0.508 mm) and a width of 0.485 inch (1.23 cm). The length is 0.96 inch (2.44 cm). This reactor is used to test an alumina supported Co—Re catalyst with a Co loading of 30 wt % and a Re loading of 4.5 wt % (Catalyst B) in a Fischer-Tropsch synthesis reaction. The catalyst is in the form of particulate solids having a 50 to 70 mesh size particle size range with an average particle size of about 180 microns. The length of the catalyst zone in the microchannel reactor is 2.44 cm. Initially the reactant mixture has a hydrogen to carbon monoxide molar ratio of 2:1. This ratio is adjusted during the run to a value of a 1.7:1. This is shown in FIG. 39 which is a plot of time on stream (TOS) testing data for Catalyst B in Reactor B. In each case the gas contains 4% by volume nitrogen. A concentric jacket is placed around the reactor and the reactor is maintained in an isothermal state by circulating a heat exchange oil in the jacket. The temperature is monitored using 5 thermocouples positioned on the wall separating the microchannel reactor and the concentric jacket. The reactor is maintained at 224.5° C. at the inlet and the outlet pressure is maintained at 315 psig (22.4 atm absolute pressure). The contact time is 228 ms. Testing is conducted over a period of 1400 hours. The catalyst is regenerated by adjusting the feed content to a molar ratio of 9:1 hydrogen to carbon monoxide. A hydrocarbon liquid sample is taken at approximately 700 hours time-on-stream and is characterized via assessing the alpha number. The alpha number is 0.898. The superficial velocity is 0.009 m/s. The free stream velocity is 0.29 ft/sec (0.087 m/s).

Reactor C is a single pass fixed bed reactor described in U.S. Pat. No. 4,738,948, which is incorporated herein by reference. This reactor is a ⅜" diameter tube loaded with between 5 and 10 cm³ of a Fischer-Tropsch synthesis catalyst. This reactor is not a microchannel reactor. The contact times are in the range from 2 seconds to 8 seconds. The inlet pressures are in the range from 560 kPa to 2050 kPa (5.53 to 20.23 atm). The superficial velocity ($U_O$) for this reactor is estimated to be 0.022 m/s. The free stream velocity is 0.73 ft/sec (0.224 m/s).

A third microchannel reactor (Reactor D) has a rectangular cross section with a height or a gap of 0.06 inch (1.52 mm) and a width of 1 inch (2.54 cm). The length is 1.97 inches (5.00 cm). A catalyst (Catalyst D) in the form of particulate solids is packed in the channel. The catalyst is an alumina supported Co—Re catalyst with a Co loading of 30 wt % and a Re loading of 4.5 wt %. The catalytic solids have a 100 to 140 mesh size range with an average particle size of about 127 microns. The reactant mixture is made up of hydrogen and carbon monoxide at a 1.65:1 molar ratio, and contains 9.7% by volume nitrogen. A concentric jacket is placed around the reactor. The reactor is maintained in a substantially isothermal state by circulating a heat exchange oil in the jacket. The temperature is monitored using 5 thermocouples on the wall of the microchannel reactor separating the process microchannel and the concentric jacket. The temperature at the reactor inlet is maintained at 230.4° C. The outlet pressure is maintained at 313 psig (22.3 atm absolute pressure). The contact time is 327 ms. Testing is conducted continuously over a period of 576 hours. The superficial velocity ($U_o$) is estimated to be 0.013 m/s. The free stream velocity is 0.42 ft/sec (0.126 m/s).

A fourth microchannel reactor (Reactor E) has a process microchannel with a rectangular cross section. The process microchannel has a height or gap of 0.06 inch (1.52 mm) and a width of 1 inch (2.54 cm). The length is 1.42 inches (3.61 cm). A catalyst (Catalyst E), which is in the form of particulate solids, is packed in the process microchannel. The catalyst is an alumina supported Co—Re catalyst with a Co loading of 30 wt % and a Re loading of 4.5 wt %. The catalyst has a 100 to 140 mesh particle size range and an average particle size of 127 microns. The reactant mixture is made up of hydrogen and carbon monoxide in a 1.65:1 molar ratio, and contains 9.7% by volume nitrogen. A concentric jacket is placed around the reactor and the reactor is maintained in a substantially isothermal state by the circulating heat exchange oil in the jacket. The temperature is monitored using 5 thermocouples on the wall separating the process microchannel and the concentric jacket. The temperature of the reactor is maintained at 230.4° C. The outlet pressure is maintained at 317 psig (22.6 atm absolute pressure). The contact time is 289 ms. Testing is conducted continuously over a period of 600 hours. The superficial velocity ($U_o$) is estimated to be 0.009 m/s. The free stream velocity is 0.30 ft/sec (0.090 m/s).

The results of these tests are shown in Table 1 and Table 2.

TABLE 1

| Reactor | | B | A-1 | A-2 | D | A-3 | E |
|---|---|---|---|---|---|---|---|
| Temperature | (° C.) | 224.5 | 223.5 | 223.6 | 230.4 | 233.6 | 231 |
| Pressure | (psig) | 315 | 321 | 318 | 313 | 319 | 317 |
| Contact Time | (ms) | 228 | 237 | 327 | 326 | 282 | 289 |
| $H_2$:CO Ratio | (mol:mol) | 1.7:1 | 1.65:1 | 1.65:1 | 1.65:1 | 1.65 | 1.63 |
| Conversion of CO | (%) | 57.5 | 66.9 | 70.6 | 64.5 | 67.6 | 69.8 |
| Selectivity to $CH_4$ | (%) | 8.5 | 8.2 | 7.4 | 11.4 | 7.6 | 12.8 |
| Particle Size, Range | (mesh) | 70-100 | 50-80 | 50-80 | 100-140 | 50-80 | 70-100 |

TABLE 2

| Reactor Configuration | | A MicroChannel | B MicroChannel | C Tube | D MicroChannel | E MicroChannel | TFBR Tube |
|---|---|---|---|---|---|---|---|
| Gap or Diameter | (in) | 0.055 | 0.02 | 0.305 | 0.06 | 0.06 | 2.5 |
| Width | (in) | N/A | 0.485 | N/A | 1 | 1 | N/A |
| Length | (in) | 36 | 0.96 | 8.4 | 1.97 | 1.42 | 787 |
| P | (atm) | 22.8 | 22.4 | 5.5 | 22.3 | 22.6 | 50 |
| T | (° C.) | 223.5 | 224.5 | 200 | 230.4 | 230.4 | 230 |
| Approximate Paritcle Diameter | (μm) | 275 | 179 | 2200 | 127 | 127 | 3175 |
| CT | (ms) | 237 | 228 | 3000 | 327 | 289 | 8300 |
| $V_{o\ @\ STP}$ | (sm³/s) | 5.61E-06 | 6.69E-07 | 3.35E-06 | 5.92E-06 | 4.27E-06 | 7.63E-03 |
| $V_{act}$ | (m³/s) | 4.08E-07 | 5.44E-08 | 1.06E-06 | 4.90E-07 | 3.50E-07 | 2.81E-04 |
| Superficial Velocity $U_o$ | (m/s) | 0.266 | 0.009 | 0.022 | 0.013 | 0.009 | 0.089 |
| $U_{free\ stream}$ | (m/s) | 2.660 | 0.087 | 0.224 | 0.126 | 0.090 | 0.269 |
| $U_{free\ stream}$ | (ft/s) | 8.73 | 0.29 | 0.73 | 0.42 | 0.30 | 0.88 |
| $A_{xs}/L$ | (m2/m) | 1.68E-06 | 2.57E-04 | 2.21E-04 | 7.74E-04 | 1.07E-03 | 1.58E-04 |

The data for catalyst A indicates that although the particle size is greater and thus the diffusion distance is greater, degradation in selectivity is not noted. In fact performance as characterized by conversion and selectivity to methane is enhanced when compared to catalysts produced and activated, and tested in a similar manner and having smaller particle sizes as shown in Table 1. The ability to use relatively large catalyst particles, in the range of 200-700 microns, without loss of productivity and/or selectivity is important as larger particles lead to lower pressure drop and reduced pressure drop can provide an operating cost advantage. What differentiates Reactor A from the others is that the superficial velocity ($U_o$) of the gas is high (see, Table 2). In fact it is over 10 times greater than those typically developed in test reactors, be they microchannel (Reactors B, D and E) or tubular test reactors of conventional dimension (Reactor C). It is also three times greater than that developed in conventional TFBRs. In addition to the difference in superficial velocity the reactors themselves have varying ratios of cross-sectional areas for flow to flow length (through catalyst containing reaction zones). Reactor A differs from the other reactors in ratios of cross-sectional areas for flow to flow length by approximately two orders of magnitude. This is shown in Table 2 where the ratio is $A_{xs}/L$.

Example 2

Figure 38:
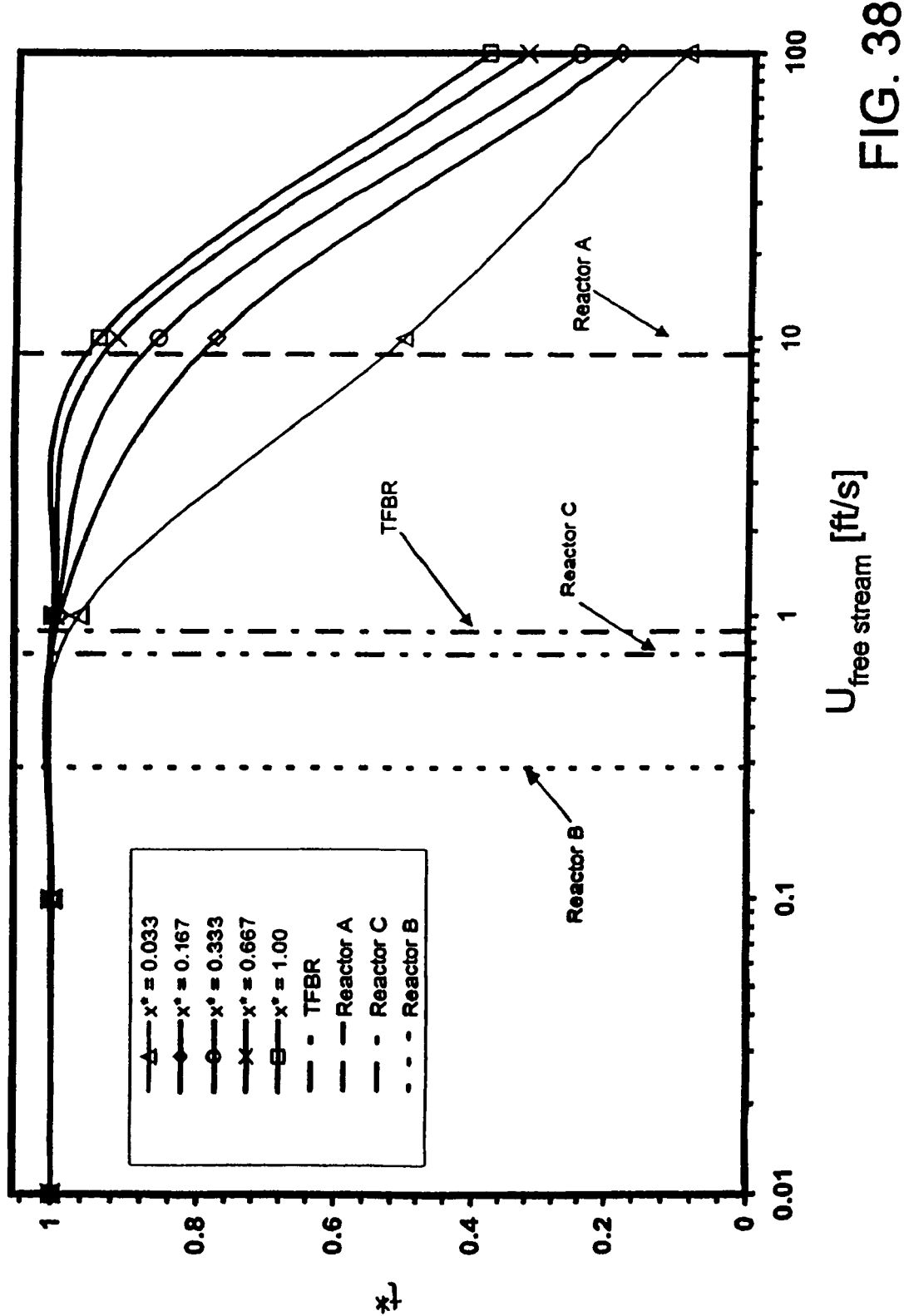
FIG. 38 is a plot showing t* (film thickness at any given point divided by the maximum film thickness) versus free stream velocity for various lengths down a dimensionless plate as described in Example 2. The relative operational conditions for Reactors A, B and C and the conventional tubular fixed bed reactor (TFBR) described in Example 1 are shown.

The improved performance for Reactor A may be as a result of the effect that increased superficial velocity has on shear thinning of external liquid film on the catalyst. For the conditions described in Table 2 the free stream velocity (U) developed by the gas flowing between the catalyst particles may be as great as 10 times the superficial velocity ($U_0$). The shear thinning effect is modeled for gas flowing down a flat plate (plate aligned with gravity force such that liquid would flow down the plate under the influence of gravity alone) that generates fluid on its surface at a rate of 2.64 g/cm²-sec. The liquid has the properties of tetradecane ($C_{14}$). The gas has the properties of that of a mixture of $H_2$ and CO at a molar ratio of 1.65:1. The modeling and physical properties are evaluated at a temperature of 225° C. and pressure of 25 atm. The results are shown in Table 3 and presented graphically in FIG. 38. FIG. 38 also contains lines marking the relative operational conditions of Reactors A, B, C and the TFBR. FIG. 38 shows t* (film thickness at any give point divided by the maximum film thickness) versus free stream velocity (U) plotted for various lengths down the flat plate.

TABLE 3

| $U_{free\ stream}$ | | 0.033 | 0.167 | 0.333 | 0.667 | 1.000 |
|---|---|---|---|---|---|---|
| (ft/s) | (m/s) | | | t* (m/m) | | |
| 0.01 | 0.003 | 1.000 | 1.000 | 1.000 | 1.000 | 1.000 |
| 0.1 | 0.030 | 0.999 | 1.000 | 1.000 | 1.000 | 1.000 |
| 1 | 0.305 | 0.965 | 0.991 | 0.995 | 0.998 | 1.000 |
| 10 | 3.048 | 0.504 | 0.775 | 0.859 | 0.916 | 0.940 |
| 100 | 30.480 | 0.096 | 0.188 | 0.250 | 0.330 | 0.387 |

Example 3

Figure 40:
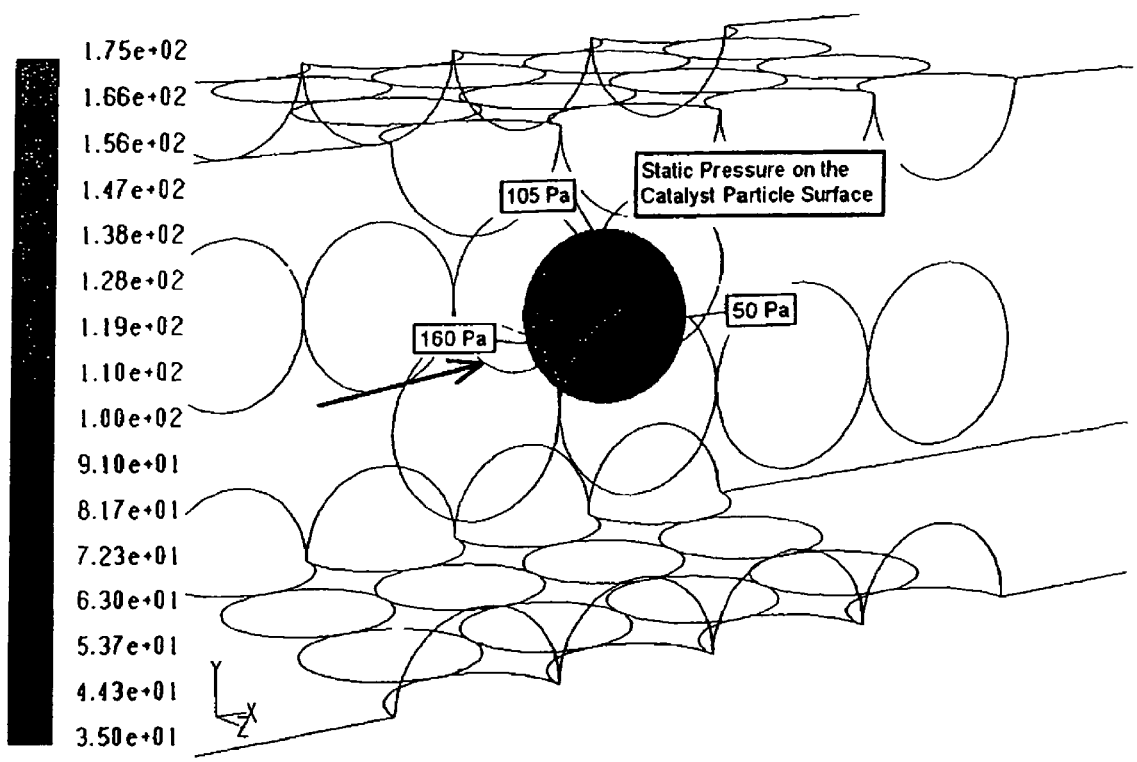
FIG. 40 is a plot showing a static pressure gradient developed across a catalyst particle in a tubular fixed bed reactor described in Example 3. The plot assumes that 33% of the cross-sectional area is free for flow, the catalyst is in the form of spheres with a diameter of 275 microns and the flow is at an inlet superficial velocity of 0.8 ft./sec. (0.24 meters per second (m/s)). The term "Pa" used in FIG. 34 refers to Pascals.

A CFD calculation is carried out to predict the static pressure profile on a spherical solid bead positioned in a matrix containing other similarly disposed beads. This is shown in FIG. 40. The backing geometry chosen for the packed bed of spheres is "rhombohedral packing". The CFD model predicts that the velocity of gas increases by an order of magnitude as the gas is forced to traverse through the tightly packed bed of spheres. In one case, the inlet gas velocity upstream of the packed bed of spheres is 0.8 ft/s (0.24 m/s) and the peak velocity within the sphere matrix is predicted to be 8 ft/s (2.4 m/s). Properties of the gas are assumed to be those of synthesis gas ($H_2$:CO=2:1). The temperature is 225° C. The static pressure undergoes a sizable drop as the gas flow is forced through the packed bed of spheres. The resulting gradient in static pressure may be beneficial to the transport of film along the spherical surface of the solid bead. The static pressure reduction along the bead surface may result in a favorable pressure gradient for the film layer. This pressure gradient may cause the film layer to thin due to: 1) acceleration of the liquid film due to the pressure force, and 2) a favorable pressure gradient-imposed suppression in boundary layer growth. This factor ($U_{free\ stream}=10\times U_0$) is used to estimate the free stream velocities reported in Table 2 for Reactors A, B, C, D and E. Free stream velocity for the TFBR is estimated by assuming that 33% of the cross-sectional area is free for flow (due to the larger catalyst particles). A static pressure gradient developed across the spherical solid bead is estimated using this model. The results are shown in FIG. 40.

When the results shown in FIG. 38 for Reactor A are compared to the results for Reactor B, it can be seen that at any distance down the length of the flow domain that significant thinning of an external film may occur in Reactor A, but not Reactor B. For example, the ratio of the increase in conversion noted between Reactors A and B in Table 1 (66.9/57.5=1.16) is almost directly proportional to the ratio of the predicted thinning of the external film observed by numerically integrating under the points in Table 3 for the free stream velocity of 10 ft/s using the Trapezoid rule (1.0/0.859=1.16). This indicates that, as expected, the FT reaction is limited by the rate of mass transfer in the fluid but not as Iglesia suggests (Iglesia, E., Design, "Synthesis and Use of Cobalt Based Fischer-Tropsch Synthesis Catalysts," Applied Catalysis A: General, v161, p 59-78, 1997) simply by mass transport limitation in the intrapellet pores of the catalyst but by fluid on the surface of the catalyst. Improvements in performance may thus be achieved by the correct selection of hydrodynamic conditions.

Example 4

A computer methodology is used to investigate the physics behind shear thinning wherein a relatively high-velocity gas may apply shear to a liquid on a surface to thin the liquid film. The gas side is mathematically modeled using the Blausius equation for computing shear stress. The gas-side shear stress can replace the gas flow on the outside of the liquid film with a calculation for shear stress. A computational tool is developed that solves the boundary layer formulation of the Navier-Stokes equations in order to evaluate the effect of the gas-side shear stress and gravity on the liquid. Finite difference equations for the conservation of mass and momentum are solved using standard numerical schemes. This boundary layer code is validated against known experimental data taken from the literature. Boundary conditions for these numerical calculations include standard "no-slip" conditions at the wall and a liquid-gas interfacial condition. The liquid film "weeping" or mass transpiration is handled by this boundary layer code. By solving these equations for fluid motion, film thickness, film velocity profile, and film acceleration are predicted. Results of this calculation are presented in FIG. 38.

Example 5

Figure 41:
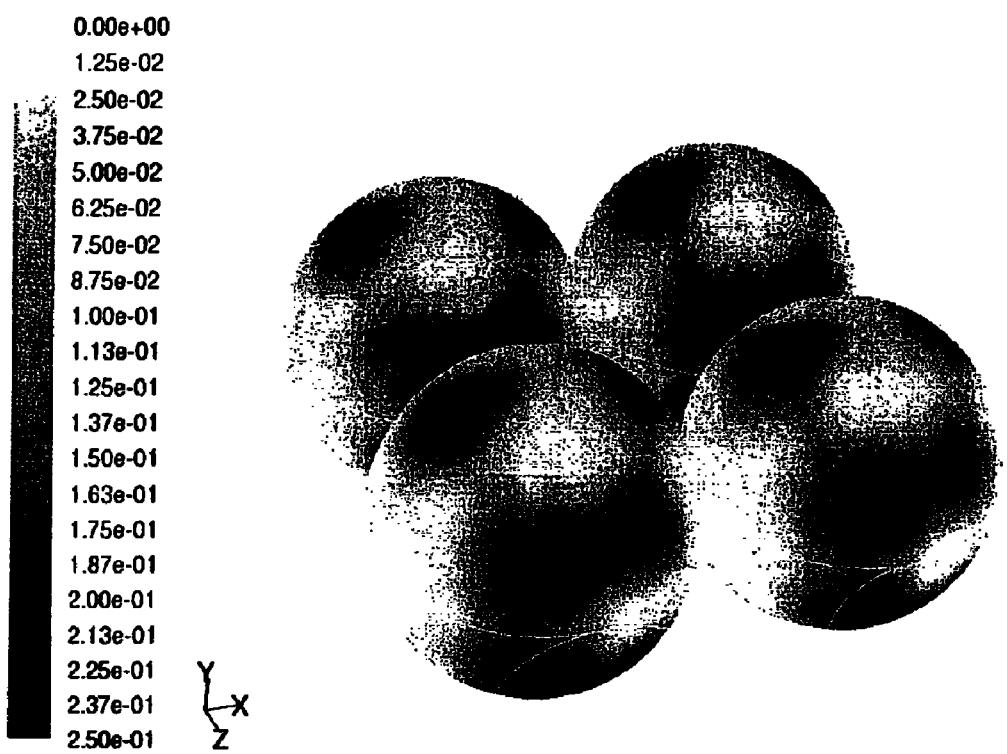
FIG. 41 shows the results of the simulation for the 0.24 m/s case for shear stress disclosed in Example 5.
Figure 42:
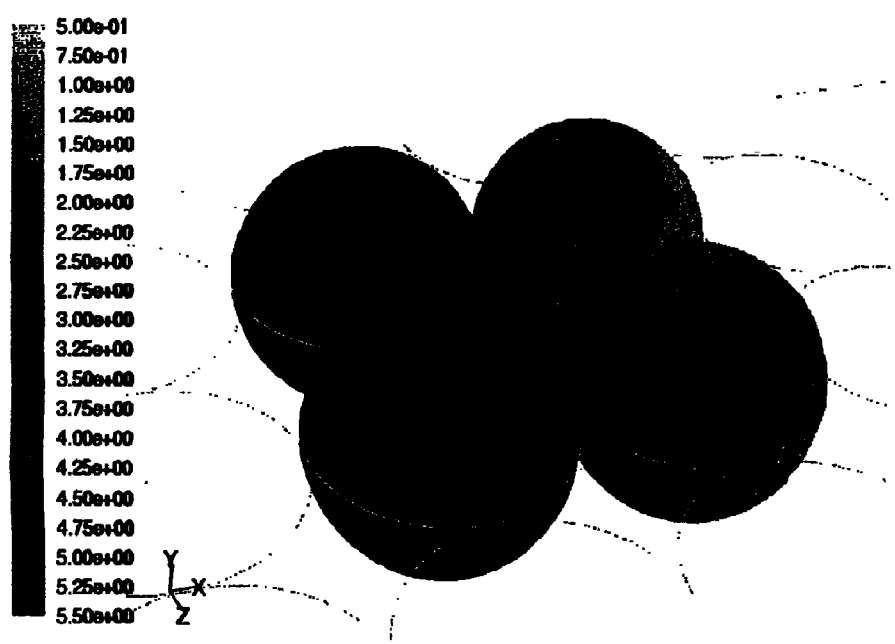
FIG. 42 shows the results of the simulation for the 0.24 m/s case for static pressure disclosed in Example 5.
Figure 43:
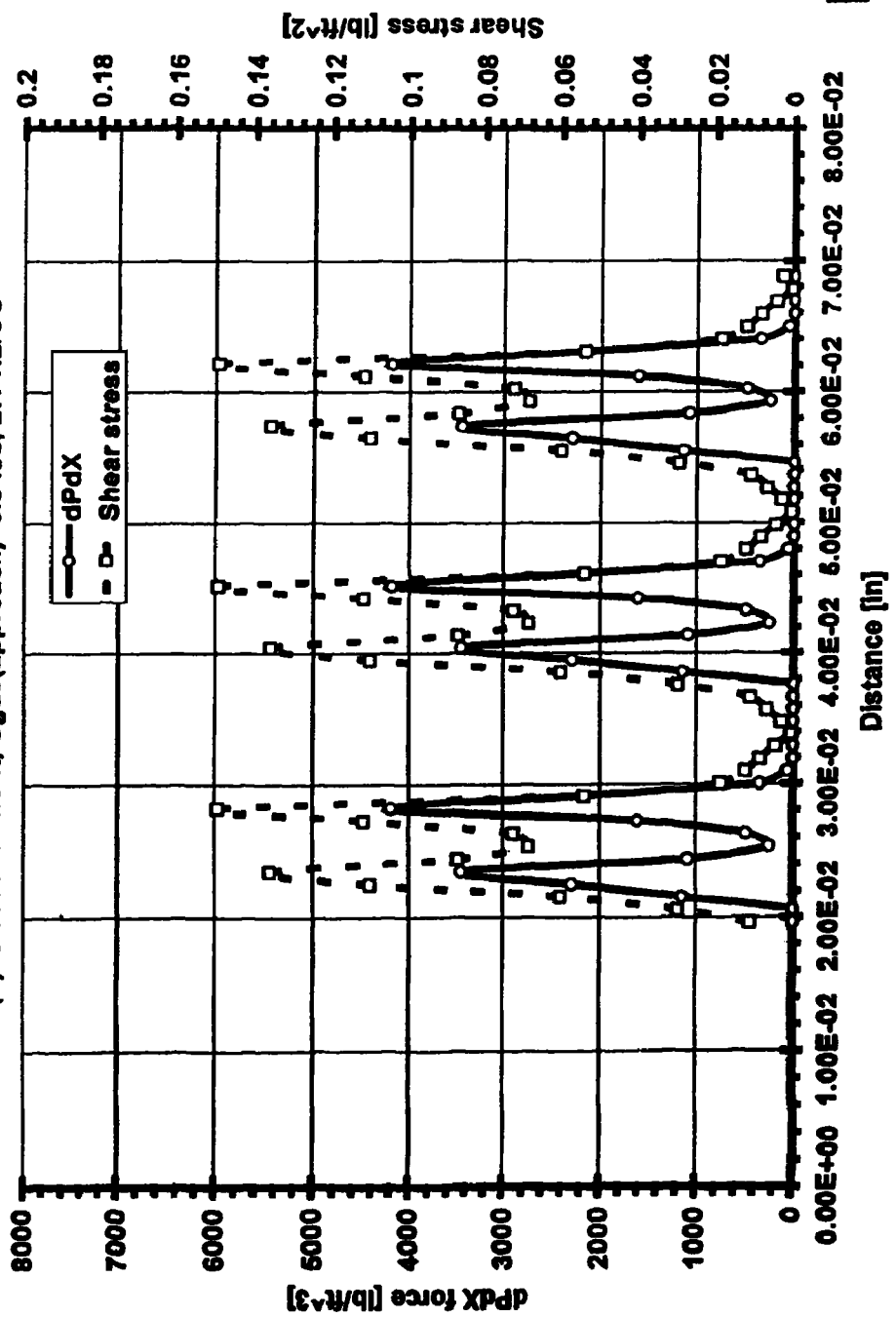
FIG. 43 is a plot showing shear stress and static pressure for the simulation disclosed in Example 5.
Figure 44:
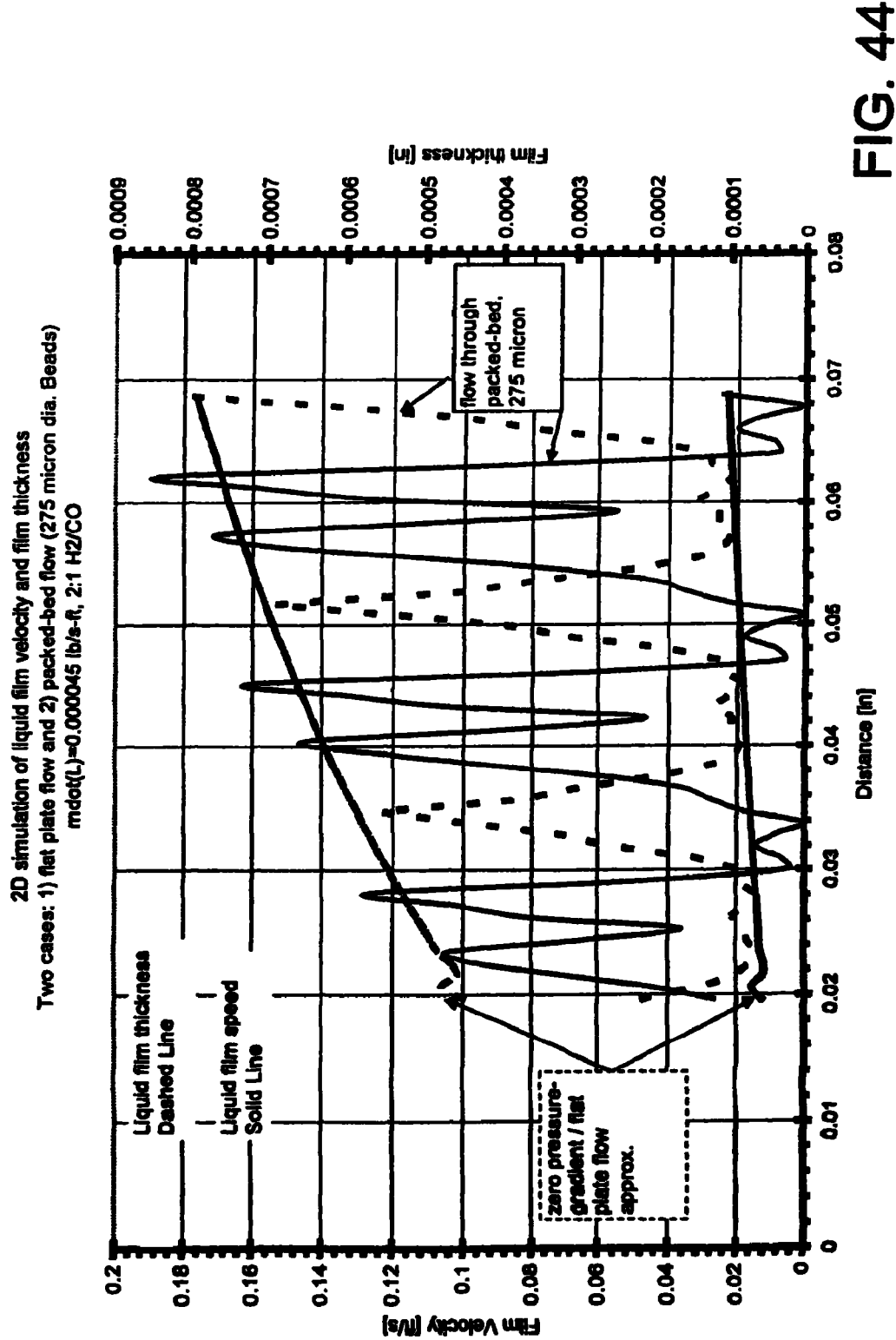
FIGS. 44 and 45 are plots of film velocity and film thickness for the simulations disclosed in Example 5.

The simulation used in Example 2 and Example 4 is modified to accommodate effects of gas flow through a packed bed of spheres by applying boundary conditions for shear stress, pressure gradient and gravity force that approximate a gas flowing through a bed of particles with rhombohedra packing. These boundary conditions are calculated as average values derived from three-dimensional simulations conducted for packed beds of spherical particles with a diameter of 275 micron. The boundary conditions for the simulations are determined for two superficial approach velocities, namely, 0.24 m/s and 0.009 m/s. The gas is assumed to have the properties of a mixture of hydrogen and carbon monoxide at a molar ratio 2:1, a temperature of 225° C. and a pressure of 22.8 atm. The density used for the gas is 0.3705 $lb_m/ft^3$ and the viscosity used for the gas is $1.142 \times 10^{-5}$ $lb_m/ft/s$. The result of the simulation of the 0.24 m/s case for shear stress can be seen in FIG. 41 and the result for static pressure in FIG. 42. The bulk flow of gas is taken to be parallel with gravity (i.e. down flow). Traces are taken across the particle surfaces and the average wall shear stress and static pressure are determined. The outcome of this analysis for the 0.24 m/s case is given in FIG. 43. In addition, the gravitational effect is corrected to account for the film layer directional changes as it flows across the spherical curved surface. The general shape of the curves for shear stress and static pressure are the same for both superficial velocities.

Two-dimensional simulations are carried out for sphere diameters of 275 microns and an approach velocity of 0.24 m/s. The results show that these aerodynamic forces (shear stress and pressure gradient) have a large effect on the film thickness. The film thickness changes by almost an order of magnitude as the liquid film encounters high pressure gradients and high levels of shear stress. The pressure gradient, shear stress effects as well as the effects of gravity are additive in nature and tend to accelerate the liquid film over a portion of the spherical surface. For the 0.24 m/s case, the maximum of the average pressure gradient curve is approximately 6000 psi/ft and the maximum of the average shear stress curve is approximately 0.004 psi. For the 0.009 m/s case the maximum of the average pressure gradient curve is approximately 70 psi/ft and the maximum of the average shear stress curve is approximately 0.104 psi. The liquid film velocity also changes by an order of magnitude during accelerations, but quickly relaxes to equilibrium levels when the high aerodynamic forces are removed at sphere contact points. Equilibrium for the liquid film is determined by aerodynamic driving forces and the effects of gravity being balanced by the viscous dominated resistance to motion of the film.

Figure 45:
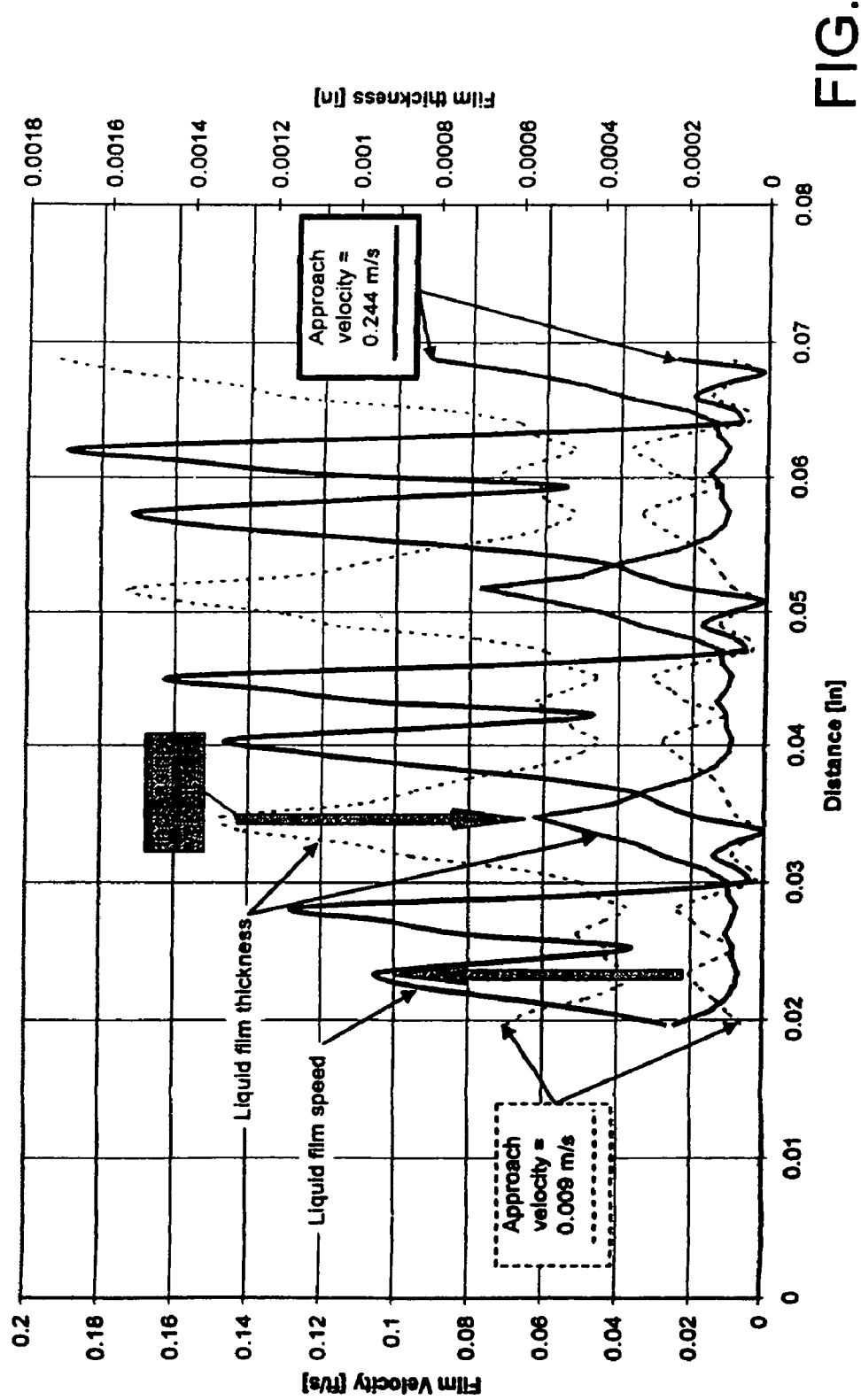

Two cases are compared using the two-dimensional simulations: 1) an approach velocity of 0.009 m/s and 2) an approach velocity of 0.244 m/s. These two cases approximate microchannel reactors A and B described in Examples 1 and 2. The transpiration rate of liquid from the surface of the particles is set at 2.64 g/cm²/s. The aerodynamic effects of shear stress and pressure gradient are similar spatially on the spherical surface (i.e. peaks in shear stress occur at the same location on the surface). The levels of these aerodynamic forces differ. The variation in the gas approach velocity has a substantial affect on predicted film thickness throughout the packed-bed as can be seen in FIG. 45. The maximum film thickness for the 0.009 m/s case is approximately 44.1 micron. This is reduced to approximately 20.8 micron for the 0.24 m/s case. Thus, a 32× increase in superficial velocity produces a 2× reduction in maximum film thickness. The mean film thickness for the 0.009 m/s case is approximately 18.5 microns. This is reduced to approximately 5.5 microns for the 0.24 m/s case. Thus, a 32× increase in superficial velocity produces a 3.4× reduction in mean film thickness. The minimum film thickness for the 0.009 m/s case is approximately 8.3 microns. This is reduced to approximately 1.6 microns for the 0.24 m/s case. Thus, a 32× increase in superficial velocity produces a 5.2× reduction in minimum film thickness.

These results are important in light of prior art wherein it is hypothesized that decreasing the intrapellet diffusional distances is key to increasing selectivity to $C_5+$ hydrocarbons in a Fischer-Tropsch (FT) synthesis as well as increasing catalyst productivity. This is demonstrated by crushing large "all through" catalysts into 143 micron particles and by preparing egg shell catalysts in which Co is deposited within 100 microns of the surface. The increase in rate is attributed to a reduction in diffusional resistance by reducing the diffusion path length. Under certain conditions films of at least 44 microns can develop and thus the external liquid film forms over the FT catalyst pellet whether formed by that pellet or carried down from those above can be almost half as thick as the catalyst itself. The external film can, under certain circumstances, become a major contributor to diffusional resistance. Thus, reduction in film thicknesses is likely lead to corresponding increases in catalyst activity. Selectivity to methane is also affected by reduction in film thickness as hydrogen diffuses at a higher rate in liquid hydrocarbons than CO (for example, up to 2.7 times as fast), and the combination of reaction and diffusion leads to high molar $H_2:CO$ ratios near catalyst sites leading to higher selectivity to methane in the direction normal to the bulk flow-catalyst support interface. However, when the liquid phase is thinned out with higher superficial velocities, the CO concentration at the bulk flow-catalyst interface and inside the catalyst are larger, giving rise to not only higher rates of reaction but lower selectivity to methane. An advantage for the higher superficial velocities in the microchannel is that the process may be able to run at the same methane selectivity as a system with slower superficial velocities with higher inlet $H_2:CO$ molar ratios because of the improvement in liquid phase mass transfer. For the same mass of catalyst and gas feed rate an FT microchannel reactor can be designed to take advantage of shear thinning and/or static pressure differences across catalyst surfaces. It may be possible to use these forces to draw liquid product from the interior of the catalyst structure, be it a catalyst pellet or other form, thus further reducing diffusional resistance.

The following table provides a comparison of film thicknesses for the 0.24 m/s and 0.009 m/s superficial velocity cases.

|  | Superficial Velocity | | |
| --- | --- | --- | --- |
|  | 0.24 m/s | 0.009 m/s | Ratio |
| Mean Film Thickness (micron) | 5.5 | 18.5 | 3.4 |
| Max Film Thickness (micron) | 20.8 | 44.1 | 2.1 |
| Minimum Film Thickness (micron) | 1.6 | 8.3 | 5.2 |

Transpiration Rate 2.64 g/cm²/s

While the disclosed technology has been explained in relation to various detailed embodiments, it is to be understood that various modifications thereof may become apparent to those skilled in the art upon reading the specification. Therefore, it is to be understood that the invention disclosed herein is intended to include such modifications as may fall within the scope of the appended claims.

The invention claimed is:

1. A process for conducting a chemical reaction between at least one liquid reactant and at least one gaseous reactant, or between gaseous reactants that react to form a liquid, in a process microchannel containing at least one catalyst, the process microchannel having a length in the range from about 0.2 to about 10 meters, the catalyst comprising a solid phase catalyst in the form of particulate solids the process microchannel comprising a processing zone containing one or more internal obstructions and a reaction zone containing the catalyst, the process comprising:
forming a reactant mixture comprising the at least one liquid reactant and the at least one gaseous reactant, or the gaseous reactants;
flowing the reactant mixture in the processing zone in contact with the one or more internal obstructions to increase the local velocity of the reactant mixture;
flowing the reactant mixture in the reaction zone, the superficial velocity of the at least one gaseous reactant or the gaseous reactants in the reaction zone being at least about 0.1 m/s, the reactant mixture contacting the catalyst; and
reacting the at least one liquid reactant with the at least one gaseous reactant, or reacting the gaseous reactants, to form at least one product.

2. A process for conducting a chemical reaction between at least one first reactant and at least one second reactant in a process microchannel containing at least one catalyst, the reactants comprising at least one liquid and at least one gas or gaseous reactants that react to form a liquid, the process microchannel having a length in the range from about 0.2 to about 10 meters, the catalyst comprising a solid phase catalyst in the form of particulate solids the catalyst being positioned in a reaction zone in the process microchannel, the process microchannel comprising at least one first processing zone with a first open cross-sectional area upstream of the reaction zone and at least one second processing zone with a second open cross-sectional area in the reaction zone and/or between the reaction zone and the first processing zone, the second open cross-sectional area being smaller than the first open cross-sectional area, the process comprising:
flowing the reactants in the process microchannel through the first processing zone and then through the second processing zone the superficial velocity of the at least one gaseous reactant or the gaseous reactants increasing as the at least one gaseous reactant or the gaseous reactants flows from the first processing zone to and through the second processing zone, the superficial velocity of the at least one gaseous reactant or the gaseous reactants in the reaction zone being at least about 0.1 m/s;
contacting the at least one catalyst with the at least one first reactant and at least one second reactant;
forming a liquid film layer on the at least one catalyst; and
reacting the at least one first reactant with the at least one second reactant to form at least one product.

3. A process for conducting a chemical reaction in a process microchannel containing at least one catalyst, the process microchannel having a length in the range from about 0.2 to about 10 meters, the catalyst comprising a solid phase catalyst in the form of particulate solids the catalyst being positioned in a reaction zone in the process microchannel, the process microchannel comprising at least one first processing zone with a first open cross-sectional area upstream of the reaction zone and at least one second processing zone with a second open cross-sectional area in the reaction zone and/or between the reaction zone and the first processing zone, the second open cross-sectional area being smaller than the first open cross-sectional area, the process comprising:
flowing at least one reactant composition in the process microchannel through the first processing zone and then through the second processing zone; the at least one reactant composition comprising at least one liquid and at least one gas, or gases that react to form at least one liquid product; the superficial velocity of the at least one gas or the gases increasing as the at least one gas or the gases flow from the first processing zone to and through the second processing zone, the superficial velocity of the at least one gas or the gases in the reaction zone being at least about 1 m/s;
contacting the at least one catalyst with the at least one reactant composition;
forming a liquid film layer on the at least one catalyst; and
reacting the at least one reactant composition to form at least one product.

4. A process for conducting a Fischer-Tropsch synthesis reaction in a process microchannel containing at least one Fischer-Tropsch synthesis catalyst, the process microchannel having a length in the range from about 0.2 to about 10 meters, the catalyst comprising a solid phase catalyst in the form of particulate solids, the process comprising:
flowing reactants comprising $H_2$ and CO in the process microchannel, the inlet superficial velocity of the reactants being at least about 0.1 m/s;
contacting the Fischer-Tropsch synthesis catalyst with the reactants; and
reacting the reactants in the presence of the catalyst to form at least one product.

5. A process for conducting a Fischer-Tropsch synthesis in a process microchannel containing at least one Fischer-Tropsch synthesis catalyst, the process microchannel having a length in the range from about 0.2 to about 10 meters, the catalyst comprising a solid phase catalyst in the form of particulate solids, the catalyst being positioned in a reaction zone in the process microchannel, the process microchannel comprising at least one first processing zone with a first open cross-sectional area upstream of the reaction zone and at least one second processing zone with a second open cross-sectional area in the reaction zone and/or between the reaction zone and the first processing zone, the second open cross-sectional area being smaller than the first open cross-sectional area, the process comprising:
flowing reactants comprising $H_2$ and CO in the process microchannel through the first processing zone and then through the second processing zone, the superficial velocity of the reactants increasing as the reactants flow from the first processing zone to and through the second processing zone, the superficial velocity of the reactants in the reaction zone being at least about 0.1 m/s;
contacting the Fischer-Tropsch synthesis catalyst with the reactants;
and reacting the reactants in the presence of the catalyst to form at least one product.

6. A process for conducting a chemical reaction in a process microchannel, the process microchannel having a length in the range from about 0.2 to about 10 meters, the process microchannel containing at least one catalyst, the catalyst comprising a solid phase catalyst in the form of particulate solids, the process comprising:
flowing reactants in the process microchannel, the reactants comprising a liquid and a gas or gaseous reactants that react to form a liquid product, the inlet superficial velocity of the gaseous reactants being at least about 0.1 m/s;
contacting the at least one catalyst with the reactants; and
reacting the reactants in the presence of the catalyst to form at least one product, the product comprising a mixture of two or more hydrocarbons.

7. A process for conducting a chemical reaction in a process microchannel, the process microchannel having a length in the range from about 0.2 to about 10 meters, the process microchannel containing at least one catalyst, the catalyst comprising a solid phase catalyst in the form of particulate solids, the process comprising:
flowing reactants in the process microchannel, the reactants comprising a liquid and a gas or gaseous reactants that react to form a liquid product, one of the reactants comprising $H_2$, the inlet superficial velocity of the gaseous reactants being at least about 0.1 m/s;
contacting the at least one catalyst with the reactants; and
reacting the reactants in the presence of the catalyst to form at least one product, the product comprising a mixture of two or more hydrocarbons.

8. A process for conducting a chemical reaction in a process microchannel, the process microchannel having a length in the range from about 0.2 to about 10 meters, the process microchannel containing at least one catalyst, the catalyst comprising a solid phase catalyst in the form of particulate solids, the process comprising:
flowing reactants in the process microchannel, the reactants comprising a liquid and a gas or gaseous reactants that react to form a liquid product, the inlet superficial velocity of the gaseous reactants being at least about 0.1 m/s;
contacting the at least one catalyst with the reactants; and
reacting the reactants in the presence of the catalyst to form at least one product, the product comprising a hydrocarbon mixture wherein at least about 10% by weight of the mixture boils at a temperature in the range from about 25° C. to about 350° C. at atmospheric pressure, and at least about 5% by weight of the mixture boils at a temperature above about 350° C. at atmospheric pressure.

9. A process for conducting a chemical reaction in a process microchannel, the process microchannel having a length in the range from about 0.2 to about 10 meters, the process microchannel containing at least one catalyst, the catalyst comprising a solid phase catalyst in the form of particulate solids, the process comprising:
flowing reactants in the process microchannel, the reactants comprising a liquid and a gas or gaseous reactants that react to form a liquid product, the inlet superficial velocity of the gaseous reactants being at least about 0.1 m/s;
contacting the at least one catalyst with the reactants; and
reacting the reactants in the presence of the catalyst to form at least one product, the product comprising a hydrocarbon mixture wherein at least about 5% by weight of the hydrocarbon mixture comprises hydrocarbons with a number average molecular weight of at least about 500.

10. The process of claim 1 wherein the one or more internal obstructions comprise one or more surface features formed in and/or projecting from one or more interior walls of the process microchannel.

11. The process of claim 1 wherein one or more divider zones are positioned between the processing zone and the reaction zone, each divider zone dividing a stream of the reactant mixture into two or more smaller streams.

12. The process of claim 11 wherein two or more divider zones are positioned between the processing zone and the reaction zone, the two or more divider zones being in sequential order, one divider zone being downstream from the next divider zone.

13. The process of claim 1 wherein a liquid film layer is on the catalyst, the liquid film layer having a thickness in the range from about 10 nm to about 100 microns.

14. The process of claim 1 wherein the at least one liquid reactant has a viscosity in the range from about 0.01 to about 1000 centipoise.

15. The process of claim 1 wherein the at least one gaseous reactant has a viscosity in the range from about 0.001 to about 0.1 centipoise.

16. The process of claim 1 wherein the at least one product has a viscosity in the range from about 0.01 to about 1000 centipoise.

17. The process of claim 1 wherein the ratio of the length of the reaction zone to the length of the processing zone is in the range from about 0.01 to about 1000.

18. The process of claim 11 wherein the ratio of the length of the reaction zone to the length of the one or more divider zones is in the range from about 0.1 to about 1000.

19. The process of claim 1 wherein heat is exchanged between the process microchannel and a heat source and/or heat sink.

20. The process of claim 1 wherein the at least one liquid reactant and the at least one gaseous reactant are mixed upstream of the process microchannel and/or in the process microchannel.

21. The process of claim 1 wherein the process microchannel is in a microchannel reactor, the microchannel reactor comprising a feed stream header, the at least one liquid reactant and the at least one gaseous reactant being mixed in the feed stream header.

22. The process of claim 1 wherein the process microchannel has at least one sidewall and at least one apertured section in the sidewall, the at least one gaseous reactant flowing through the apertured section into the process microchannel.

23. The process of claim 22 wherein the at least one gaseous reactant flows from a second reactant stream channel through the apertured section into the process microchannel.

24. The process of claim 1 wherein the at least one gaseous reactant is mixed with the at least one liquid reactant in the processing zone.

25. The process of claim 1 wherein the process microchannel has an internal dimension of width or height of up to about 10 mm.

26. The process of claim 1 wherein the process microchannel has an internal dimension of width or height of up to about 2 mm.

27. The process of claim 19 wherein the heat source and/or heat sink comprises at least one heat exchange channel.

28. The process of claim 27 wherein the heat exchange channel comprises a microchannel.

29. The process of claim 27 wherein a heat exchange fluid is in the heat exchange channel.

30. The process of claim 29 wherein the heat exchange fluid undergoes a phase change in the heat exchange channel.

31. The process of claim 27 wherein an endothermic process is conducted in the heat exchange channel.

32. The process of claim 27 wherein an exothermic process is conducted in the heat exchange channel.

33. The process of claim 27 wherein the reactants flow in the process microchannel in a first direction, and a heat exchange fluid flows in the heat exchange channel in a second direction, the second direction being cross current relative to the first direction.

34. The process of claim 27 wherein a heat exchange fluid is in the heat exchange channel, the heat exchange fluid comprising the at least one liquid reactant, the at least one gaseous reactant, the at least one product, or a mixture of two or more thereof.

35. The process of claim 27 wherein a heat exchange fluid is in the heat exchange channel, the heat exchange fluid comprising one or more of air, steam, liquid water, carbon monoxide, carbon dioxide, gaseous nitrogen, liquid nitrogen, inert gas, gaseous hydrocarbon, oil, and liquid hydrocarbon.

36. The process of claim 19 wherein the heat flux between the heat source and/or heat sink and the process microchannel is in the range from about 0.01 to about 500 watts per square centimeter of surface area of the process microchannel.

37. The process of claim 19 wherein the temperature of the reactants entering the process microchannel is within about 200° C. of the temperature of the product exiting the process microchannel.

38. The process of claim 1 wherein the one or more internal obstructions comprise one or more surface features formed in and/or projecting from one or more interior walls of the process microchannel.

39. The process of claim 1 wherein the chemical reaction is a Fischer-Tropsch synthesis reaction, oxidation reaction, hydrocracking reaction, hydrogenation reaction, hydration reaction, carbonylation reaction, dimerization reaction, trimerization reaction, oligomerization reaction, polymerization reaction, de-sulfurization reaction, hydrogen peroxide synthesis reaction, selective oxidation of alcohol to aldehyde or carbonyl, wet oxidation of one or more pollutants, hydrotreating reaction, hydrocracking reaction, alkylation reaction, acylation reaction, photocatalytic reaction, or a combination of two or more thereof.

40. The process of claim 1 wherein the catalyst comprises at least one Fischer-Tropsch synthesis catalyst, oxidation catalyst, hydrocracking catalyst, hydrogenation catalyst, hydration catalyst, or carbonylation catalyst.

41. The process of claim 1 wherein the catalyst comprises an active portion, the active portion comprising a composition represented by the formula

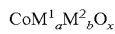

wherein: $M^1$ is Fe, Ni, Ru, Re, Os or a mixture thereof; $M^2$ is Li, B, Na, K, Rb, Cs, Mg, Ca, Sr, Ba, Sc, Y, La, Ac, Zr, La, Ac, Ce, Th, or a mixture of two or more thereof; a is a number in the range from zero to about 0.5; b is a number in the range from zero to about 0.5; and x is the number of oxygens needed to fulfill the valency requirements of the elements present.

42. The process of claim 1 wherein the catalyst comprises cobalt supported on alumina.

43. The process of claim 42 wherein the catalyst has a cobalt loading level of at least about 25% by weight and a cobalt dispersion of at least about 3%.

44. The process of claim 1 wherein the catalyst is a graded catalyst.

45. The process of claim 1 wherein the one or more internal obstructions are made of a heat conducting material.

46. The process of claim 2 wherein the at least one reactant comprises a liquid and the local velocity of the liquid in the first processing zone is in the range from about 0.01 to about 100 m/s.

47. The process of claim 2 wherein the at least one reactant comprises a gas and the local velocity of the gas in the first processing zone is in the range from about 0.1 to about 250 m/s.

48. The process of claim 2 wherein the at least one reactant comprises a liquid and the local velocity of the liquid in the second processing zone is in the range from about 0.01 to about 200 m/s.

49. The process of claim 2 wherein the at least one reactant comprises a gas and the local velocity of the gas in the second processing zone is in the range from about 0.1 to about 500 m/s.

50. The process of claim 2 wherein the at least one reactant comprises a liquid and the ratio of the local velocity of the liquid in the second processing zone to the local velocity of the liquid in the first processing zone is in the range from about 1.2 to about 100.

51. The process of claim 2 wherein the at least one reactant comprises a gas and the ratio of the local velocity of the gas in the second processing zone to the local velocity of the gas in the first processing zone is in the range from about 1.2 to about 100.

52. The process of claim 2 wherein the ratio of the first open cross-sectional area to the second open cross-sectional area is in the range from about 1.2 to about 25.

53. The process of claim 2 wherein the liquid film layer on the catalyst has a thickness in the range from about 10 nm to about 100 microns.

54. The process of claim 2 wherein the at least one reactant comprises a liquid and the liquid has a viscosity in the range from about 0.01 to about 1000 centipoise.

55. The process of claim 2 wherein the at least one reactant comprises a gas and the gas has a viscosity in the range from about 0.001 to about 0.1 centipoise.

56. The process of claim 2 wherein the at least one product has a viscosity in the range from about 0.01 to about 1000 centipoise.

57. The process of claim 2 wherein the second processing zone is upstream from the reaction zone.

58. The process of claim 2 wherein the reaction zone comprises the second processing zone.

59. The process of claim 2 wherein the process microchannel comprises two or more sidewalls which converge from the first processing zone to the second processing zone to provide a smaller open cross-sectional area in the second processing zone relative to the open cross-sectional area in the first processing zone.

60. The process of claim 2 wherein the second processing zone comprises one or more internal obstructions to provide the second processing zone with a smaller open cross-sectional area relative to the open cross-sectional area of the first processing zone.

61. The process of claim 2 wherein the internal obstructions comprise spherical objects and/or surface features.

62. The process of claim 2 wherein the process microchannel further comprises at least one additional zone downstream of the reaction zone, the at least one additional zone having a cross-sectional area that is larger than the cross-sectional area of the reaction zone.

63. The process of claim 2 wherein heat is exchanged between the process microchannel and a heat source and/or heat sink.

64. The process of claim 2 wherein the first reactant and the second reactant are mixed upstream of the process microchannel and/or in the process microchannel.

65. The process of claim 2 wherein the process microchannel is in a microchannel reactor, the microchannel reactor comprising a feed stream header, the first reactant and the second reactant being mixed in the feed stream header.

66. The process of claim 2 wherein the process microchannel has at least one sidewall and at least one apertured section in the sidewall, the second reactant flowing through the apertured section into the process microchannel.

67. The process of claim 66 wherein the second reactant flows from a second reactant stream channel through the apertured section into the process microchannel.

68. The process of claim 2 wherein the second reactant is mixed with the first reactant in the reaction zone.

69. The process of claim 2 wherein a mixing zone is in the process microchannel, the mixing zone being upstream of the reaction zone, the second reactant being mixed with the first reactant in the mixing zone.

70. The process of claim 2 wherein a mixing zone is in the process microchannel, the mixing zone being upstream of the reaction zone, part of the second reactant being mixed with the first reactant in the mixing zone, and part of the second reactant contacting the first reactant in the reaction zone.

71. The process of claim 2 wherein the chemical reaction is a Fischer-Tropsch synthesis reaction, oxidation reaction, hydrocracking reaction, hydrogenation reaction, hydration reaction, carbonylation reaction, dimerization reaction, trimerization reaction, oligomerization reaction, polymerization reaction, de-sulfurization reaction, hydrogen peroxide synthesis reaction, selective oxidation of alcohol to aldehyde or carbonyl, wet oxidation of one or more pollutants, hydrotreating reaction, hydrocracking reaction, alkylation reaction, acylation reaction, photocatalytic reaction, or a combination of two or more thereof.

72. The process of claim 4 wherein the reactants further comprise $H_2O$, $CO_2$, a hydrocarbon of 1 to about 4 carbon atoms, or a mixture of two or more thereof.

73. The process of claim 4 wherein the reactants further comprise one or more diluent materials.

74. The process of claim 4 wherein the mole ratio of $H_2$ to CO is up to about 2.7.

75. The process of claim 4 wherein the catalyst comprises particulate solids, the average particulate size of the particulate solids being at least about 225 microns.

76. The process of claim 4 wherein the volumetric consumption weight of CO is at least about 10 g-mols/kg-cat/hr active catalyst with a selectivity to methane on a molar basis less than about 15% per cycle.

77. The process of claim 4 wherein the catalyst is in a reaction zone and one or more additional reactants and/or diluent materials are added to the reactants in the reaction zone.

78. The process of claim 4 wherein the catalyst is in a reaction zone, the open cross-sectional area of the process microchannel in the reaction zone is narrow as compared to the open cross-sectional area of the process microchannel upstream of the reaction zone.

79. The process of claim 4 wherein the catalyst is in a reaction zone, the reaction zone further comprising one or more wall structures that removes liquid from the reaction zone.

80. The process of claim 4 wherein liquid is in the process microchannel, the dynamic pressure for the liquid in the process microchannel being in the range from about 0.1 to about 100 Pa.

81. The process of claim 4 wherein gas is in the process microchannel, the dynamic pressure for the gas in the process microchannel being in the range from about 0.5 to about 200 Pa.

82. The process of claim 4 wherein heat is exchanged between the process microchannel and a heat source and/or heat sink.

83. The process of claim 4 wherein the reactants are mixed upstream of the process microchannel and/or in the process microchannel.

84. The process of claim 4 wherein the process microchannel is in a microchannel reactor, the microchannel reactor comprising a feed stream header, the reactants being mixed in the feed stream header.

85. The process of claim 4 wherein the process microchannel has at least one sidewall and at least one apertured section in the sidewall, one of the reactants flowing through the apertured section into the process microchannel.

86. The process of claim 85 wherein the one reactant flows from a second reactant stream channel through the apertured section into the process microchannel.

87. The process of claim 4 wherein the process microchannel has an internal dimension of width or height of up to about 10 mm.

88. The process of claim 82 wherein the heat source and/or heat sink comprises at least one heat exchange channel.

89. The process of claim 88 wherein the heat exchange channel comprises a microchannel.

90. The process of claim 88 wherein a heat exchange fluid is in the heat exchange channel.

91. The process of claim 90 wherein the heat exchange fluid undergoes a phase change in the heat exchange channel.

92. The process of claim 88 wherein an endothermic process is conducted in the heat exchange channel.

93. The process of claim 88 wherein the reactants flow in the process microchannel in a first direction, and a heat exchange fluid flows in the heat exchange channel in a second direction, the second direction being cross current relative to the first direction.

94. The process of claim 88 wherein a heat exchange fluid is in the heat exchange channel, the heat exchange fluid comprising the first reactant, the second reactant, the product, or a mixture of two or more thereof.

95. The process of claim 88 wherein a heat exchange fluid is in the heat exchange channel, the heat exchange fluid comprising one or more of air, steam, liquid water, carbon monoxide, carbon dioxide, gaseous nitrogen, liquid nitrogen, inert gas, gaseous hydrocarbon, oil, and liquid hydrocarbon.

96. The process of claim 82 wherein the heat flux between the heat source and/or heat sink and the process microchannel is in the range from about 0.01 to about 500 watts per square centimeter of surface area of the process microchannel.

97. The process of claim 82 wherein the temperature of the reactants entering the process microchannel is within about 200° C. of the temperature of the product exiting the process microchannel.

98. The process of claim 4 wherein the process microchannel comprises surface features formed in and/or on one or more interior walls for modifying flow within the microchannel.

99. The process of claim 98 wherein the surface features are in the form of depressions in and/or projections from one or more of the microchannel interior walls that are oriented at oblique angles relative to the direction of flow of fluid through the microchannel.

100. The process of claim 4 wherein the catalyst comprises an active portion, the active portion comprising a composition represented by the formula

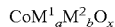

wherein: $M^1$ is Fe, Ni, Ru, Re, Os or a mixture thereof; $M^2$ is Li, B, Na, K, Rb, Cs, Mg, Ca, Sr, Ba, Sc, Y, La, Ac, Zr, La, Ac, Ce, Th, or a mixture of two or more thereof; a is a number in the range from zero to about 0.5; b is a number in the range from zero to about 0.5; and x is the number of oxygens needed to fulfill the valency requirements of the elements present.

101. The process of claim 4 wherein the catalyst comprises cobalt supported on alumina.

102. The process of claim 101 wherein the catalyst has a cobalt loading level of at least about 25% by weight and a cobalt dispersion of at least about 3%.

103. The process of claim 4 wherein the catalyst is a graded catalyst.

104. The process of claim 4 wherein the catalyst is in a reaction zone in the process microchannel, the reaction zone having a bulk flow path comprising about 5% to about 95% of the cross section of the process microchannel.

105. The process of claim 4 wherein the temperature within the process microchannel is in the range from about 150° C. to about 270° C.

106. The process of claim 4 wherein the pressure within the process microchannel is at least about 5 atmospheres.

107. The process of claim 4 wherein the space velocity for the flow of fluid in the process microchannel is at least about 1000 hr$^{-1}$.

108. The process of claim 4 wherein the pressure drop for the flow of fluid in the process microchannel is up to about 15 atmospheres per meter of length of the process microchannel.

109. The process of claim 82 wherein the heat source and/or heat sink comprises at least one heat exchange channel, a heat exchange fluid being in the heat exchange fluid, the heat exchange fluid flowing in the heat exchange channel, the pressure drop for the heat exchange fluid flowing in the heat exchange channel being up to about 10 atmosphere per meter of length of the heat exchange channel.

110. The process of claim 4 wherein the conversion of CO is at least about 50% per cycle.

111. The process of claim 4 wherein the selectivity to methane on a molar basis is about 25% or less per cycle.

112. The process of claim 4 wherein the yield of product on a molar basis is at least about 25% per cycle.

113. The process of claim 4 wherein the product is removed from the process microchannel, the process further comprising flowing a regenerating fluid through the process microchannel in contact with the catalyst.

114. The process of claim 4 wherein the mole ratio of $H_2$ to CO is in the range of about 0.8 to about 2.7.

115. The process of claim 4 wherein the product comprises a hydrocarbon mixture having the boiling point range of a middle distillate.

116. The process of claim 4 wherein the product comprises at least one olefin.

117. The process of claim 4 wherein the product comprises a normal paraffin, isoparaffin, or mixture thereof.

118. The process of claim 4 wherein the product is further processed using hydrocracking, hydroisomerizing or dewaxing.

119. The process of claim 4 wherein the product is further processed to form a lubricating base oil or a diesel fuel.

120. The process of claim 4 wherein the reaction is a chain growth reaction.

121. The process of claim 4 wherein the reaction is an oligomerization reaction.

122. The process of claim 4 wherein the reaction is a polymerization reaction.

123. The process of claim 5 wherein the reactants further comprise $H_2O$, $CO_2$, a hydrocarbon of 1 to about 4 carbon atoms, or a mixture of two or more thereof.

124. The process of claim 5 wherein a gaseous phase is in the first processing zone, the local velocity of gas in the first processing zone being in the range from about 0.1 to about 250 m/s.

125. The process of claim 5 wherein a liquid phase is in the second processing zone, the local velocity of liquid in the second processing zone being in the range from about 0.01 to about 200 m/s.

126. The process of claim 5 wherein a gaseous phase is in the second processing zone, the local velocity of the gas in the second processing zone being in the range from about 0.1 to about 500 m/s.

127. The process of claim 5 wherein the ratio of the first open cross-sectional area to the second open cross-sectional area is in the range from about 1.2 to about 25.

128. The process of claim 5 wherein the reactants comprise gases and the gases have a viscosity in the range from about 0.001 to about 0.1 centipoise.

129. The process of claim 5 wherein the product has a viscosity in the range from about 0.01 to about 1000 centipoise.

130. The process of claim 5 wherein the second processing zone is upstream from the reaction zone.

131. The process of claim 5 wherein the reaction zone comprises the second processing zone.

132. The process of claim 5 wherein the process microchannel comprises two or more sidewalls which converge from the first processing zone to the second processing zone to provide a smaller open cross-sectional area in the second processing zone relative to the open cross-sectional area in the first processing zone.

133. The process of claim 5 wherein the second processing zone comprises one or more internal obstructions to provide the second processing zone with a smaller open cross-sectional area relative to the open cross-sectional area of the first processing zone.

134. The process of claim 133 wherein the internal obstructions comprise spherical objects and/or surface features.

135. The process of claim 133 wherein the process microchannel further comprises at least one additional zone downstream of the reaction zone, the at least one additional zone having a cross-sectional area that is larger than the cross-sectional area of the reaction zone.

136. The process of claim 5 wherein liquid is in the process microchannel, the dynamic pressure for the liquid in the process microchannel being in the range from about 0.1 to about 100 Pa.

137. The process of claim 5 wherein gas is in the process microchannel, the dynamic pressure for the gas in the process microchannel is in the range from about 0.5 to about 200 Pa.

138. The process of claim 5 wherein heat is exchanged between the process microchannel and a heat source and/or heat sink.

139. The process of claim 5 wherein the reactants are mixed upstream of the process microchannel and/or in the process microchannel.

140. The process of claim 5 wherein the process microchannel is in a microchannel reactor, the microchannel reactor comprising a feed stream header, the reactants being mixed in the feed stream header.

141. The process of claim 5 wherein the process microchannel has at least one sidewall and at least one apertured section in the sidewall, one of the reactants flowing through the apertured section into the process microchannel.

142. The process of claim 141 wherein the one reactant flows from a second reactant stream channel through the apertured section into the process microchannel.

143. The process of claim 5 wherein the reactants are mixed in the reaction zone.

144. The process of claim 5 wherein a mixing zone is in the process microchannel, the mixing zone being upstream of the reaction zone, the reactants being mixed in the mixing zone.

145. The process of claim 5 wherein a mixing zone is in the process microchannel, the mixing zone being upstream of the reaction zone, part of the one of the reactants being mixed with the other reactant in the mixing zone, and part of the one reactant contacting the other reactant in the reaction zone.

* * * * *